(12) United States Patent
Matlin et al.

(10) Patent No.: US 12,000,528 B2
(45) Date of Patent: Jun. 4, 2024

(54) MULTI-POSITIONAL ARTICULATING ERGONOMIC DEVICE WITH MODULAR FEATURES

(71) Applicant: FELLOWES INC., Itasca, IL (US)

(72) Inventors: Tai Hoon Matlin, Round Lake Beach, IL (US); Peter Maletich, Vancouver, WA (US); Shawn Michael Applegate, Streamwood, IL (US); Michael Franklin Egan, Chicago, IL (US); Dipan Pravin Surati, Palatine, IL (US)

(73) Assignee: Fellowes, Inc., Itasca, IL (US)

( * ) Notice: Subject to any disclaimer, the term of this patent is extended or adjusted under 35 U.S.C. 154(b) by 0 days.

(21) Appl. No.: 18/452,392

(22) Filed: Aug. 18, 2023

(65) Prior Publication Data

US 2023/0417361 A1    Dec. 28, 2023

Related U.S. Application Data

(60) Division of application No. 17/971,418, filed on Oct. 21, 2022, which is a continuation-in-part of application No. 16/874,437, filed on May 14, 2020, now Pat. No. 11,666,143.

(60) Provisional application No. 62/838,141, filed on May 14, 2019.

(51) Int. Cl.
*F16M 11/12* (2006.01)
*F16M 11/04* (2006.01)
*F16M 11/10* (2006.01)

(52) U.S. Cl.
CPC ......... *F16M 11/125* (2013.01); *F16M 11/045* (2013.01); *F16M 11/10* (2013.01); *F16M 2200/022* (2013.01); *F16M 2200/027* (2013.01)

(58) Field of Classification Search
CPC .. A47B 9/02; A47B 9/16; A47B 21/02; A47B 21/04; A47B 2023/049; A47B 17/02; A47B 2200/0043; F16M 11/045; F16M 11/10; F16M 2200/022; F16M 2200/027
USPC .................................. 248/920; 108/145, 7, 9
See application file for complete search history.

(56) References Cited

U.S. PATENT DOCUMENTS

| | | | |
|---|---|---|---|
| 7,722,002 B2* | 5/2010 | O'Keene | F16M 13/02 248/220.21 |
| 7,823,847 B2* | 11/2010 | Bremmon | F16M 13/02 248/920 |
| 7,891,622 B1* | 2/2011 | O'Keene | F16M 13/02 248/920 |
| 8,342,462 B2* | 1/2013 | Sapper | F16M 11/2057 248/920 |

(Continued)

*Primary Examiner* — Jose V Chen
(74) *Attorney, Agent, or Firm* — Wood, Phillips, Katz, Clark & Mortimer

(57) ABSTRACT

The invention is a monitor arm assembly including a rotation limiter that includes movable tabs to set the rotation limits of the arms with respect to each other or other assemblies. The rotation limiter may include exterior ring activators and outer visual references for the set limitations. The monitor arm assembly also includes a plurality of slide tracks to allow the monitor attached to the arm to take a plurality of lateral positions. The assembly may further include a connector to join adjacent slide tracks. The monitor arm assembly may include a double slider arrangement where a first track slides within a second track. A plate for connection to a monitor arm or monitor bracket may slide within perimeter channels of the first track.

29 Claims, 42 Drawing Sheets

(56) References Cited

U.S. PATENT DOCUMENTS

| | | | | |
|---|---|---|---|---|
| 8,596,599 | B1* | 12/2013 | Carson | F16M 11/2085 |
| | | | | 248/920 |
| 8,724,037 | B1* | 5/2014 | Massey | F16M 11/06 |
| | | | | 348/836 |
| 9,433,293 | B2* | 9/2016 | Gross | F16M 13/02 |
| 9,625,091 | B1* | 4/2017 | Massey | F16M 11/04 |
| 11,781,702 | B2* | 10/2023 | Massey | F16M 11/12 |
| | | | | 248/281.11 |
| 2007/0051861 | A1* | 3/2007 | Teramachi | F16C 29/064 |
| | | | | 248/476 |
| 2008/0006751 | A1* | 1/2008 | Chen | F16M 11/2085 |
| | | | | 248/920 |
| 2012/0056050 | A1* | 3/2012 | Huang | F16M 11/2064 |
| | | | | 248/122.1 |
| 2019/0353295 | A1* | 11/2019 | Huang | F16M 11/046 |
| 2020/0271268 | A1* | 8/2020 | Govekar | F16M 11/18 |
| 2021/0088626 | A1* | 3/2021 | Lai | G01M 17/007 |
| 2021/0278029 | A1* | 9/2021 | Ho | F16M 11/046 |
| 2021/0293370 | A1* | 9/2021 | Lai | F16M 11/045 |
| 2022/0205582 | A1* | 6/2022 | Jeon | F16M 13/02 |

* cited by examiner

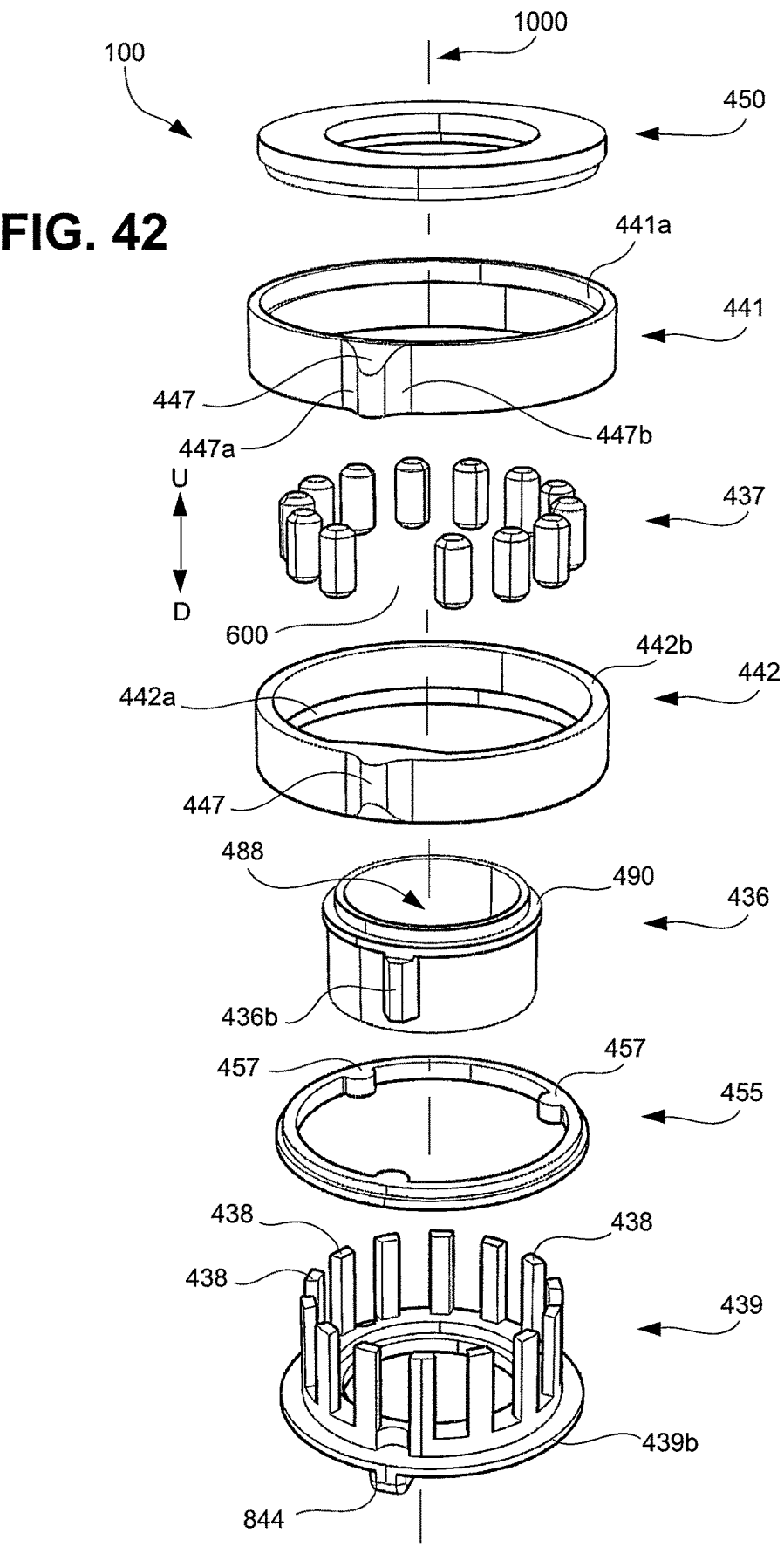

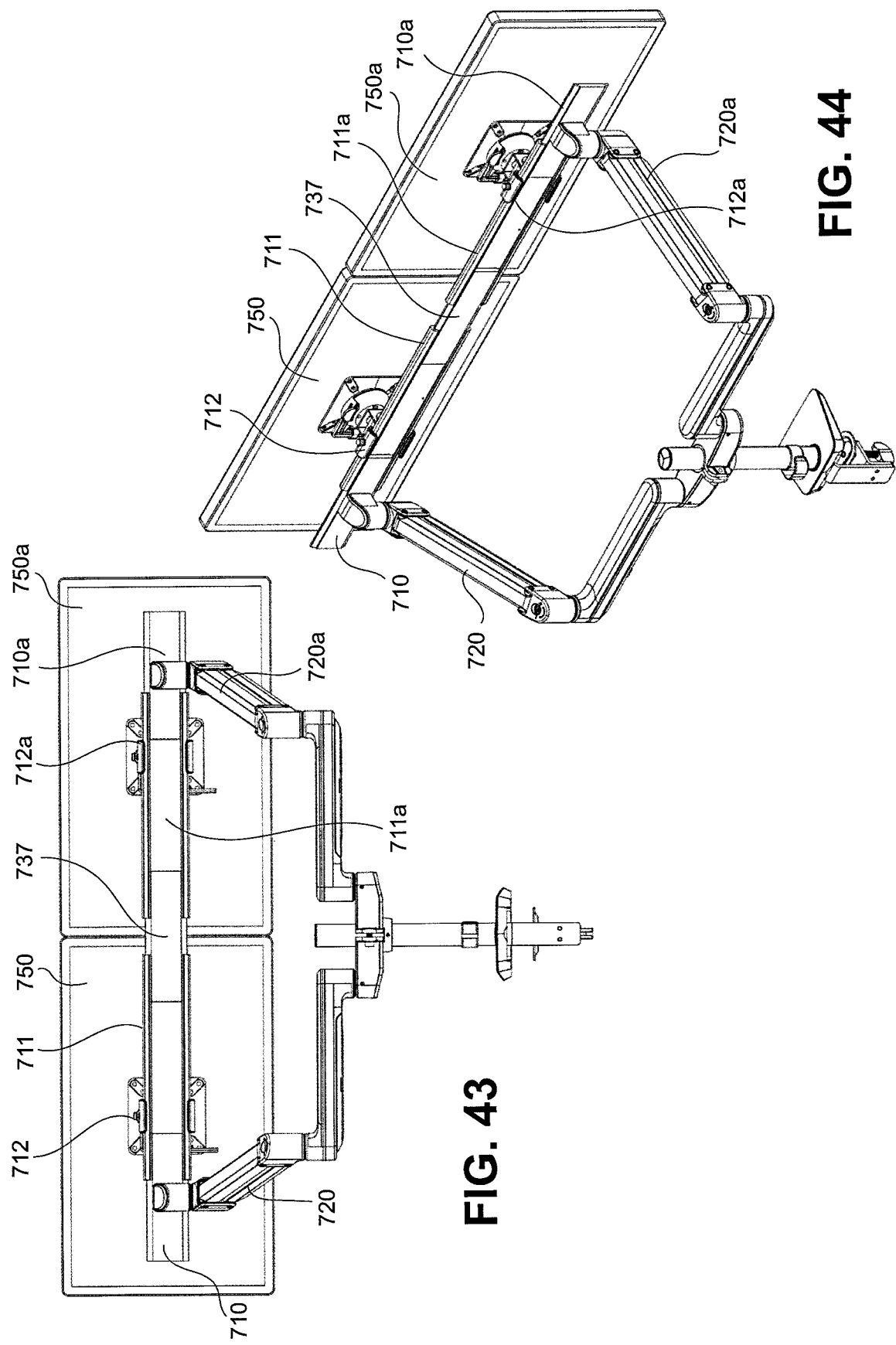

MULTI-POSITIONAL ARTICULATING ERGONOMIC DEVICE WITH MODULAR FEATURES

CROSS-REFERENCE TO RELATED APPLICATIONS

This application is a division of U.S. patent application Ser. No. 17/971,418, filed Oct. 21, 2022, which is a continuation-in-part of U.S. patent application Ser. No. 16/874,437, filed May 14, 2020 (now U.S. Pat. No. 11,666,143), which claims priority to U.S. Provisional Application No. 62/838,141, filed May 14, 2019.

BACKGROUND OF THE INVENTION

Field of the Invention

The present invention relates to ergonomic office products, more specifically to desktop and tabletop ergonomic assistance devices such as footrests, monitor and laptop risers, writing surfaces, and articulating supports.

Background Art

Ergonomic devices are well known in the current marketplace and are utilized in most offices today to ensure the worker and the equipment the working is interacting with is positioned in a way as to make their daily tasks less strenuous to the muscular skeletal structure of the worker. These types of products typically include numerous and various points of adjustments to ensure they address certain anthropomorphic and biomechanical understandings or standards so as to be deemed an ergonomic device.

An example of such an ergonomic device is a footrest to be used by a seated office worker. A footrest, when properly adjusted allows for a more comfortable position for the user. Typically, a footrest is used under a desk and comes into use when the user is in the seated position. The footrest may include a platform component in which the feet of the user engages with and may also include an underlying mechanism giving the platform its ability to adjust in height and/or its angle position. Such a device as illustrated in FIGS. 2 and 3 of U.S. Pat. No. 4,547,767, is an example of this type of prior art, and shown in FIG. 1 of this application.

FIGS. 1A and 1B are a prior art patent figure illustration of an exemplary adjustable footrest from U.S. Pat. No. 4,549,767. The upper illustration labeled FIG. 1A, upper platform 38 is in the middle position with element 58 resting on middle step element 28. This adjustable footrest exemplifies typical footrests whereas the upper platform adjusts in height and angle.

As workplaces move towards an active workforce model where the worker is encouraged to work while standing or sitting, and to take active breaks to encouraging movement, adds additional need and complexity to the category of ergonomic footrests.

FIGS. 1a and 1b of U.S. Pat. No. 9,961,990 shown in this application as FIGS. 2A and 2B, illustrates a prior art example of a device which provides a footrest when a user is in the standing position while working, and then can be moved away by the operator when the height adjustable table is lowered into the sitting position.

The prior art shown in FIGS. 2A and 2B is an illustration of an exemplary adjustable footrest as part of a sit stand desk from U.S. Pat. No. 9,961,990. FIG. 2A illustrates footrest element 42 in the retracted position. FIG. 2B shows footrest element 42 in the active position along with the sit stand surface element 50 in the raised position. *interpretation of prior art exemplary figure FIG. 1 of U.S. Pat. No. 6,955,400 shown here as FIG. 3 illustrates an example of a prior art footrest with dynamic movement feature which transmits a sequentially actuated motorized movement to the feet and legs of the user in its attempt to alleviate the effects of being sedentary in an office setting.

FIG. 3 is a prior art patent figure illustration of an exemplary under-desk footrest with motorized movement from U.S. Pat. No. 6,955,400. FIG. 1 illustrates footrest element 1, motor element 5 which moves to articulate armature element 10. Armature element 10 moves footrest element 2 about pivot axis 4. Linkage element 7 allows for alternating articulation of footrest element 3.

Ergonomic writing surfaces are also known to be used to encourage proper writing and working surface angles and have adjustment and features to ensure the desired position and/or angle of the upper surface is in the proper position, in height, laterally, and distance from the user. Typically, a writing surface is used to relieve stress developed from leaning over a flat surface when writing or engaged in a similar activity. The construct of an ergonomic or adjustable writing surface includes a writing surface or platform component and an underlying mechanism giving the platform its ability to adjust in height, laterally, fore and aft, and/or its angle position. A prior art writing surface with some adjustability is disclosed in FIG. 8 of US Patent Application 2004/0256535, included in the present application as FIG. 4, and illustrates the some of the noted features.

FIG. 4 is a prior art patent application figure illustration of an exemplary adjustable writing surface from US Patent Application 2004/0256535 A1. FIG. 8 illustrates writing surface element 400 in its raised position as it is positioned to rest on support element 436.

Laptop stands represent another type of an ergonomic device. These types of devices allow the screen of a laptop to be presented higher so there is less strain due to the reduction of having to tilt one's head forward to view the laptop screen. FIG. 9 of U.S. Pat. No. 7,487,940, shown in this application as FIG. 5, is an illustration of such a device which is designed to allow a laptop computer to be positioned as to accommodate the ergonomically recommended upright viewing angle.

FIG. 5 is a prior art patent figure illustration of an exemplary laptop computer stand from U.S. Pat. No. 7,487,940. Laptop computer retaining element 10 holds laptop computer 20 on upper element 79. Height or angle adjustments are possible through paddle element 47.

SUMMARY OF THE INVENTION

Disclosed herein is a Multi-Positional Articulating Ergonomic Device with Modular Features. The disclosed invention not only overcomes many of the limitations of the prior art, it endeavors to add additional efficiencies for the end user and the manufacturer by using a systems approach. This systems approach allows for core mechanisms to be shared and to interchangeably assembled to create a multitude of ergonomic devices. These devices use similarly design components yet are differentiating enough as to accommodate user variabilities as to qualify as an ergonomic device within the channel or category in which the unit has been modularly configured to sell through.

Due to the numerous and harmful sedentary type office jobs, the need for ergonomically designed devices to counteract these effects has become more prevalent and the market needs have increased. In particular, sit stand devices allowing the worker to raise and lower their primary work surface as to go from sitting to standing. This action is taken into consideration with our disclosed invention in the form of a footrest assembly that has a larger range of motion, is easily adjustable, and includes an activated standing mode while easily returning to sitting mode as to accommodate both sitting and standing positions. Furthermore, the disclosed invention in the footrest assembly has taken into consideration in a unique and inventive manner, the newest trends of active movement which encourages movement even when the user is in the sitting position. With the footrest assembly, active or dynamic movement is encouraged by the core supportive arm mechanism's ability to flex downward when additional pressure is applied beyond the user adjustable neutral setting to accommodate the flexing of the legs and articulation at the ankle joint. These actions are encouraged since the unit's user adjustable settings are not disturbed and the unit will easily return to the user desired preset position each time after the dynamic movement has concluded.

By interchanging the disclosed invention's top platform with another, for example from a footrest platform to a writing surface, the disclosed device can now function in a manner desirable of ergonomic writing surfaces with additional and unique benefits.

Typical writing surfaces have only an angle adjustment and cannot be easily moved out of the way. The disclosed device when configured as a writing surface, the writing surface's angular orientation can be adjusted not just front to back, but angularly due to its ability to pivot and rotate accommodating both right and left-hand/orientations. This additional flexibility allows the surface to sit at a more natural position making it ergonomically superior to standard writing surfaces. Furthermore, the writing surface configuration has the added advantage of being easily moved out of the way when the user is using a keyboard or needing access to the space underneath the writing surface.

Once again, by interchanging the disclosed invention's top platform with another, for example from a writing surface to a laptop and/or monitor riser, the disclosed device can be reconfigured into a monitor or laptop riser. Typical laptop and/or monitor risers have a top platform, or surface which can be adjustably raised, or lowered as to be positioned optimally for viewing the screen. When and if desired, the top platform or surface, on the disclosed device can be raised or lowered, additionally angled forward, or backwards, and pivoted right and left. These additional adjustments allow the user to change viewing angles to match their working position more readily. As well, the feature allows the user to share their monitor or laptop screen with others by rotating the top platform or surface for optimal viewing.

The disclosed invention's main components include, but are not limited to, a base for resting on a surface such as a desk top, a lifting armature mechanism which can be in the form of a parallel or four bar configuration, an optional upper and lower pivoting, and/or rotating assemblies, and an optionally interchangeable top surface/s such as a foot platform, writing surface, monitor support assembly, or laptop support surface, and the unit's support base element/s.

Configurations of the invention may utilize a weighted base to improve the stability of the unit throughout its entire movement range, but in certain configurations when additional stability is required, a securing clamp in addition to, or as an alternative to, the weighted base can be utilized. The base assembly optionally includes within the sub-assembly, a pivoting and/or rotating assembly which is configured add additional movement by utilizing a pivot and/or rotating component which interacts with a bearing surface/s and can incorporate adjustments as to limit the movement range and the force needed to initiate the movement. Additionally, if a return to center feature is desired, this can be implemented by the addition of a biased spring arrangement. The pivot and/or rotating mechanism's force adjustment feature can be factory set using set screws, operator modified by utilizing knurled knobs, and/or relocated to another more accessible location by the use of a cable and actuator assembly.

The aforementioned lift assembly arm can be in the form of a parallel or four bar arm type mechanism, if its desirous to have a support arm, in which the upper attached mount or platform stays relative to its user set or default factory set angle when in the raised, lowered, or positions therebetween; otherwise a dual hinged armature with upper and lower rotational and/or pivoting assemblies would suffice in many of the mentioned configurations, and is typically lower in cost and complexity.

When lift assist is desired, the arm assembly can utilize a positioning assist mechanism in the form of a torsion, extension, or compression spring, or through the use of an expanding gas cylinder, or any other similar or combination of arrangements to impart the force needed for proper assistance when moving the armature throughout its desired range of motion. This assist feature when utilized, can incorporate an adjustment or use a multitude of assists of similar, or varied types which are utilized and actuated in a manner as to ensure the amount of assist force exerted on the armature can be set to a desired level; this is due to the varied needs to ensure the feature meets the user's expectations in each of the varied configurations. The aforementioned manual assist methods can be replaced by a linier actuation motor assembly if a motorized powered version is desired. In addition, the lift arm assembly can be supplemented by the use of a secondary, and/or multiple force assists to aid the primary assist's functional range as to ensure when lifting and lowering the upper mount or platform, the operator is the desired amount of force, whether variable or constant, throughout the range of the armature's movement.

The upper portion of the lift arm assembly is coupled by way of an optional pivoting, and/or rotating assembly which could mirror the construction and feature set of the previously described lower pivoting assembly. Furthermore, either the upper or lower assembly, or both can incorporate a leveling gimble assembly to compensate for any manufacturing, assembly or mounting surface irregularities, can be factory set using set screws, and/or operator modified utilizing knurled knobs. The leveling feature allows the upper mounting plate to stay at its relative set angle position throughout the armature's travel. Both the upper and lower optionally pivoting and/or rotating assemblies may have a force adjustment feature which allow for separately operable and adjustable force settings which when utilized, can regulate the sequential movement of the upper mounting bracket's orientation to the unit's lower base mount assembly.

In some configurations and embodiments, it will be advantageous to make the pivoting, rotational movement assemblies operate unambiguously and/or sequentially. Each of the movement assemblies can be adjusted and set to initiate its motion with a varied force from the other/s, as to eliminate ambiguity, especially in a multi-pivotal and/or multi-rotational configuration. To ensure the primarily desired movement initiates when the optimal amount of force is exerted in the primary movement's actuation direction, the desired resistant setting can be accomplished by adjusting the tensioning assembly on the pivot and rotational retainer collet. By tightening or loosening the tension mechanism, the force needed to rotate or pivot a particular joint assembly, can be tuned by adjustment as to varying the force needed to move the that particular assembly as compared to other assemblies as to make that one pivot/rotational assembly move with lessor or greater force than the another/s.

As an alternative or supplemental feature, an actuation pin, cam, or gear can be added to the pivoting and/or rotating assemblies to adjust the resistance and/or to lock the assemblies. If controlled as a group, the actuated member would be actuated as to interlock the assemblies together, or in the inverse, when the locking pin has not been actuated, the pivoting and/or rotating assemblies would continue to act independent of one another. This actuation of locking and unlocking or of engaging or disengaging a resistive force, would depend on the movement control desired for the product to function as intended in the final assembled configuration. This optional adjustment actuation/s can be accomplished remotely away from the actuation pin, cam or gear, by way of a cable and an actuation lever assembly.

The actuator if utilized, should be advantageously located as to allow the operator to actuate a gas or spring lift assist mechanism. The actuator can be remotely located and activated by way of a lever on one end pulling a cable through the assembly activating the assist mechanism. If using a gas spring, the type that automatically locks in place when the actuator is returned to the non-actuated position is advantageous when a user may want a lock and unlock type positioning device. This allows the working surface platform to be actuated, moved and stopped and be locked in place anywhere within its range of movement. In certain embodiments, it might be advantageous for the armature to not be locked in place as to be in the optimal position when weight is applied (such as in a footrest configuration); this is so when additional force or weight is applied, the upper assembly actively moves and returns as to flex with the user when they are moving, leaning upon, or stretching against the device. In other embodiments of the actuation device, it might be used to unlock and lock a feature such as a rotation feature as to allow the upper platform and/or the lower arm assembly to pivot. Several levers and actuators (more or less) can be used throughout the configuration as to ensure optimal adjustment and feature actuations.

Additionally, the aforementioned rotational and pivotal assemblies, can incorporate an adjustable travel limiter to allow only a portion of its full range of movement to be accessible. The limiter can be preset with some or all of its range of motion being user adjustable. The limiter settings will be determined by the final assembly and which movements would be desirous to limit for a given situation. The adjustment can be created by interchangeable stepped spacers which be engaged separately, as in one at a time or, can be a continuous collet with a protrusion detail which blocks some of the pivotal or rotational range of movement. These limiter assemblies can uniquely incorporate a torsion spring which would assist in the rotation and/or pivotal movements. The torsion spring act as to return the pivot or rotation assembly to the initial default or user chosen position, whereas the pivoted or rotated assembly would naturally return to the spring force center when the operator has released the rotated or pivoted component off the default, or user chosen position—the home position. This back to center feature's home position can be adjusted by rotating the spring pivot assembly to set a newly desired default or home position.

In some applications, the limiter assembly may include activators to set pins to determine the range of movement. The activators may be movable rings coaxially located about the limiter assembly. With judicious design, the limiter assembly may act as a rotational bearing and be constructed as a cassette which may be replaced or substituted with a non-limiter bearing if a user so desires.

In certain uses, it is advantageous to incorporate an over-drive or clutch mechanism to protect the unit from unintended use. The disclosed invention in the described embodiment includes at least one pivotally and/or rotationally hinged components. The upper and lower assemblies which are attached by way of a pivotally hinged assembly and mounting bracket can incorporate the over-drive mechanism in the lift assisted or non-assisted embodiment, the four-bar parallel arm configuration, or the simpler non-four bar, dual hinged arm configuration. To move the upper assembly up and down without a lift assist, the user would manually position the upper assembly to the desired position and tighten the hinged arm assembly in place. The hinged arm assembly could include detents built into the hinge assembly as to let the user know the arm has been set to a certain position, and each of these detents could be designed in a way as to hold the armature in place (once the user has tightened the hinged and/or pivot mechanism) for normal use, but in the application of high amounts of force or weight, the detents would then work as a clutch and release to the next detent and so on, in such a manner as not to damage the unit's functionality. When incorporating the clutch mechanism within an embodiment which incorporates a four-bar mechanism with a lift assist, the clutch mechanism will take into consideration the application of force or weight above the recommended specified limit; when this force limit is reached, the lift assist will give way as to allow movement of the armature as to not damage the unit's functionality.

The disclosed invention has distinct unique features such as dynamic movement, adjustability, flexibility, and modularity and are the key characteristics of the core mechanism which support an optionally interchangeable and varied top surfaces, which when assemble upon the optionally varied number of support bases, create varied and unique user experiences. Along with these demonstrable functional advantages, we are disclosing a method and system in which, a manufacturer, and/or distributor, and/or consumer can construct a multitude of ergonomically based products effectively and at lower cost than if they were to, design, engineer, tool, manufacture, assembled and ship each of the varied constructs individually. The manufacturer and distributor can mass ship the components and/or construct the desired product as ordered by the consumer to save shipping, warehousing cost while responding to the consumer's needs in a build to order premium service at much lower costs and investment.

As of note, these disclosed configurations and embodiments are by no means an exhaustive list of the multitude of configurations and variations producible by the disclosed application but is meant to be illustrative to demonstrate the advantageous ergonomic flexibility of the disclosed invention and its sub-components and sub features.

The listed products features and inventive embodiments as described in this application should not be considered as limiting in any way. The disclosed features and inventive embodiments of this application can be applied to a range of products which are Multi-Positional Articulating Ergonomic Devices.

In one form, the invention is directed to a support device for selectively elevating a platform above a working surface. The device includes: a base for resting on a work surface; an articulating armature assembly; and a platform assembly. The base is coupled to the articulating armature assembly. The articulating armature assembly is coupled to the platform assembly. The articulating armature assembly has a range of elevation to selectively raise and lower the platform assembly above the working surface. The elevation is selected by the user through an articulation actuator that includes a spring.

In one form, the articulation actuator includes an actuation lever to selectively engage the spring.

In one form, the spring provides a counterforce to a downward force on the platform assembly when the articulating armature assembly is in an upper range of elevation.

In one form, the device further includes a second spring with a force higher than the first spring.

In one form, the first spring provides force to the articulating armature assembly in a first range of elevation. The second spring provides force to the articulating armature assembly in a second range of elevation.

In one form, a first actuation lever selectively engages the first spring. A second lever selectively engages the second spring.

In one form, the device further includes a range controller. The range controller defines the range in which the articulating armature assembly moves.

In one form, the spring provides counterforce to a downward force on the platform assembly, when the armature assembly moves within the range defined by the range controller.

In one form, the invention is directed to a support device for elevating a platform above a work surface. The device includes: a base; an articulating armature assembly; and a platform assembly. The base is coupled to the articulating armature assembly. The articulating armature assembly is coupled to the platform assembly. The articulating armature assembly has a range of elevation above the base. A spring is engaged with the articulating armature assembly to provide a counterforce to a downward force on the platform assembly.

In one form, the spring engages with a range controller to limit the range of elevation.

In one form, the counterforce supplied by the spring is selectively engaged by an actuation lever.

In one form, the device further includes a slide plate on the bottom of the base. The slide plate is selectively in contact with a surface upon which the base rests when the base is tilted by the user. The slide plate is not in contact with the surface when the base is not tilted.

In one form, the device further includes a second spring to provide a counterforce to a downward force on the platform assembly. The second spring applies its downward force when the articulating armature assembly is in a second range of elevation above the base.

In one form, the second range of elevation is limited by a second range controller.

In one form, the device includes a rotational bearing that allows the articulating armature assembly to rotate with respect to the base.

In one form, the articulating armature assembly is a four bar assembly.

In one form, the invention is directed to a support device for elevating a platform above a working surface. The device includes: a base assembly for resting on the working surface; an articulating armature assembly coupled to the base assembly; and a platform assembly coupled to the articulating armature assembly. The articulating armature assembly has a range of elevation positions. A biasing member is engaged with the articulating armature assembly. The biasing member provides a counterforce against a downward force on the platform assembly when the articulating armature assembly is at an elevation higher than a lower elevation position. A range controller is engaged with the biasing member to limit the range of elevation positions in which the biasing member applies the counterforce.

In one form, the rotation limiter further includes a plurality of limit tab guides in the outer rotational element. The limit tabs are selectively movable within the limit tab guides.

In one form, the monitor arm further includes at least one limiter activator to selectively activate or deactivate the limit tabs.

In one form, the limiter activator is a ring positioned about at least a portion of the outer rotational element. The ring includes a protrusion to selectively move limit tabs as the ring is rotated.

In one form, further including a second ring positioned about at least a portion of the outer rotational element, the ring including a second ring protrusion to selectively mover limit tabs at the second ring is rotated.

In one form, the inner rotational element, the outer rotational element, and the ring are coaxially aligned.

In one form, the limit tabs are cylindrical pins having a major axis parallel to the coaxial alignment.

In one form, the limit tab guides are apertures in the outer rotational element. The apertures are sized smaller than the diameter of the cylindrical pins.

In one form, the number of limit tabs is at least one less than the number of limit tab guides.

In one form, the base is a second arm.

In one form, the monitor arm further includes a connection plate coupled to a second end of the arm. The connection plate is in sliding engagement with a first slide track. The connection plate has perimeter edges. The first slide track includes perimeter channels. The perimeter channels engages the perimeter edges to retain the first slide track in sliding engagement with the connection plate, a second slide track, the second slide track including perimeter channels.

In one form, the second slide track perimeter channels engage the first slide track perimeter channels in a sliding engagement.

In one form, the second slide track perimeter channels engage the exterior of the first slide track perimeter channels.

In one form, the monitor arm further includes a mechanism to selectively prevent sliding movement of the first slide track relative to the connection plate. The mechanism includes a brake extending from an aperture in a face of the connection plate, a spring to bias the brake in contact with a face of the first slide track, and an actuator to move the brake.

In one form, the first slide track and the second slide track are back to back. The second slide track is engaged in a sliding engagement with a second connection plate.

In one form, the monitor arm further includes a second arm. The second arm is connected to a second connection plate. A third slide track is in sliding engagement with the second connection plate. The third slide track and the first slide track are joined with a connector to interconnect the first and third slide tracks.

In one form, the rotation limiter further includes a top bushing fit onto the outer rotational element and a bottom bushing. The top bushing and bottom bushing capture the first and second rings about the outer rotational element. The bottom bushing includes at least one key. The key extends from the bottom bushing into an aperture of the outer rotational element. The key prevents rotation of the bottom bushing about the outer rotational element.

In one form, the top bushing includes a plurality of inner surface protrusions extending towards the first ring. The first ring has a surface in contact with the plurality of protrusions. The first ring surface includes indexing structures to interact with the inner surface protrusions.

In one form the rotation limiter is removably coupled to a first monitor arm and a second monitor arm.

In one form the rotation limiter give a visual reference to the allowed range of rotation.

BRIEF DESCRIPTION OF THE DRAWINGS

FIG. 42 is a top perspective exploded view of a rotation limiter of the present invention, including a bushing with keys to prevent rotation of the busing relative to the outer rotational element.

FIG. 43 is a back elevational view of two monitor arm assembled with a first and second slide track joined by a connector.

FIG. 44 is a back right side perspective view of the connected assembly of FIG. 44.

DETAILED DESCRIPTION OF THE PREFERRED EMBODIMENT

Figure 1A:
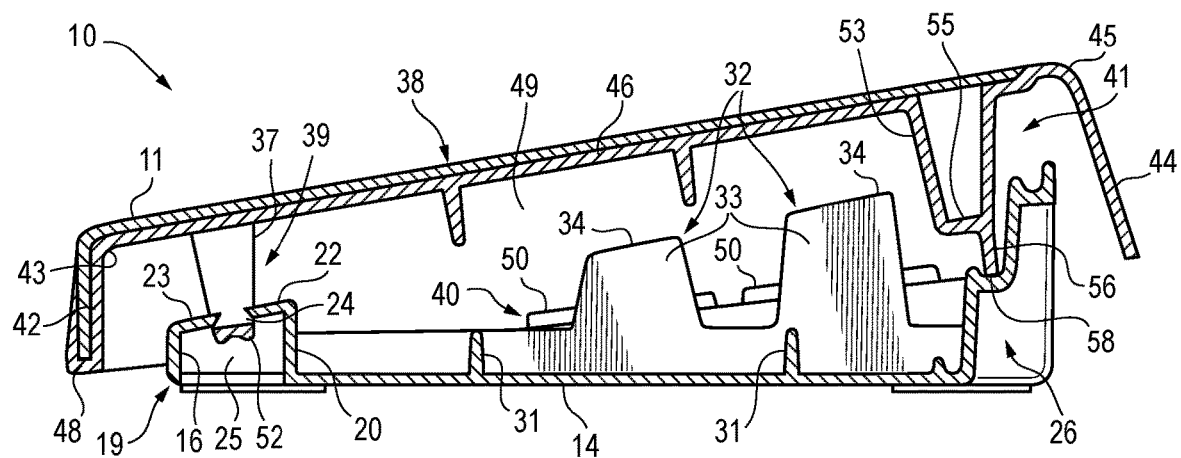
FIG. 1A is a prior art patent figure illustration of an exemplary adjustable footrest in a first position.
Figure 1B:
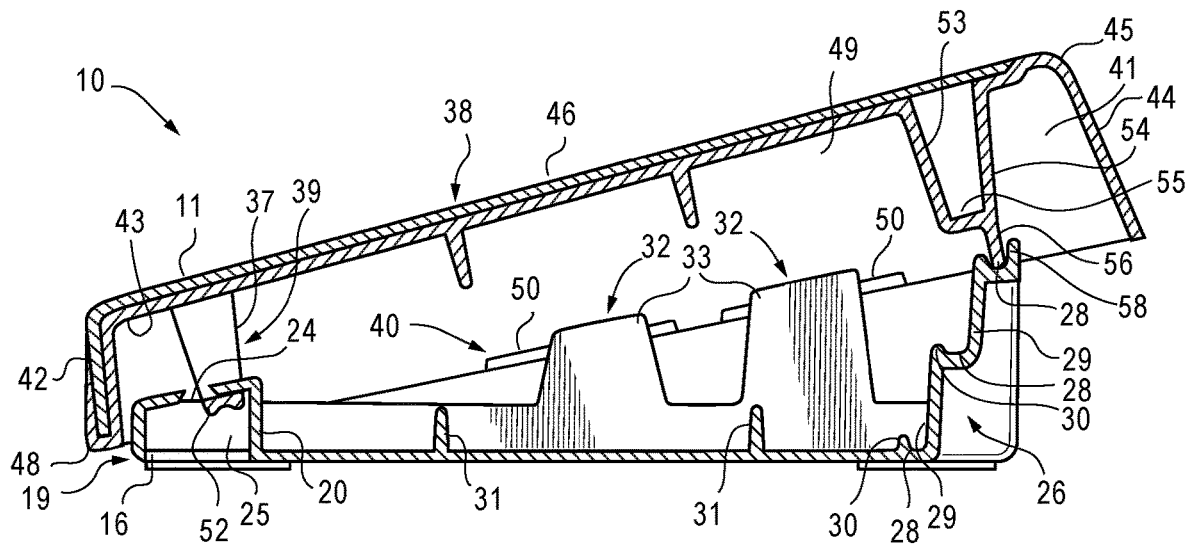
FIG. 1B is a prior art patent figure illustration of an exemplary adjustable footrest in a first position.
Figure 2A:
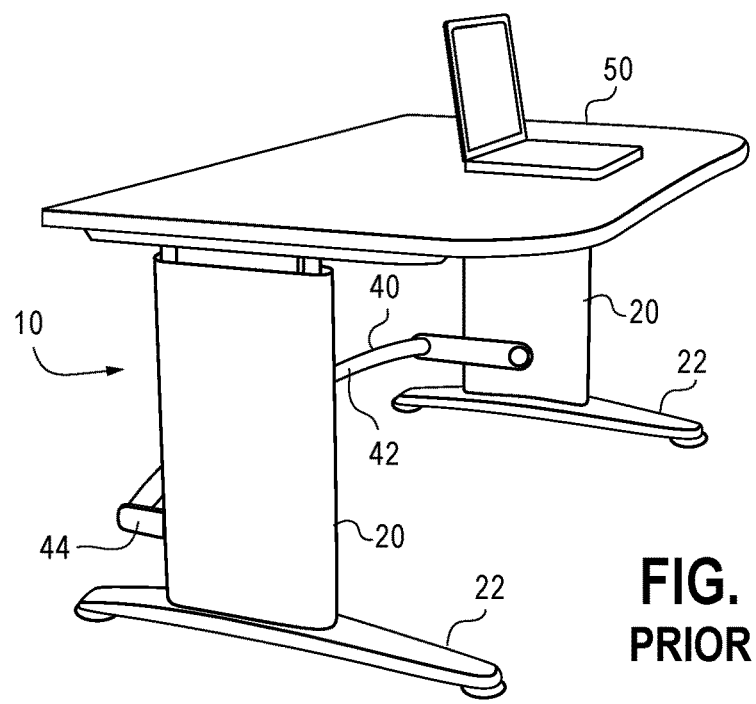
FIG. 2A is a prior art patent figure illustration of an exemplary adjustable footrest in a first configuration as part of a sit stand desk.
Figure 2B:
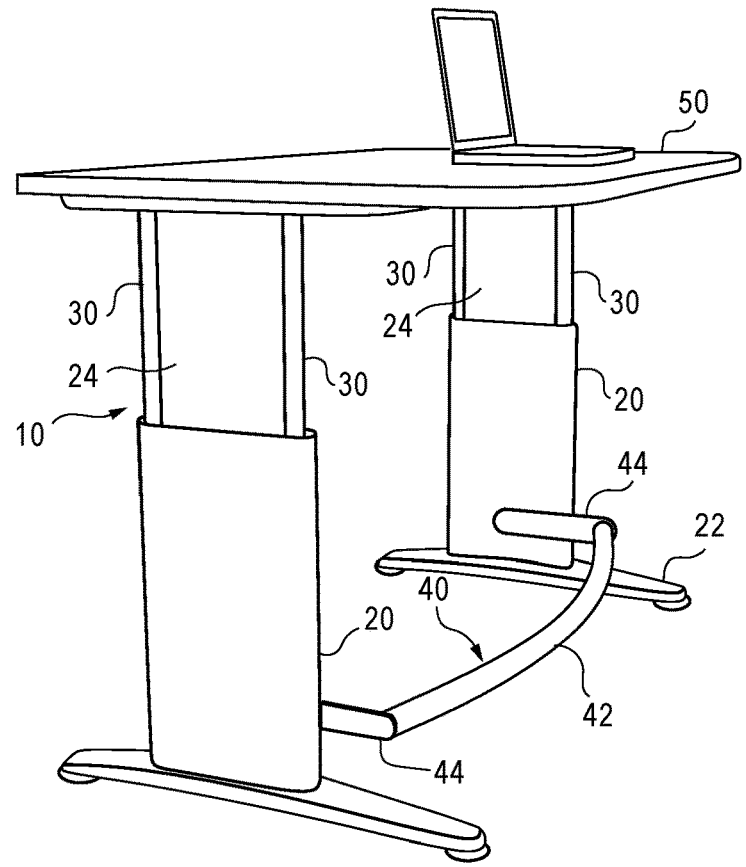
FIG. 2B is a prior art patent figure illustration of an exemplary adjustable footrest in a second configuration as part of a sit stand desk.
Figure 3:
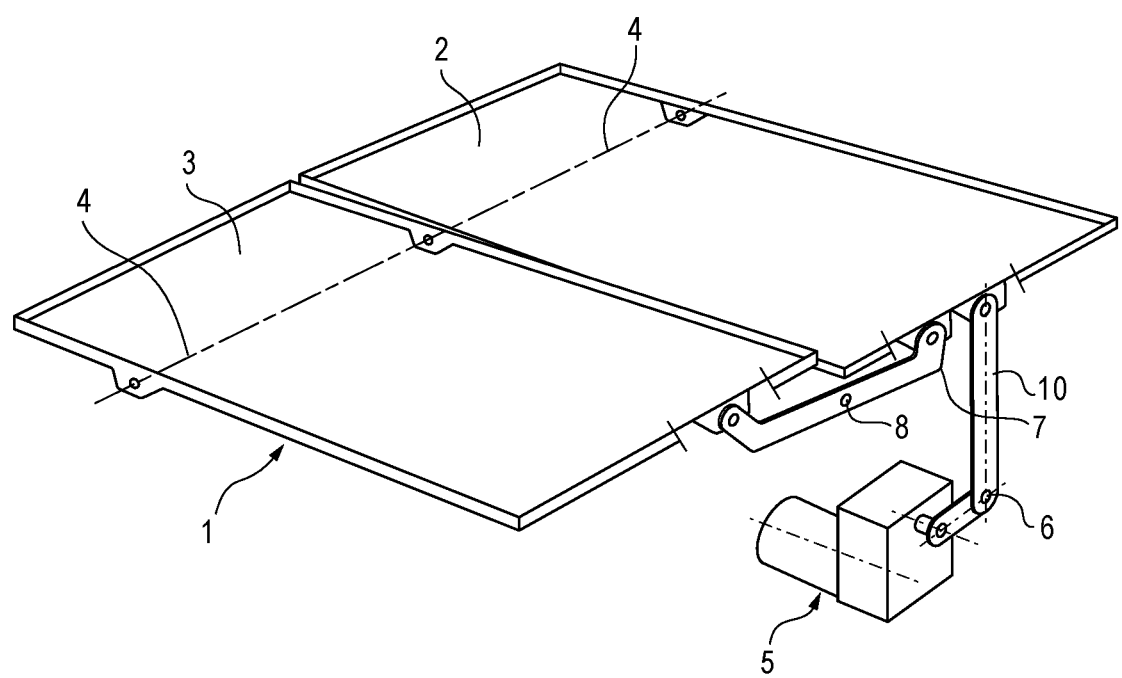
FIG. 3 is a prior art patent figure illustration of an exemplary under-desk footrest with motorized movement.
Figure 4:
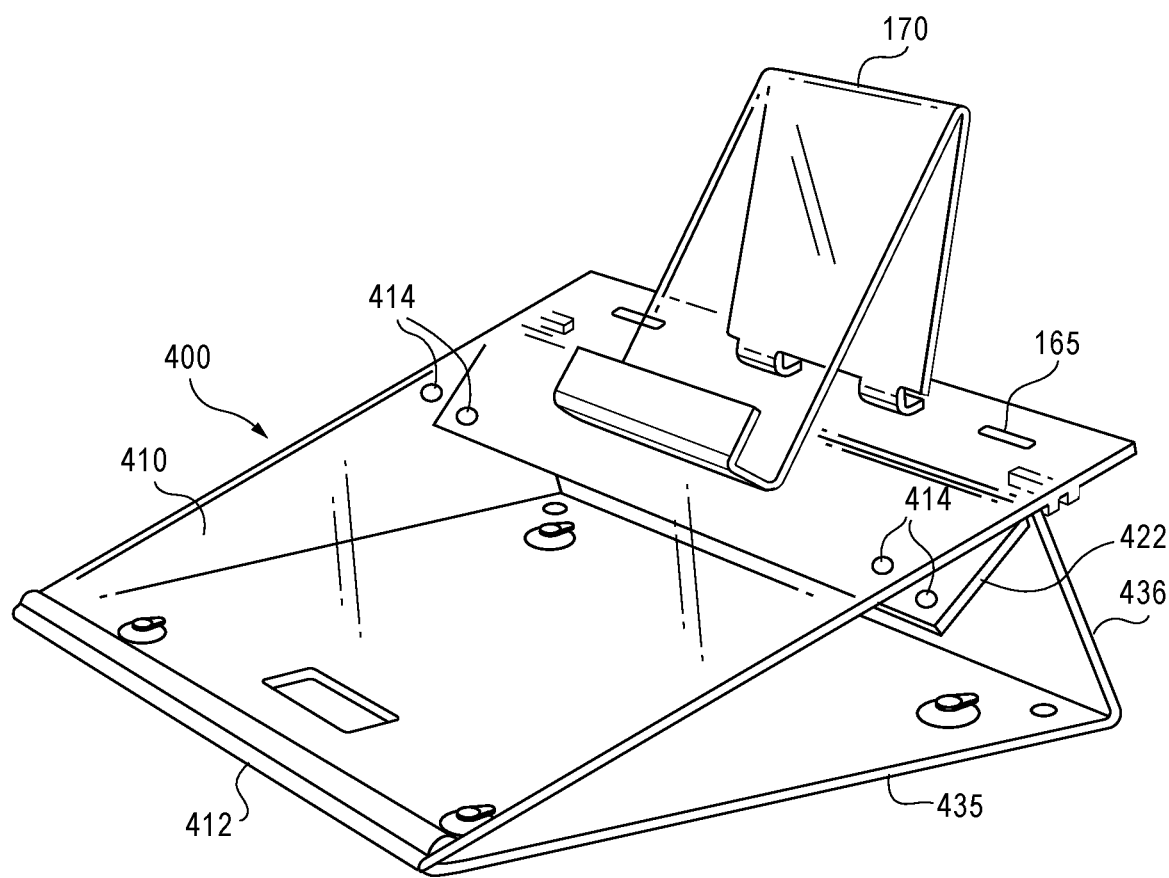
FIG. 4 is a prior art patent application figure illustration of an exemplary adjustable writing surface.
Figure 5:
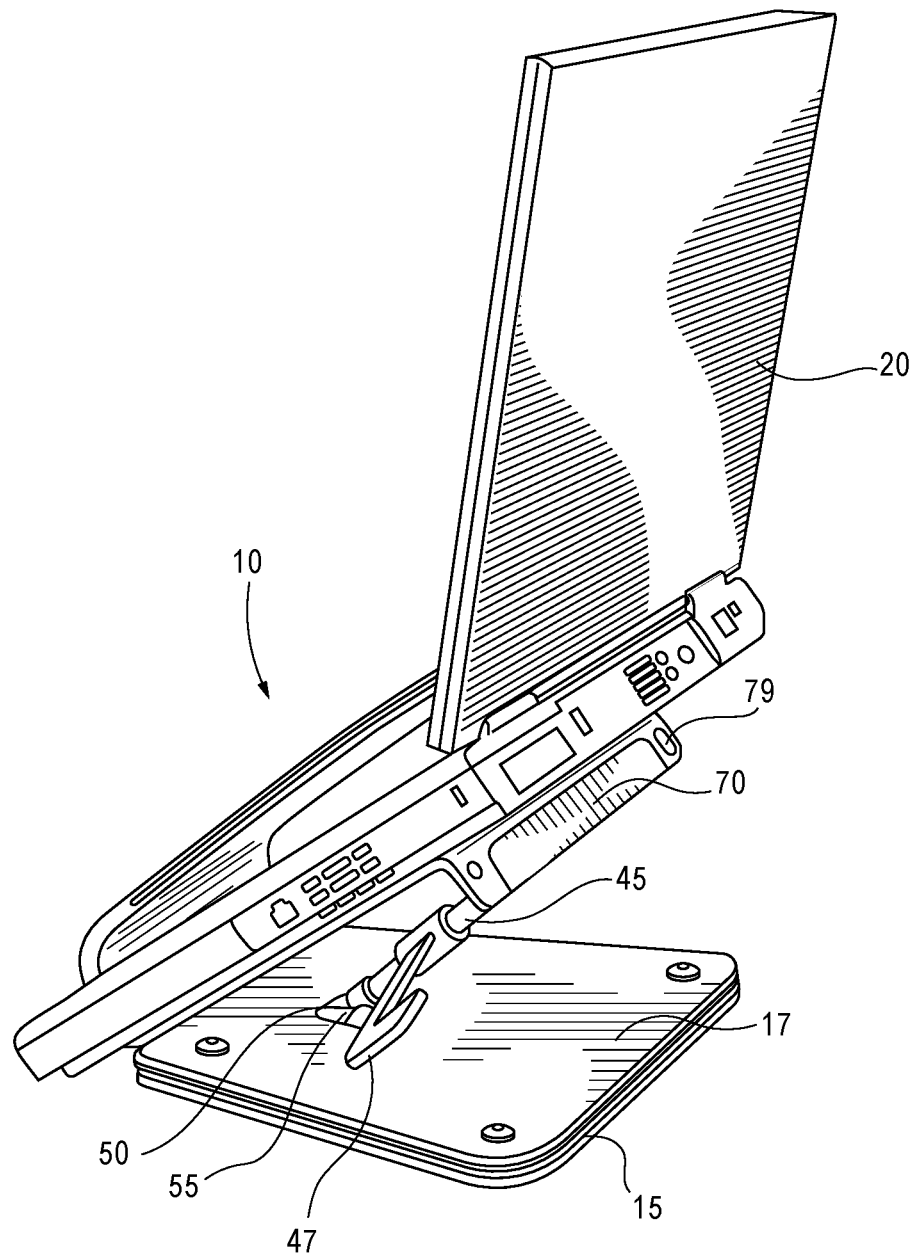
FIG. 5 is a prior art patent figure illustration of an exemplary laptop computer stand.
Figure 6:
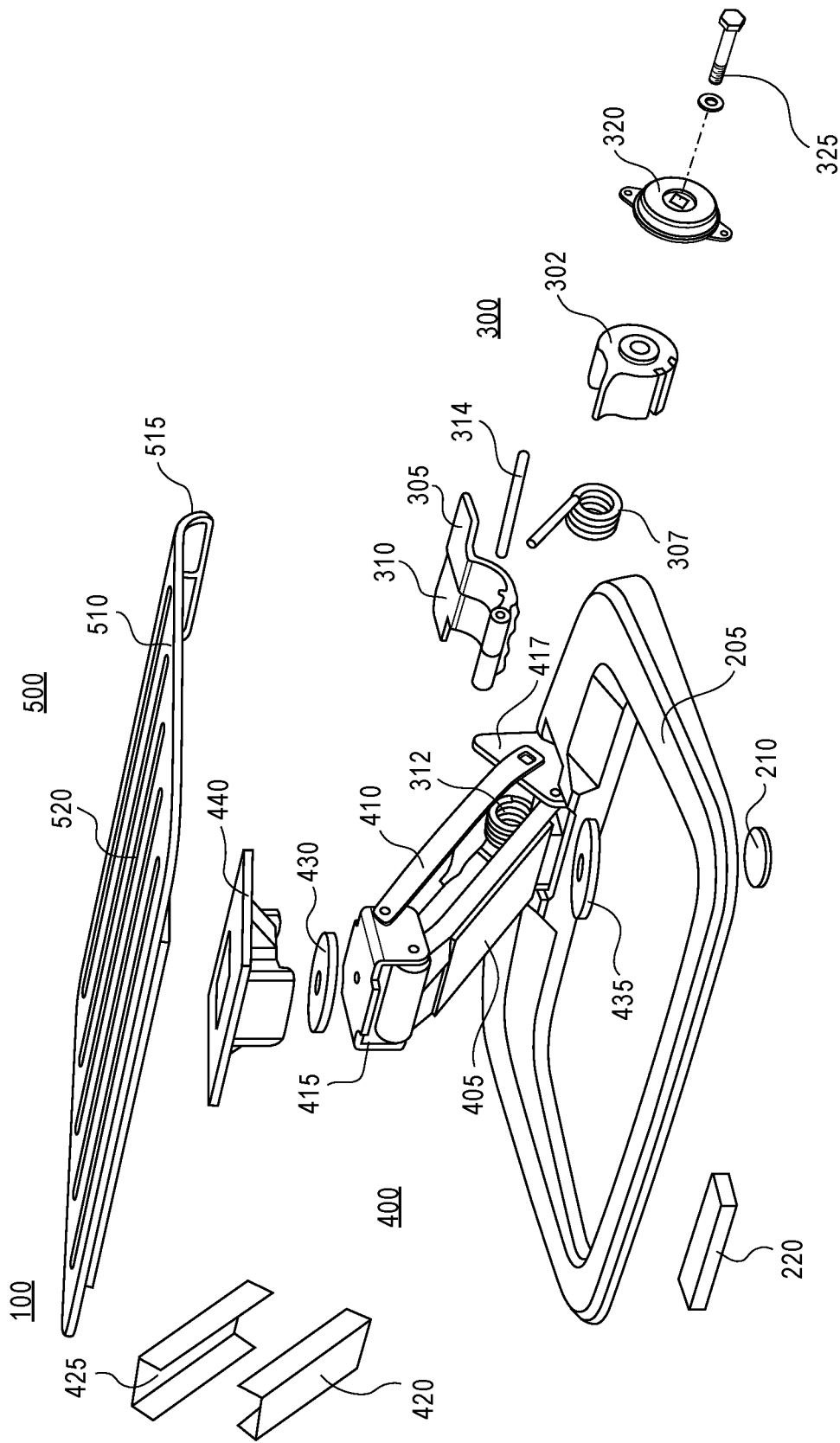
FIG. 6 is a rear perspective exploded view of the Multi-Positional Articulating Ergonomic Device with Modular Features of the present invention.

With reference to the figures, the various details and embodiments of the invention are shown. One skilled in the art will recognize that due to the modular nature of the assemblies described herein, many of the details may be applied to other embodiments even though they are discussed with reference to a specific embodiment. FIG. 6 is a three-quarters exploded view of the Multi-Positional Articulating Ergonomic Device with Modular Features of the present invention. The device 100 is shown with footrest platform assembly 500 which includes platform 510, gripping components 520, and curved front kickplate 515. The platform assembly 500 may include a TPU grommet in coupling to the articulating armature assembly 400 to allow for some movement, deflection and adjustment of the platform 510 relative to the armature assembly for the comfort of the user.

In some embodiments, the platform assembly 500 is supported by the articulating armature assembly 400 which includes upper connection plate 440, optional upper rotational bearing 430 (when rotation and pivoting movement is desired) which is assembled to upper four-bar connection plate 415 which links upper four-bar arm 410, lower four-bar arm 405 and lower four-bar connection plate 417 creating the articulating four-bar mechanism.

The four-bar mechanism is optionally encased by upper encasement 425 and lower encasement 420. The four-bar mechanism assembly is then coupled to the base assembly 200 by way of the optional lower rotational bearing 435 (when additional rotation and pivoting movement is desired) which if not utilized, the base assembly 200 would then attach to the armature assembly by way of the lower four-bar connection plate 330 only.

The lower four-bar connection plate also contains an armature articulation actuator assembly 300 consisting of a high force spring or other biasing element such as torsion spring 312, and a lower force spring or biasing element such as torsion spring 307, the springs allow for differentiating forces in the articulation range of the four-bar armature's movement ranges. In embodiments where a differentiating force is not desired, a single spring element can be utilized in place of the multiple elements shown.

To initiate movement of the armature, an actuation lever is provided which would release the spring and engage the spring accordingly. In this embodiment, the two spring element's actuations are controlled by actuation lever 305 and 310 accordingly which are retained in lower four-bar connection plate 417 by way of retaining pin 314. Optionally, if stops or ranges of upward articulation of the four-bar mechanism is desirous, rotational range controller 302 can be utilized to ensure the user needs to re-actuate the springs as to control the sub-range of motions within the articulation movement of the four-bar assembly. Rotation damper 360, range controller 302 and torsion springs 307 and 312 can be assembled by machine screw and washer 325 to slow the expansion of the spring elements by way of an internal assembly of plates and damper grease within damper 360 to slow down the upwards movement of the four-bar assembly 400 and the attached upper platform assembly 500.

In some embodiments, the base assembly 200 includes a base unit 205, gripping elements 210 of which there can be a plurality placed on the underside of base unit 205. Optional slide plate 220 is also attached to the underside of base unit 205 allowing the unit to be moved easily by lifting the unit by the kickplate 515 and pivoting or tilting the unit on the slide plate 220, allowing slide plate 220 to make primary contact with the floor or other working surface to easily move the unit until lowered as to then allow gripping elements 210 to make primary contact with the floor securing the unit from nonintentional movement.

Figure 7:
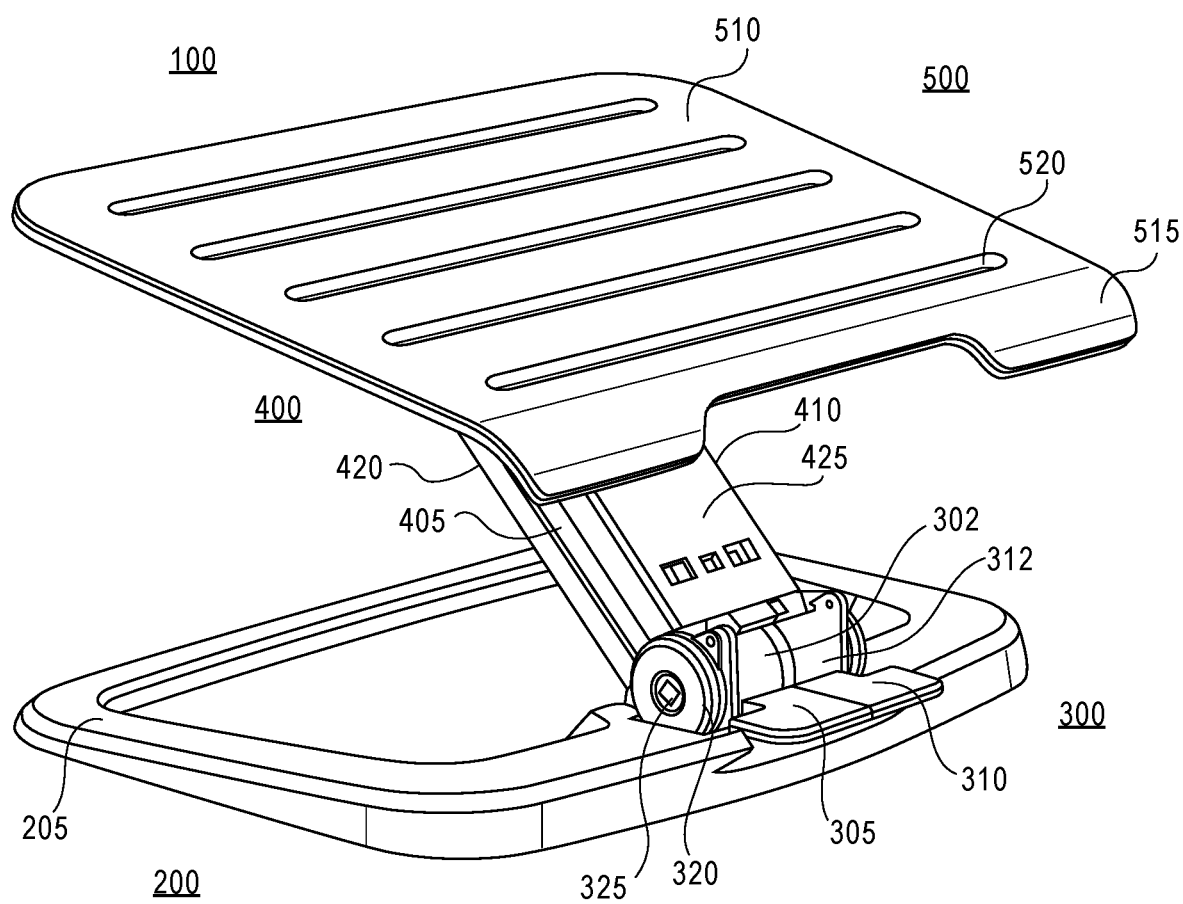
FIG. 7 is a front or operator's point of view perspective view of the Multi-Positional Articulating Ergonomic Device with Modular Features of the present invention.

In some embodiments as shown in FIG. 7, the device 100 is shown with footrest assembly 500 moveably coupled onto the articulating armature 400. Raising and lowering of the unit is controlled by actuation assembly 300, which includes machine screw 325 which allows the articulating armature 400 to be moveably attached to base assembly 200.

The actuation assembly 300 allows for a multitude of movement ranges which allows for example, a sitting range and a standing range. Between those set ranges, platform 510 can be moved with a downward force allowing the counter sprung articulating armature 400 to counter the force; this action allows and encourages the operator's legs to stretch, feet and ankles to move without having to constantly readjust the foot rest's height or spring tension. If too much force is exerted onto the armature 400 or footrest platform 510, actuation assembly 300 has a clutching safety feature to discourage using the footrest as a step.

Figure 8:
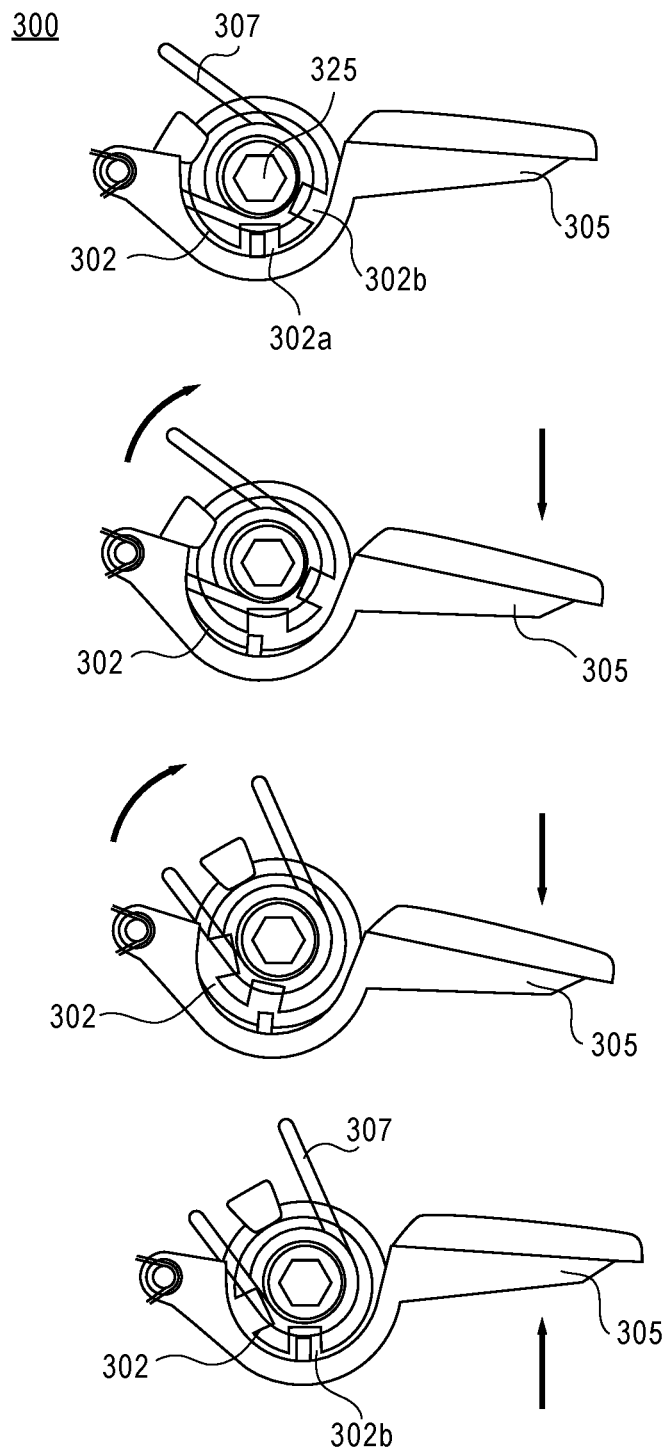
FIG. 8 is a series of sequential isometric side views of four diagrams of an actuation assembly sequentially illustrating how a rotational range controller functions.

FIG. 8 a simplified isometric side view of four figures of actuation assembly 300 sequentially illustrating how rotational range controller 302 functions. The top figure in the sequence of figures represents the assembly as it would be in the lowered position of two positions as represented in this embodiment; range controller 302 position notch 302a is engaged with actuation lever 305. Torsion spring 307 provides for additional range of motion within this position while exerting a counterforce when a rotational force is enacted on the rotational range controller.

In the next following sequential figure, actuation lever 305 is depressed, disengaging the actuation lever retainer detail from position notch 302a. In the next following sequentially lower figure, rotational range controller 302 has been rotated clockwise, placing position notch 302b above the retainer detail of actuation lever 305. In the next following sequential and lowest figure, position notch 302b is fully engaged and actuation lever 305 is returned to its raised non-depressed position. In this position, the assembly would be in the higher of the two positions with torsion spring 307 providing for additional range of motion within this position while exerting a counterforce when a rotational force is enacted on the rotational range controller.

This embodiment illustrates how the actuation assembly 300 with the range controller 302 actuates and controls the lower zone of movement of the device 100 as well as provide actuation and control in the upper ranges of movement as well. Even though in this embodiment, only two ranges are shown, additional positional notches could be implemented or removed to provide an assembly, such as an articulating support arm with multitudes of positions, ranges of movement with and without force feedback within those positions. One will recognize that there may be multiple ranges of motion, and that each range may be limited or defined by a separate range controller or range controller mechanism. For instance, if the embodiment were to have three ranges of elevation, each range may have its own range controller and may have its own spring, gas strut, or other biasing member and respective actuator to selectively provide counterforce.

Figure 9A:
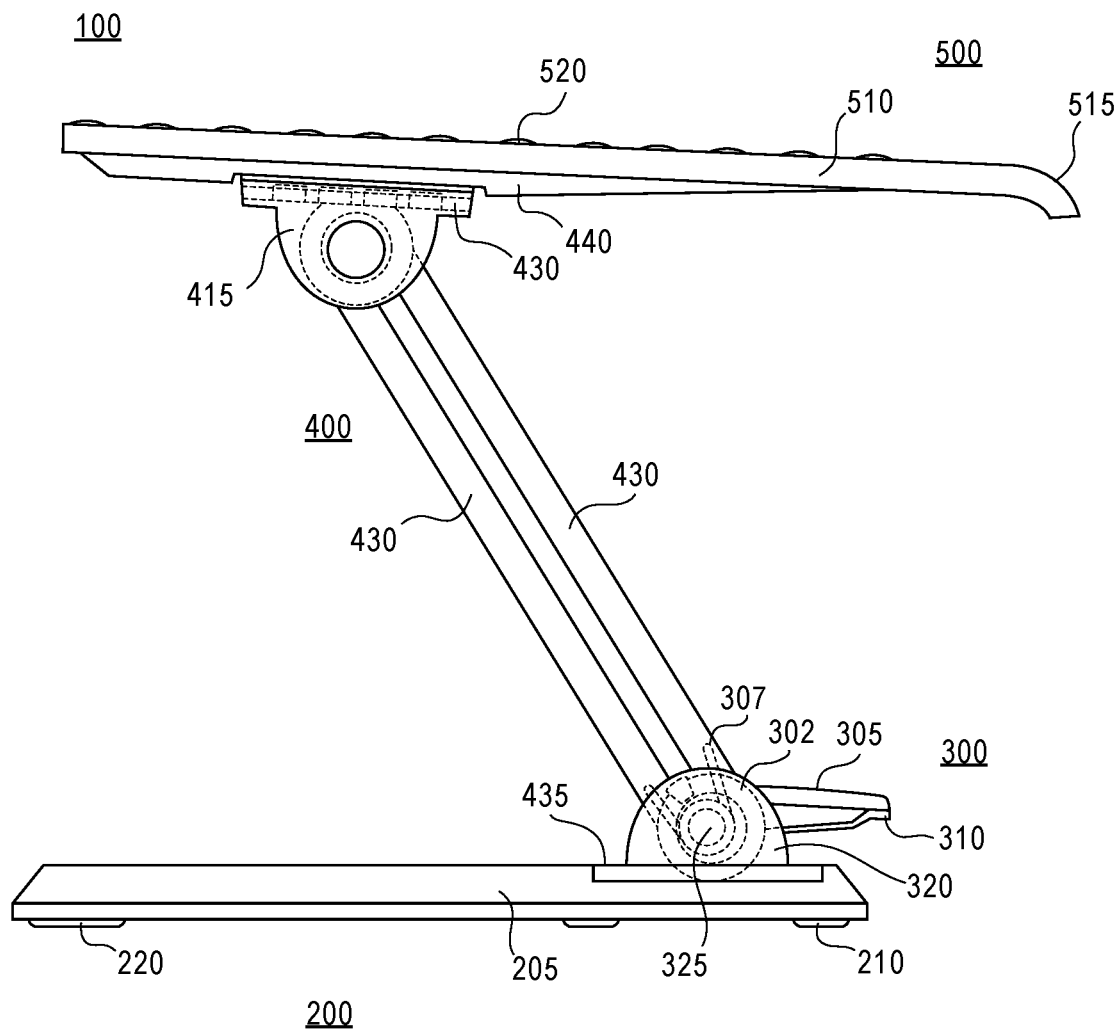
FIG. 9A is a simplified isometric side view showing a footrest embodiment of the present invention in its upper range of movement.
Figure 9B:
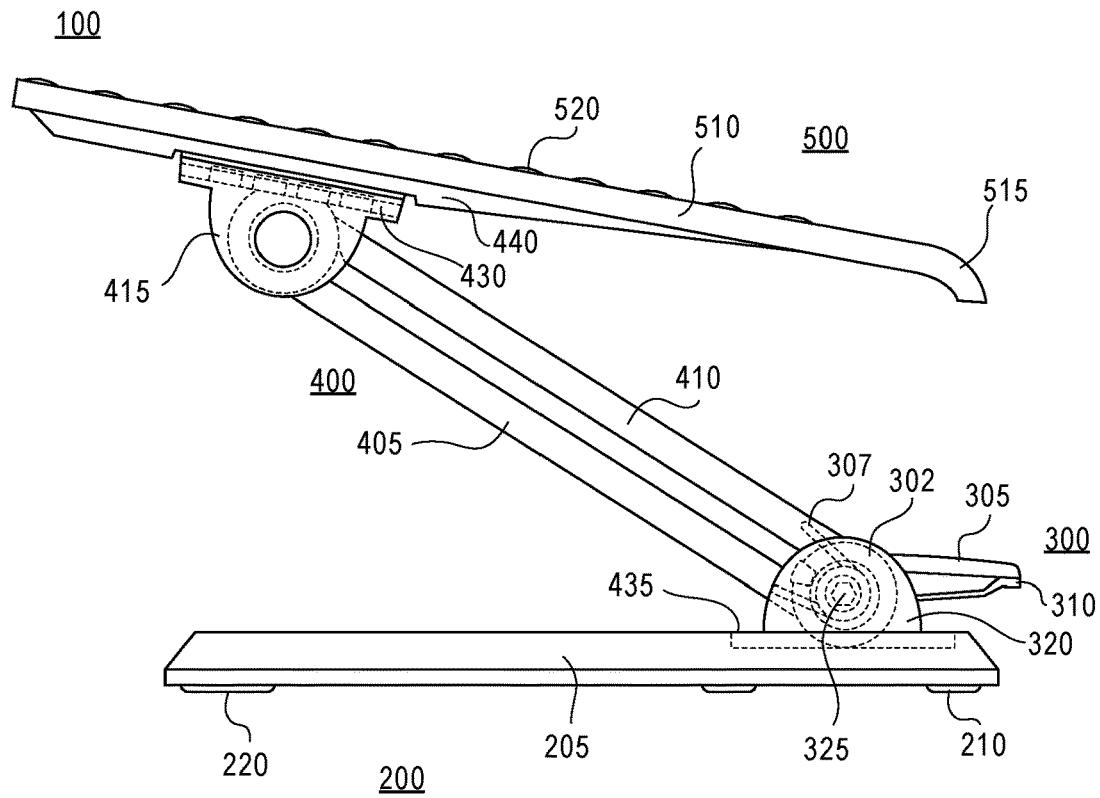
FIG. 9B is a simplified isometric side view showing a footrest embodiment of the present invention in an optional range of movement and the force feedback feature.

An exemplary upper range of movement for a footrest embodiment is shown in FIG. 9A and a lower range of movement is shown in FIG. 9B. This illustrates the optional range of movement and the force feedback feature within an upper movement range setting. For example, an operator would be in a standing position with one foot resting on the upper side of platform assembly 500. FIG. 9A represents the unit with little or no force or weight applied in the upper movement range setting. As weight is applied to footrest platform 510, upper armature 410 exerts force upon torsion spring 307 which acts as a counterforce to the applied force or weight. This counterforce allows the operator to interact with the footrest as to engage with the unit further by applying additional weight and/or additional force; these additional forces engage the torsion spring by way of the articulation armature 400 rotating the torsion spring further into its range of motion and when the additional forces disengage, counter rotating the torsion spring in response to the lessening weight or force. These actions allow platform 510 to stay engaged with the operator and move in direct response operator's actions in a way as to support not only the natural weight exerted onto the unit, but the additional forces exerted by the operator as to give way (platform 500 lowers) while pushing back (upwards) with a countering force by way of the articulating armature 400 and actuation assembly 300's torsion spring 307. This giving way and counterforce is intended to allow the operator to engage with the footrest platform 510 using more natural movements which stimulates the operator's joints and muscles versus a device which is more stagnant and rigid in form. While this example has the operator standing, the same action utilized while sitting as well. Further, the footrest may be used to allow a user to have a surface on which to place her feet, for example when sitting in a raised chair, or those whom need the higher setting for proper ergonomic positioning, or those whom want to interact with the footrest in a more active way.

Figure 10A:
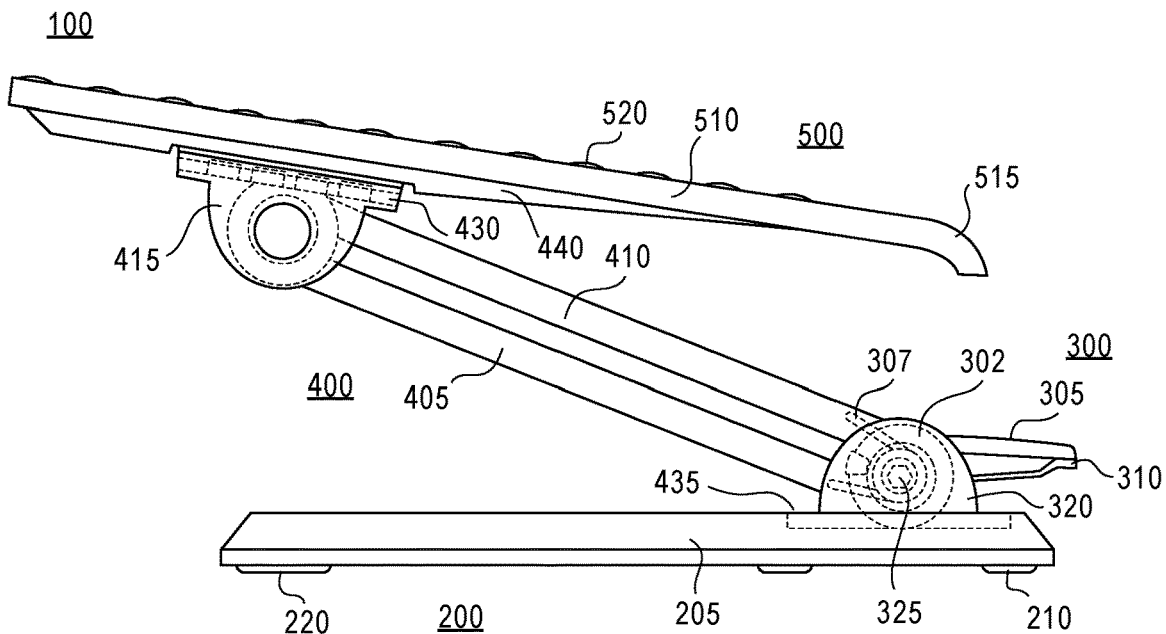
FIG. 10A is a simplified isometric side view showing the invention in the footrest embodiment in a lower movement range setting position, illustrating the optional range of movement and the force feedback feature.
Figure 10B:
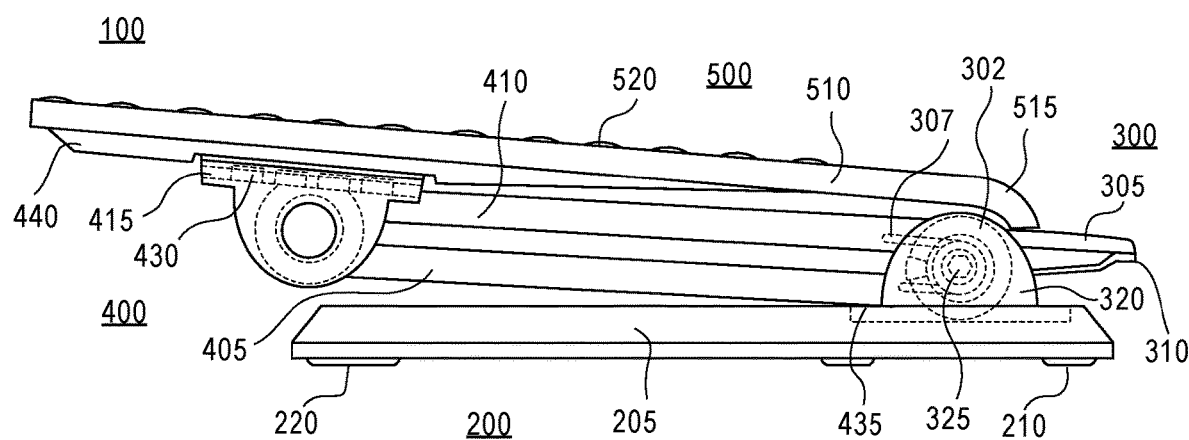
FIG. 10B is a simplified isometric side view showing the invention in the footrest embodiment in a lowest movement range setting position, illustrating the optional range of movement and the force feedback feature.

FIGS. 10A and 10B illustrate the invention in the footrest embodiment in the lower movement range setting position, illustrating the optional range of movement and the force feedback feature within that lower position setting. This lower position setting is representative of the invention in the embodiment of a footrest which is being used in the sitting position or a lower setting range for a standing position. Whereas the operator would be sitting in an office chair with either one or both feet resting on the upper surface of platform assembly 500 or may be standing with one foot resting on the platform in its lower movement range setting.

Figure 11:
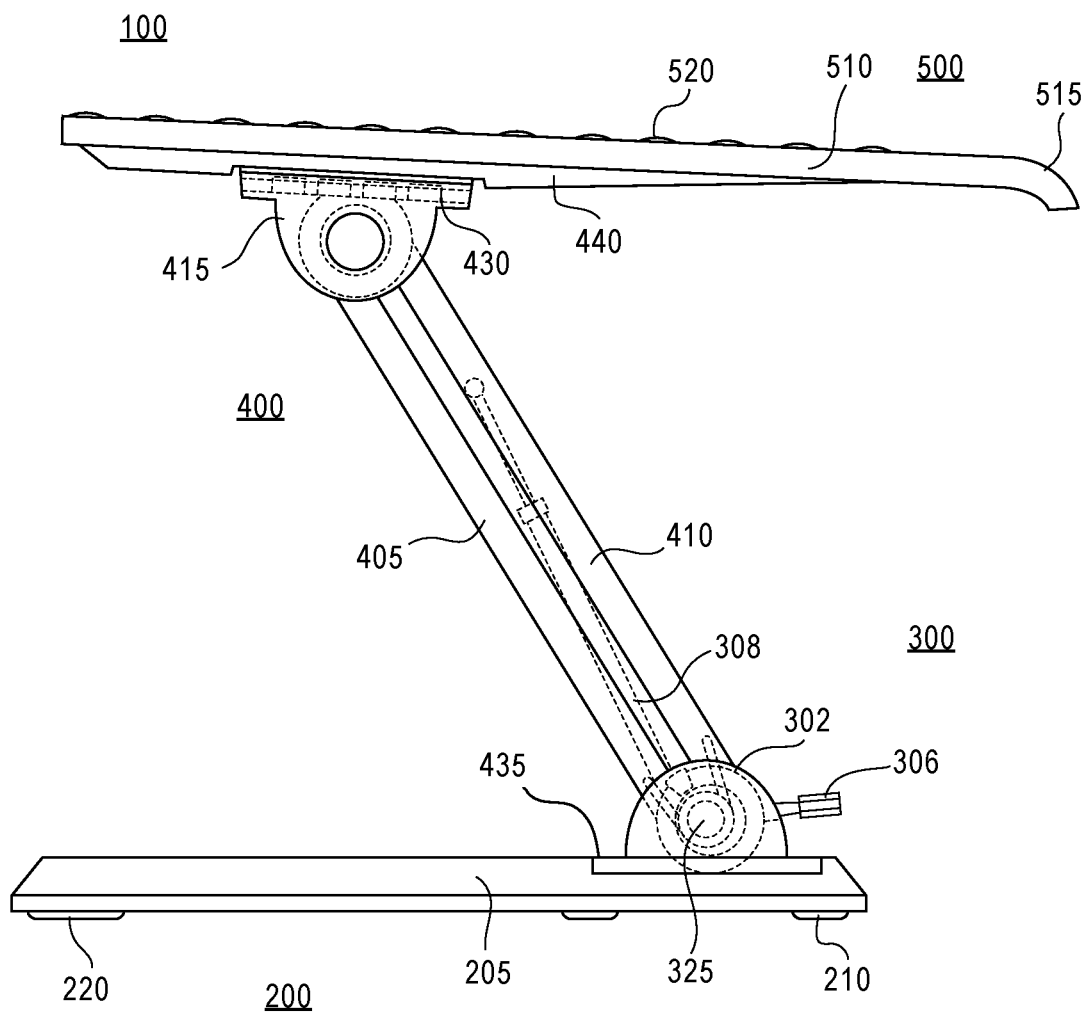
FIG. 11 is a simplified isometric side view, showing the invention in the footrest embodiment in the upper movement range setting position, illustrating the alternative use of a gas spring.

In some embodiments as shown in FIG. 11 the invention may in the alternative use a gas spring 308 moveably attached to upper four bar arm 410 and lower connection plate 417, in place of the torsion spring arrangement previously disclosed. The actuation assembly 300 includes actuator 306 which actuates the lowering and raising of the unit by depressing the gas spring's valve mechanism allowing the gas spring's 308 telescoping member to extended in the raising mode or be contracted in a lowering mode. This actuator 306 may include a force adjustment screw which adjusts the force exerted by gas spring 308 to ensure the proper countering force is exerted as to ensure the units functionality, which in this case, is the footrest embodiment. In other embodiments, the force setting required might be less or greater depending on how the unit is configured and how much force or weight is applied to the gas spring.

Figure 12A:
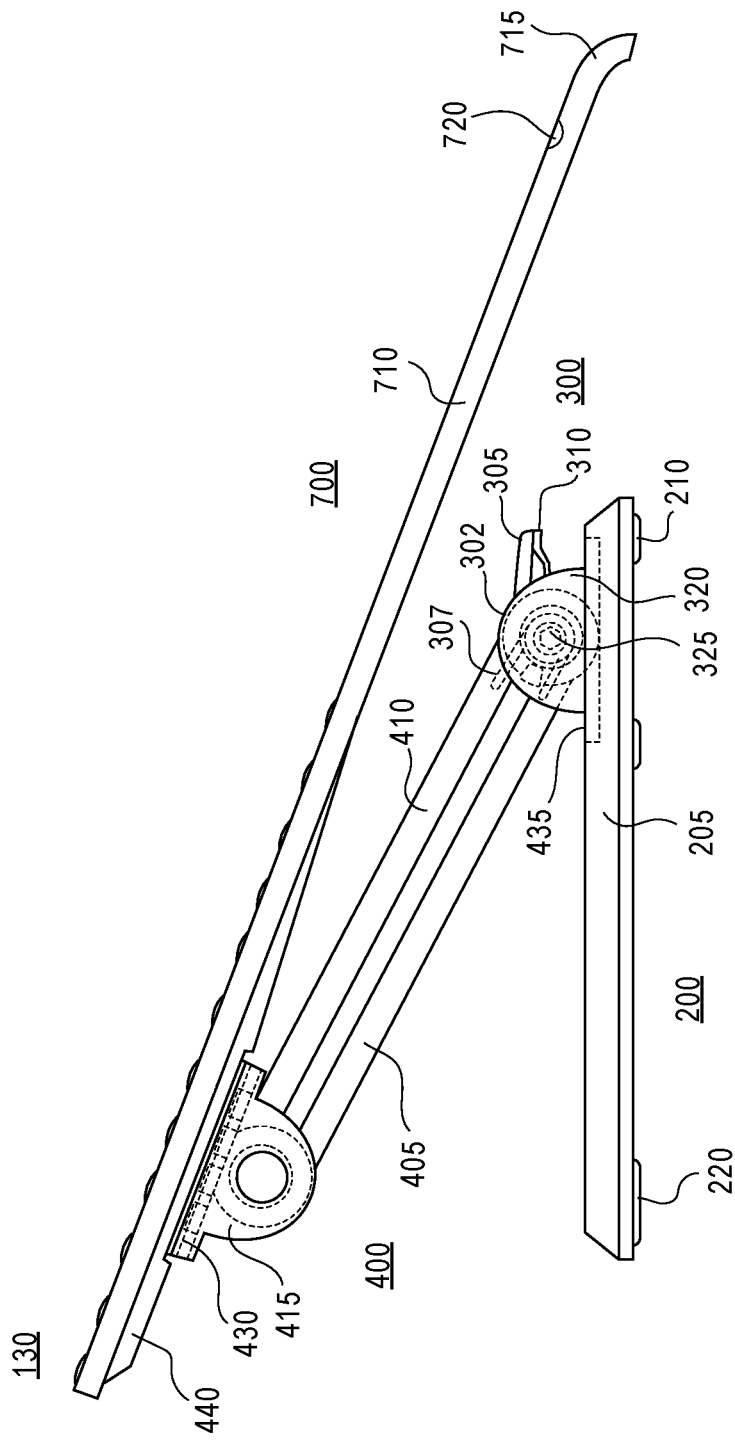
FIG. 12A is a simplified isometric side view showing the invention in the writing surface embodiment in a raised position.
Figure 12B:
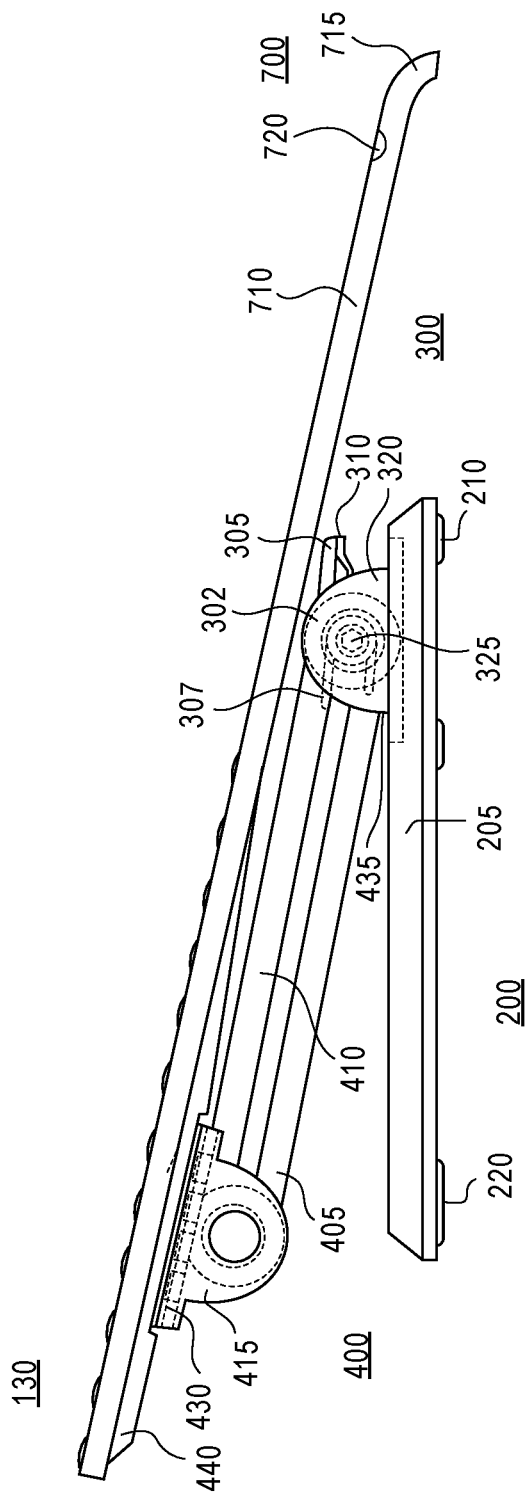
FIG. 12B is a simplified isometric side view showing the invention in the writing surface embodiment.

In some embodiments the device may include a writing surface as illustrated in FIGS. 12A and 12B. FIGS. 12A and 12B illustrate the invention in the writing surface embodiment in the raised and lowered configuration respectively. FIGS. 12A and 12B show the commonly shared base assembly 200, armature actuation assembly 300 with the articulating armature assembly 400 is in a raised position. This raised position allows writing surface 700 to be at a greater slope as compared to the surface in which the unit rests.

In some embodiments writing surface 700 can be pivoted in the plane of the writing surface 700 by way of upper and or lower rotational bearing 430 and 435 respectively. Typical writing surfaces do not have the ability to rotate as to accommodate right-hand or left-hand orientation thus making this configuration much more conducive to answering the ergonomic needs of such a device.

Writing surface 700 is shown with writing instrument holder 720 and resting edge 715 which is sloped as to accommodate a transition for the wrist and a contact point as to ensure stability if one would lean against the surface. FIG. 12B represents the writing surface embodiment in the lowered configuration, whereas actuation lever 305 has been utilized to allow the unit's writing surface 700 to reside lower and therefor at a less angle as compared to the surface the unit is resting upon.

FIGS. 13A-F illustrate embodiments of the invention in a monitor arm embodiment in the raised and lowered configuration along with a more detailed view of an optional sliding connector. FIGS. 18-42 also show features of the inventions disclosed herein that may be used in monitor arm assemblies. On skilled in the art will recognize that monitor arm assemblies may include joints that rotate in the vertical plane as well as joints that rotate in the horizontal plane. The teachings of the inventions herein may be used in many monitor arms, and not limited to the specific embodiments shown herein. Further, the teachings throughout this disclosure may be used in other devices and assemblies.

In FIGS. 13A-F, modular monitor arm assembly 700 is coupled to articulating armature 720 which is coupled to connection plate 440 and to the rest of the unit, including articulating armature assembly 400, actuator assembly 300 and base assembly 200 allowing for a monitor arm configuration to rest upon a surface in this configuration. In other configurations base assembly 200 can be replaced by a desk or table clamp system if desired.

Armature 720 can be constructed similarly to articulating armature assembly 400 using an articulating four-bar mechanism or can be of a simpler construct of being slidably attached to upper connection plate 440 as to allow monitor 750 to move away from and towards the operator. Along with the optional slidable attachment means, articulating connection plate 415 and monitor connection plate 710 allow for pivotal and optionally rotational movement. The pivotal articulating connection plate allow the monitors viewable area to be articulated in an upwards, downward, in and out, as well as pivotal movements.

Figure 13A:
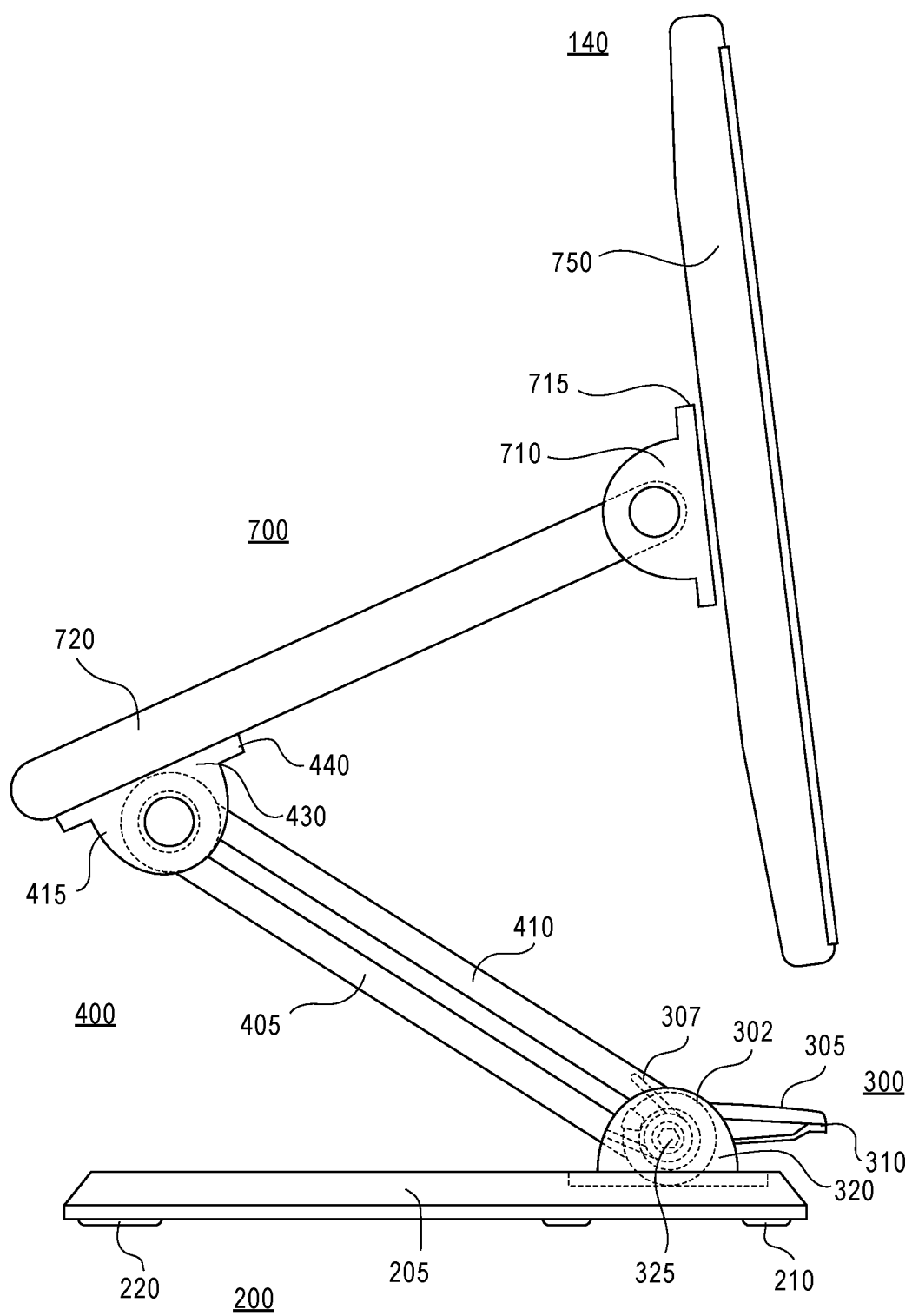
FIG. 13A is a simplified isometric side view showing the invention in the monitor arm embodiment in a lowered configuration.
Figure 13B:
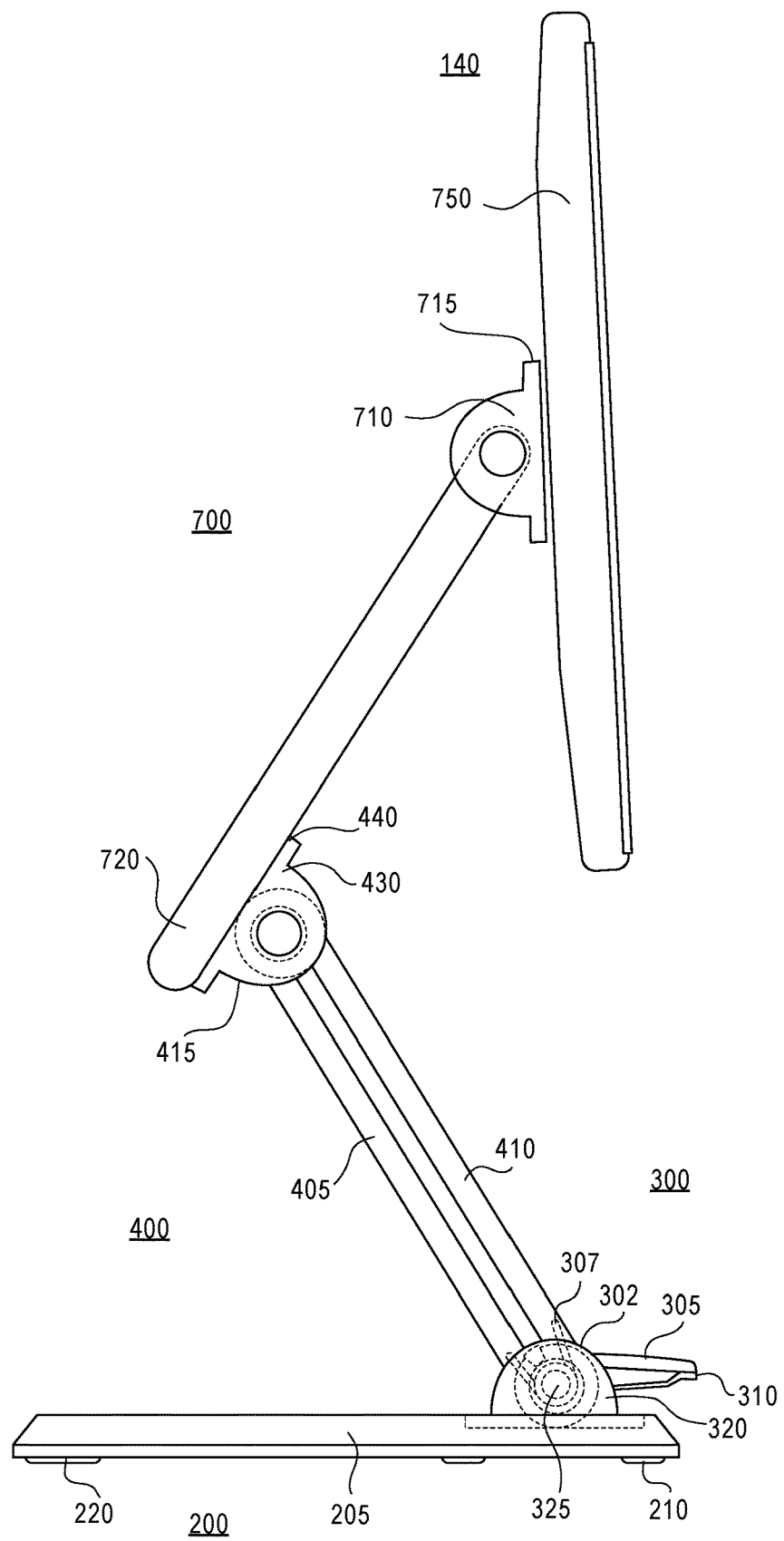
FIG. 13B is a simplified isometric side view showing the invention in the monitor arm embodiment in a raised configuration.
Figure 13C:
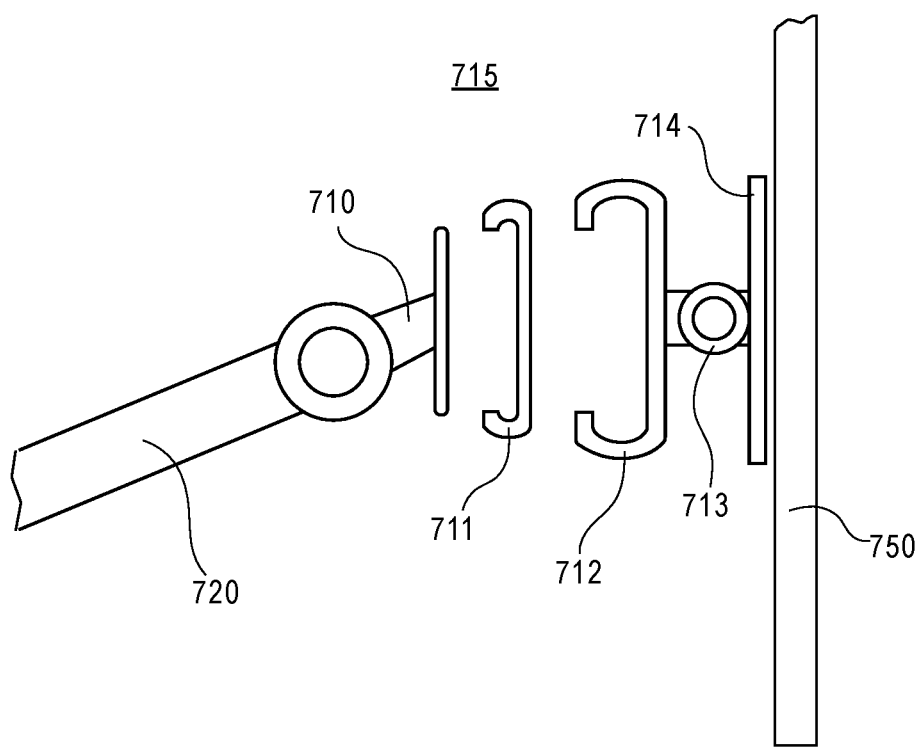
FIG. 13C is a simplified partial exploded side detailed view of the optional slider connector of the monitor arm embodiment.
Figure 13D:
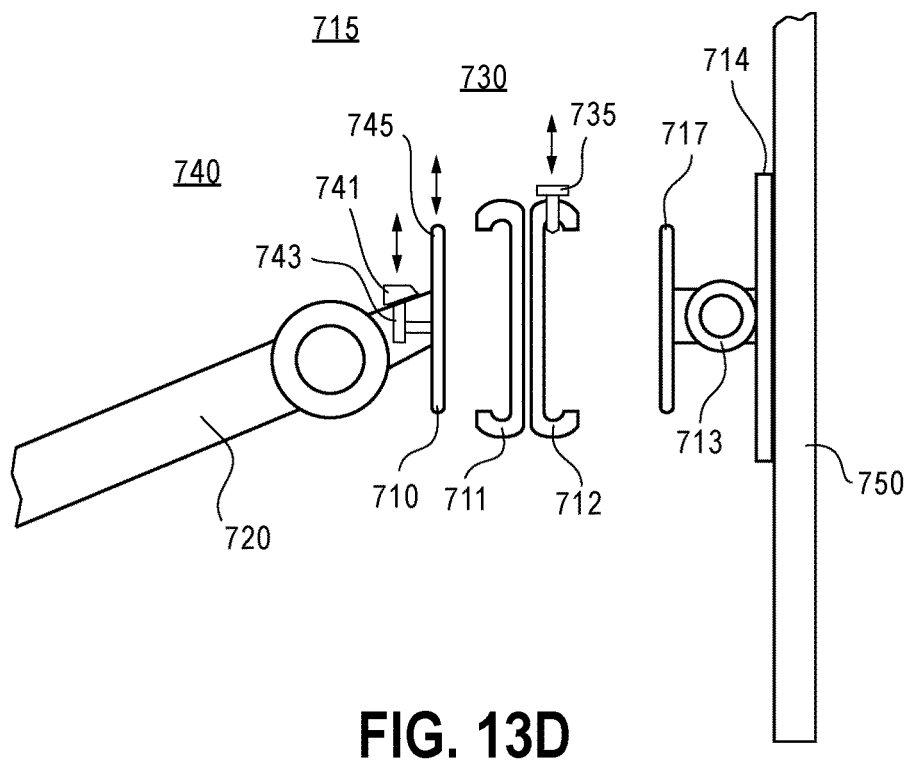
FIG. 13D is a simplified partial exploded side detailed view of the optional slider connector of the monitor arm embodiment.

FIG. 13B shows the modular monitor arm assembly in a raised position. FIG. 13C shows the optional slider connector 715 assembly which would allow the monitor 750 to be adjusted in a side to side movement and or when pivoted ninety degrees, in an up and down rotational movement by way of articulating pivot connector 713 as well. The slider connector assembly 715 can have a multitude or plurality of tracks, as shown with exemplary slide track 711 and slide track 712, in which the connection plate 710 and monitor 750 would then be slidably connected to slide side to side with each connection plate being independently slid if desired. Knurl knobs or Allen wrench screws or other selectively releasable mechanisms are utilized to lock the slidable connection plates in the desired locations, or free them for adjustment.

In some embodiments as shown in FIGS. 19-31, the slider connector assembly may include a connection plate 710 slidably captured by a first slide track 711 in a slidable relationship in a lateral direction L. One skilled in the art will recognize that the lateral or side to side direction is with reference to the connection plate 710. As oriented in the figures, the lateral direction L may be considered side to side. When the connection plate 710 is reoriented 90 degrees, the direction may be considered up U and down D or top and bottom.

The connection plate 710 may include a first face 7101. The first face opposes or faces the first slide track 711 in the assembled device. The first slide track may include a first face 7111. The first slide track first face 7111 faces or opposed the connection plate 710.

The connection plate 710 and the first slide track may be coupled to each other in a sliding relationship. The connection plate is generally a rectangular plate. In some embodiments, the connection plate includes perimeter edges 7105 and 7106. The perimeter edges are generally parallel to each other. In some embodiments, the perimeter edges are tapered. In some embodiments, the perimeter edges 7105 and 7106 are shaped to be complimentary to perimeter channels 7115 and 7116 on the first slide track 711. The coupling of the perimeter edges and the perimeter channels couple or capture the connection plate 710 and first slide track 711 is a sliding relationship.

In some embodiments, the connection plate first face 7101 includes a first guide channel 7103 and a second guide channel 7104. The first and second guide channels may be parallel to the perimeter edges 7105 and 7106. The first slide track first face 7111 may include protrusions or other opposing structures to engage the first and second guide channels 7103 and 7104. Such other structures may include fasteners placed through apertures in the first slide track 711. The protrusions may be shaped complementary to the first or second guide channel so as to be captured by the guide channels and allow the first slide track 711 to slide laterally with respect to the connector plate 710, but restrained in directions normal to the opposing faces of the connector plate 710 and first slide track 711, as noted by direction N. The first and second guide channels may also accept the protrusions without capturing them to resist movement in the N direction. In any embodiment, the guide tracks and protrusions may assist in bearing weight in a downward direction to reduce the downward load and sliding resistance on any individual channel, guide, or sliding component. The first slide track 711 may be translated with respect to the connector plate 710. In some embodiments, the protrusions or apertures or other structures are located within the perimeter channels 7115 and 7116.

Figure 30:
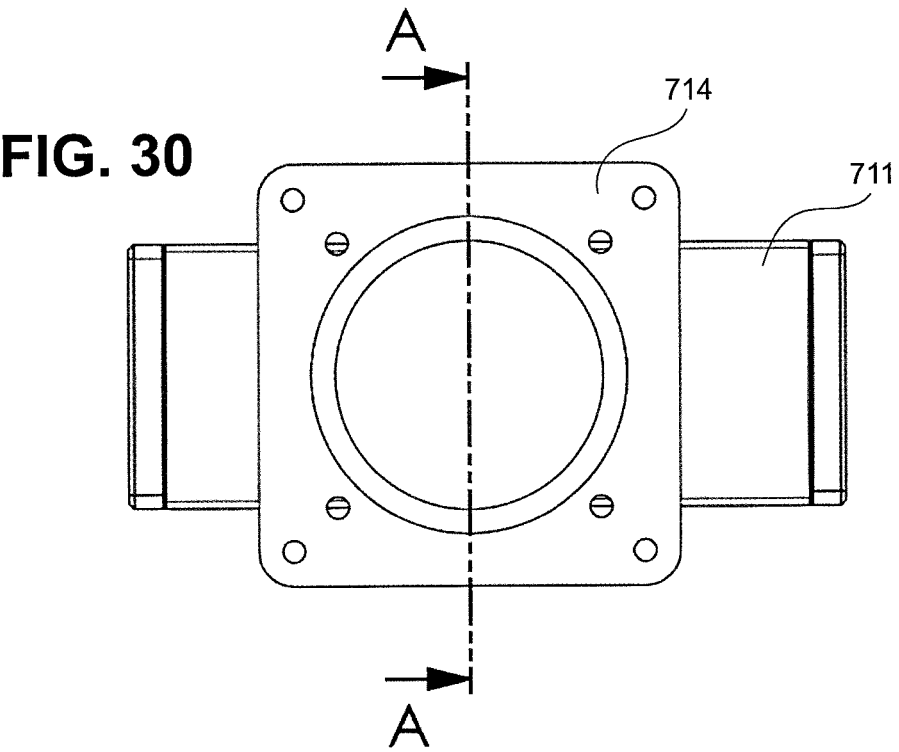
FIG. 30 is a front elevational view of the monitor bracket, actuator, and slide assembly of FIG. 29.
Figure 31:
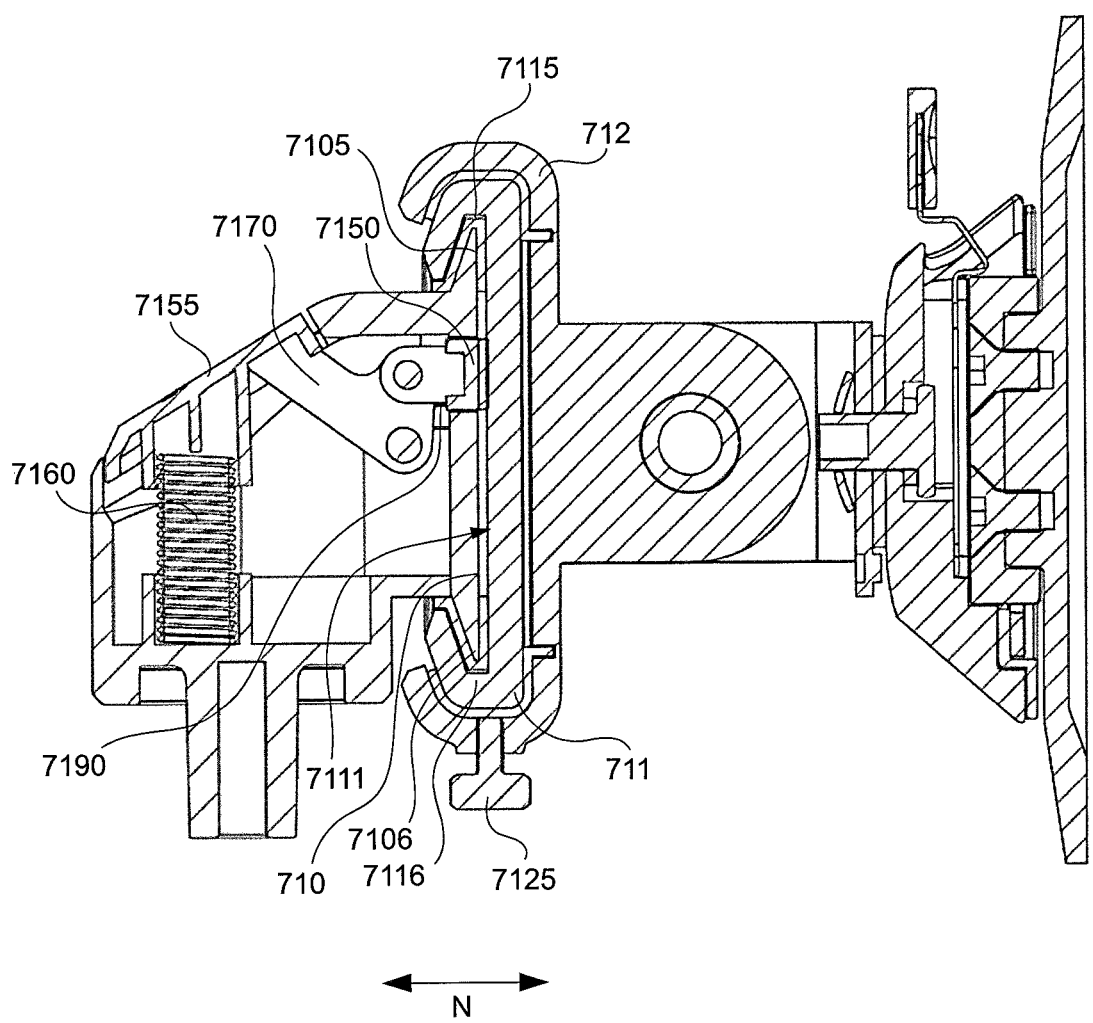
FIG. 31 is a cross sectional side elevational view of the assembly of FIG. 30.
Figure 32:
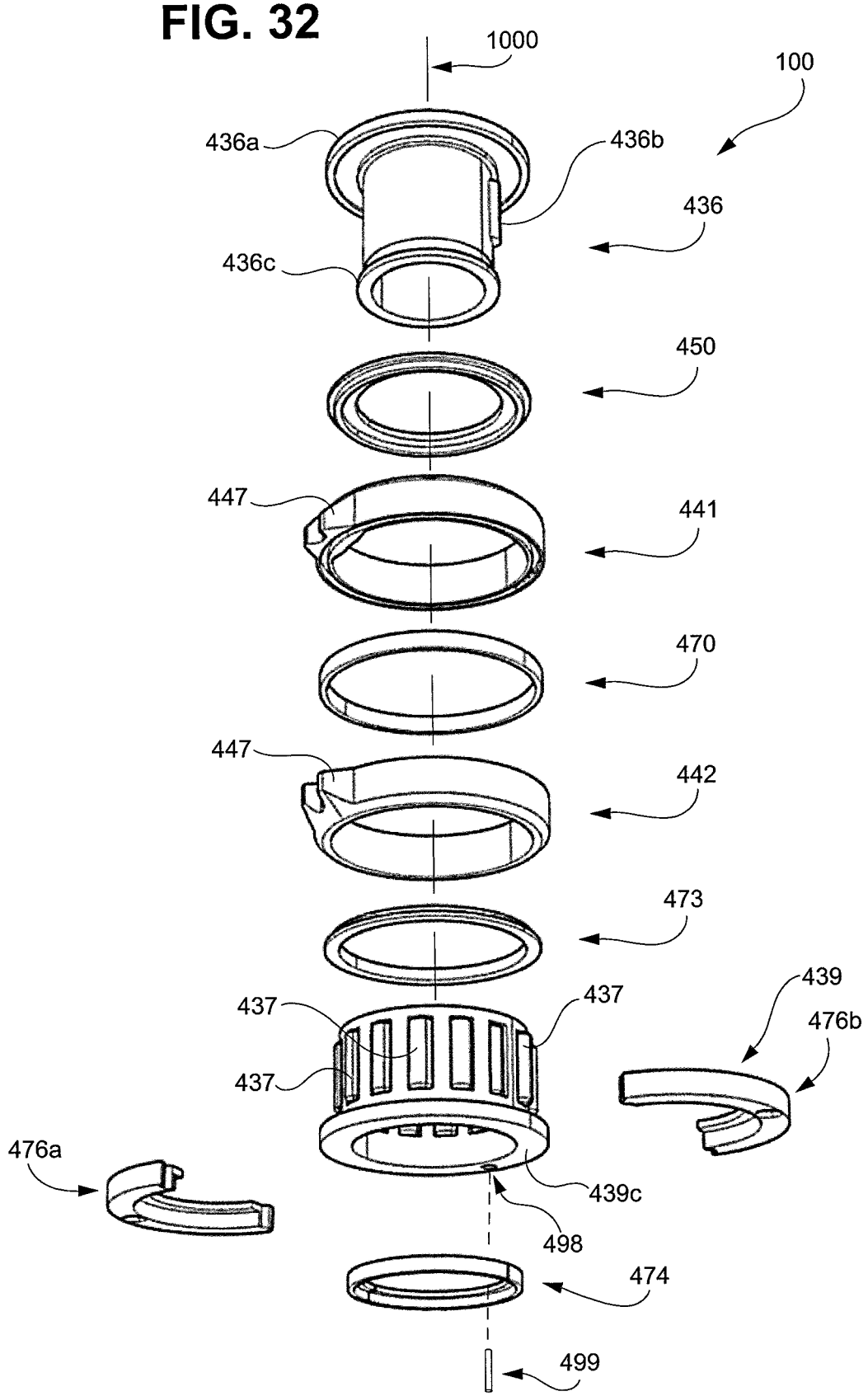
FIG. 32 is an exploded view of a rotation limiter of the present invention.
Figure 33:
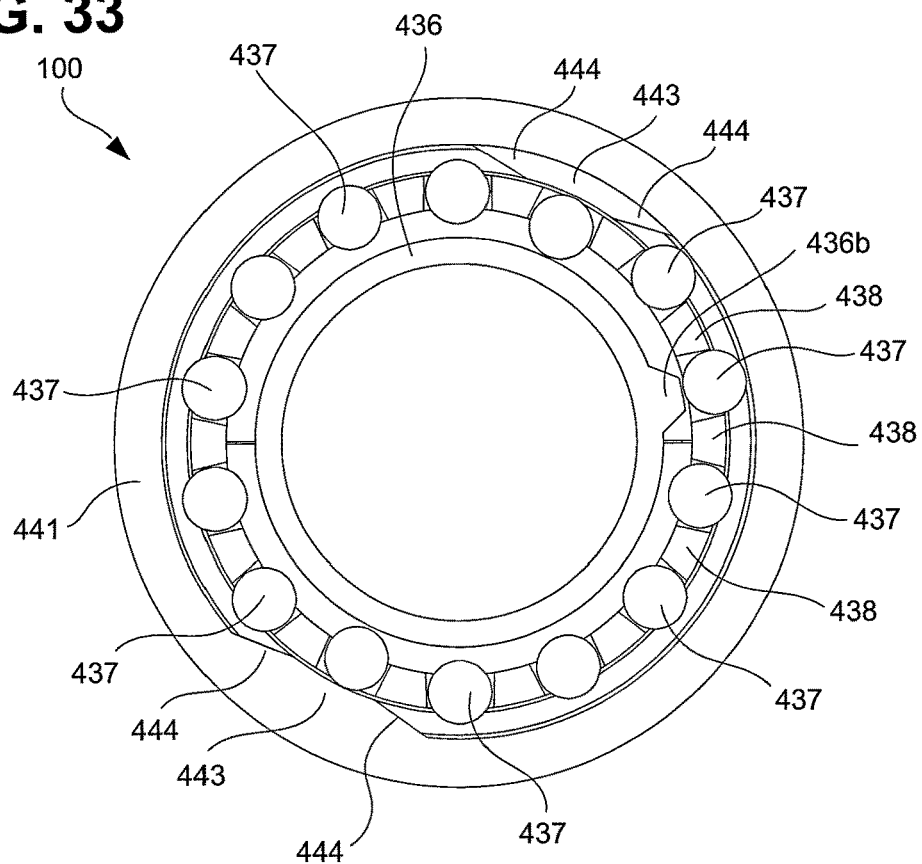
FIG. 33 is a top sectional view of the assembled rotation limiter of FIG. 32.
Figure 34:
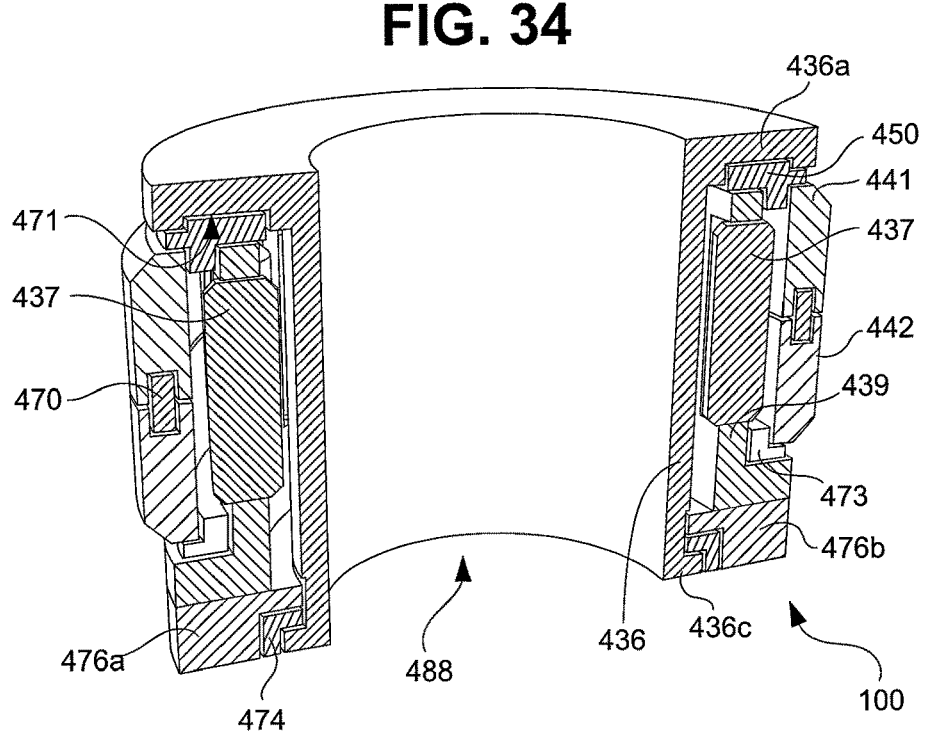
FIG. 34 is a side perspective sectional view of the assembled rotation limiter of FIG. 32.
Figure 35:
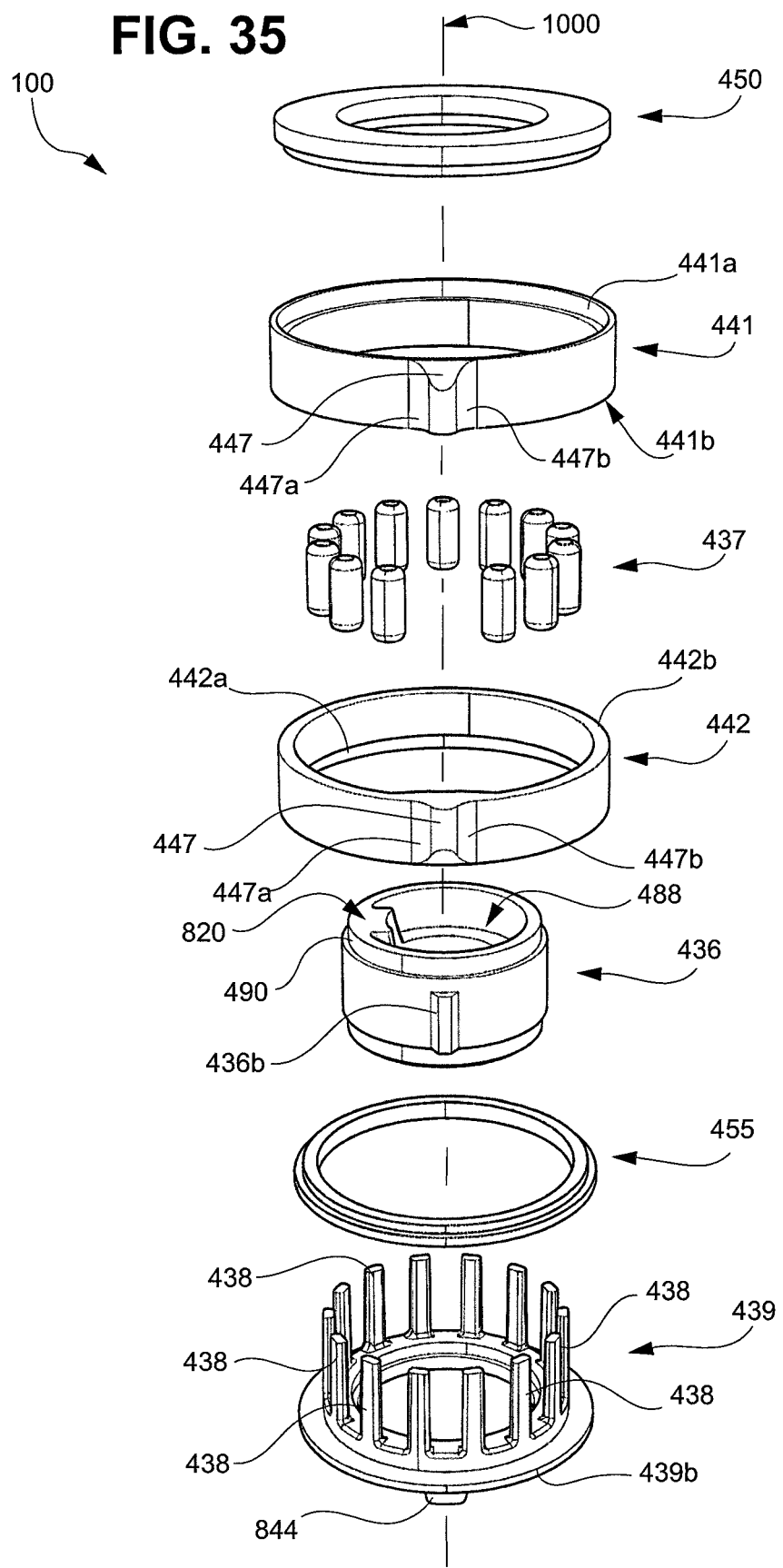
FIG. 35 an exploded view of another embodiment of rotation limiter of the present invention.
Figure 36:
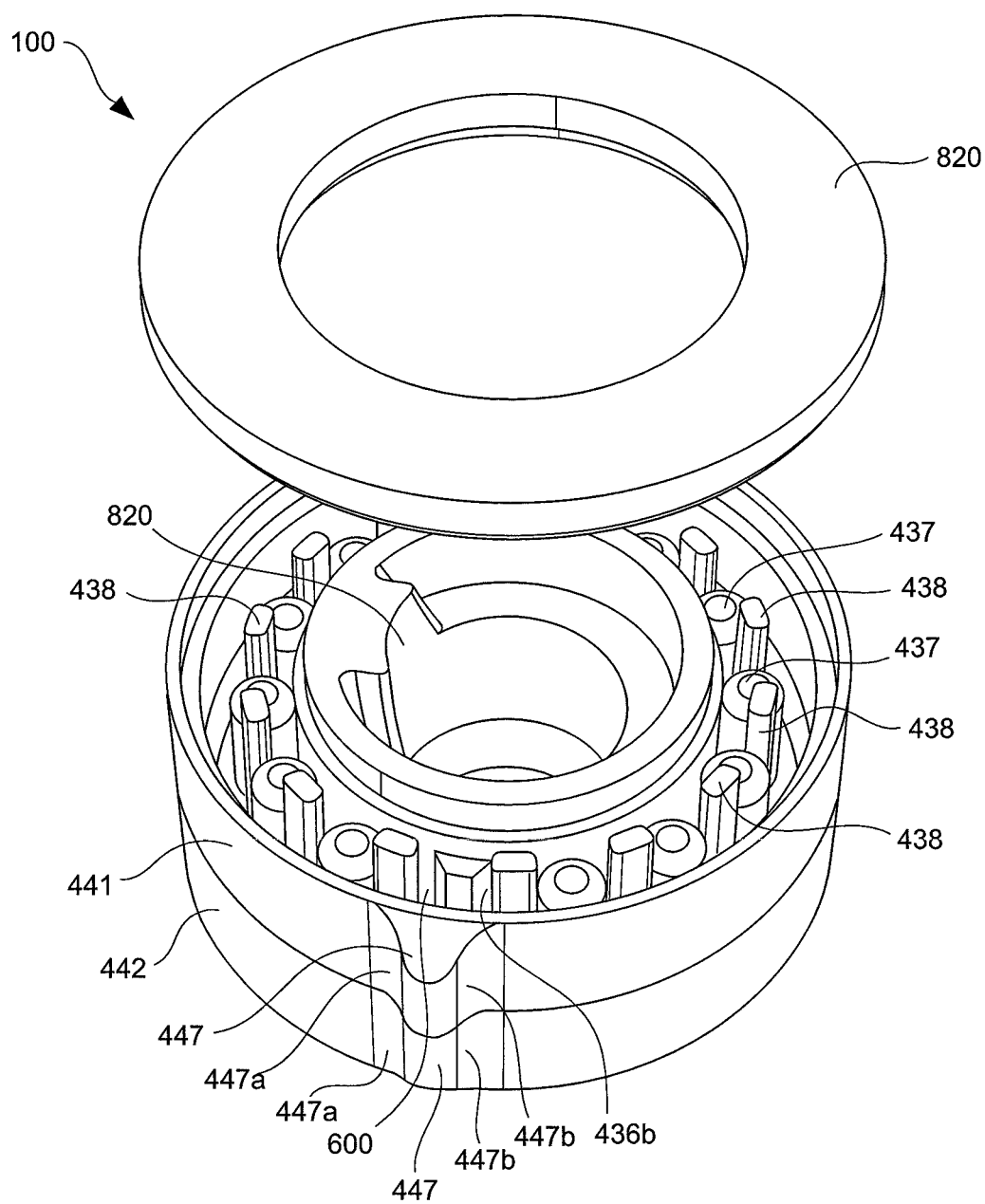
FIG. 36 is a top perspective view of the rotation limiter of FIG. 35, with the top bushing removed.

In some embodiments, the sliding relationship between the connection plate 710 and the first slide track 711 is controlled by a skid or brake 7150, shown in cross-section in FIG. 30. The brake 7150 may be connected to an actuation mechanism, including an actuator or button 7155, a spring 7160, and a linkage 7170. The spring 7160 may bias the button 7155 in a position flush with a housing attached to the connection plate 710. The spring 7160 may also bias the brake 7150 in an activated position wherein the brake is in contact with the first slide track 711. The brake may be in contact with the first face 7111 of the first slide track 711 to prevent movement of the first slide track 711 relative to the connection plate 710. In some embodiments, the brake may extend and retract from an aperture 7190 in the connection plate 710.

In operation, movement of the button 7155 against the bias of the spring 7160 moves the linkage 7170 about a pivot, withdrawing the brake from contact with the first face 7111 of the first slide track 711. Release of the button 7155 allows the bias of the spring 7160 to return the linkage 7170 and the brake 7150 to the engaged position. While the brake 7150 is disengaged, the user may move the slide track 711 to a desired position before returning the brake 7150 to the engaged position.

In some embodiments, the perimeter channels 7115 and 7116 are a truncated V shape. In other embodiments they may be of any shape that allows capture or restraint of the connector plate 710 in the N direction. The perimeter channels may also allow translation movement of the connector plate 711. One wall of the perimeter channels may extend from the first perimeter channel 7115 to the second perimeter channel 7116. Put another way, one of the walls of the perimeter channels are a portion of the first slide track first face 7111. The perimeter channels 7115 and 7116 run in the L direction.

In some embodiments, the first slide track 711 and the connector plate 710 are of the same lateral width. Put another way, the first slide track 711 and connector plate are generally of the same dimension or width in the L direction.

The first slide track 711 may be connected to another assembly as an application may see fit, such as a pivot connector, plate, or other assembly to allow the connection of a monitor. A simple bracket to attach the monitor may also be used if a pivoting arrangement is not desired. Other assemblies or objects may also be directly attached to the first slide track 711.

In some embodiments, a second slide track 712 is coupled to the first slide track 711. The second slide track 712 includes a second slide track first perimeter channel 7121 and a second slide track second perimeter channel 7122. The second slide track perimeter channels 7121 and 7122 are shaped to fit over and capture the first slide track 711 in a slidable relationship. The fit or tolerance will allow the second slide track 712 to move laterally in the L direction but to be restrained in movement in the N direction. The interior shape of the first and second perimeter channels 7121 and 7122 of the second slide track 712 may be complementary of the exterior shape of the first and second perimeter channels 7115 and 7116 of the first slide track 711.

The second slide track 712 may be coextensive with the first slide track 711 in the L direction. In other embodiments, the second slide track 712 may be shorter in the L direction. The first and second perimeter channels 7121 and 7122 may be continuous or discontinuous.

In some embodiments, the first slide track 711 has a second face 7112. The second face 7112 may be considered the exterior, outer, or back surface of the first slide track 711. The second face 7112 may face away from the connector plate 710. The second face 7112 opposes the interior, inner, or front surface of the second slide track 712.

In some embodiments, the second slide track 712 may include an adjustment mechanism 7125 to allow the movement of the second slide track with respect to the first slide track 711 to be selectively fixed or limited. In some embodiments, the mechanism may be a set screw. Other mechanisms as described or shown in the figures may also be used.

FIG. 13D and FIGS. 23-27 illustrate an alternate embodiment of the optional slider connector 715 assembly with an exposed adjustment mechanism which would allow the monitor 750 to be slidably adjusted and limited. The slider connector assembly 715 in this embodiment having a multitude of tracks, slide track 711 and slide track 712 are configured to be back to back, in which the connection plate 710 and monitor mounting plate assembly connector 717 would then be slidably connected to slide side to side independently within the corresponding slide tracks. The multitude of slide tracks allow the sliding movement to be sequential in nature and as to take up less room than having to utilize the same amount of movement in a single-track arrangement.

Knurl knobs or Allen wrench screws or other selectively releasable mechanisms may be utilized to control the sequential movement and or lock the slidable connection plates in the desired locations depending on how the operator has set the resistance mechanism settings. In this particular embodiment two adjustment methods are shown, adjustment 730 which utilizes but not limited to, a threaded insert screw into slide track 712 as a means to apply force onto plate connector 717 to impede its side to side or lateral movement; the other is adjustment 740 which utilizes a depressible actuator 741 with spring 743 biasing resistance skid 745 to apply force in unison with connector plate 710, traveling within slide track 711 to impede its side to side movement. Both adjustment mechanisms 730 by way of the adjustment knob or screw and 740 by way of adjustment knob or screw compressing the force spring 743 as to exert more force are exemplary of ways to regulate the force needed to sequentially control the lateral sliding movement with the tracks 711 and 712. Other methods to create hard stops can utilize such as an engagement pin registering into a hole or notch or any number of other similar methods if detent registrations and hard stops are desired.

Figure 13E:
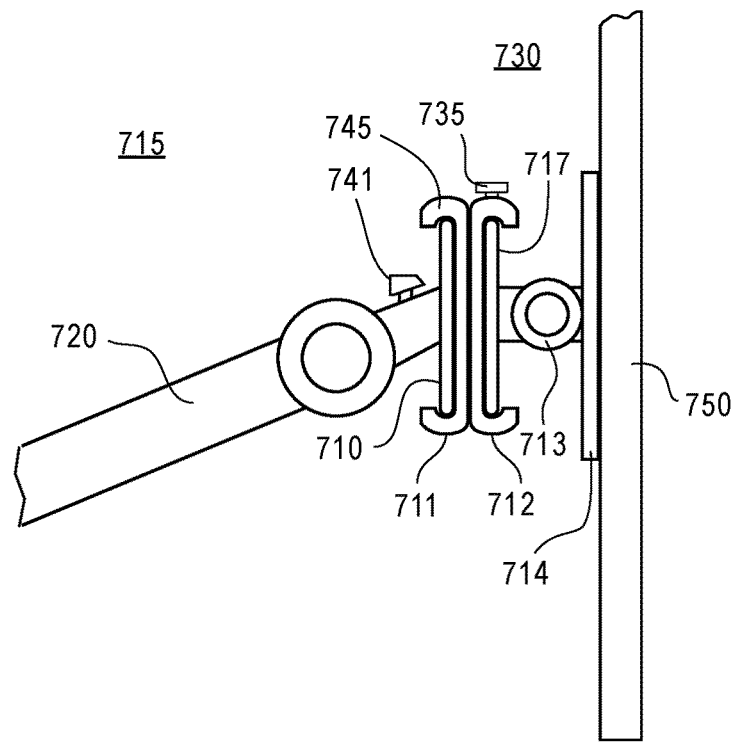
FIG. 13E is a simplified side detailed view of the optional slider connector of the monitor arm embodiment.

FIG. 13E is a simplified isometric side view of the previous exploded view in the assembled form with both exemplary adjustment mechanisms 730 and 740 are shown. One or the other method can be used interchangeably and with the addition of added detents and hard stops.

Figure 13F:
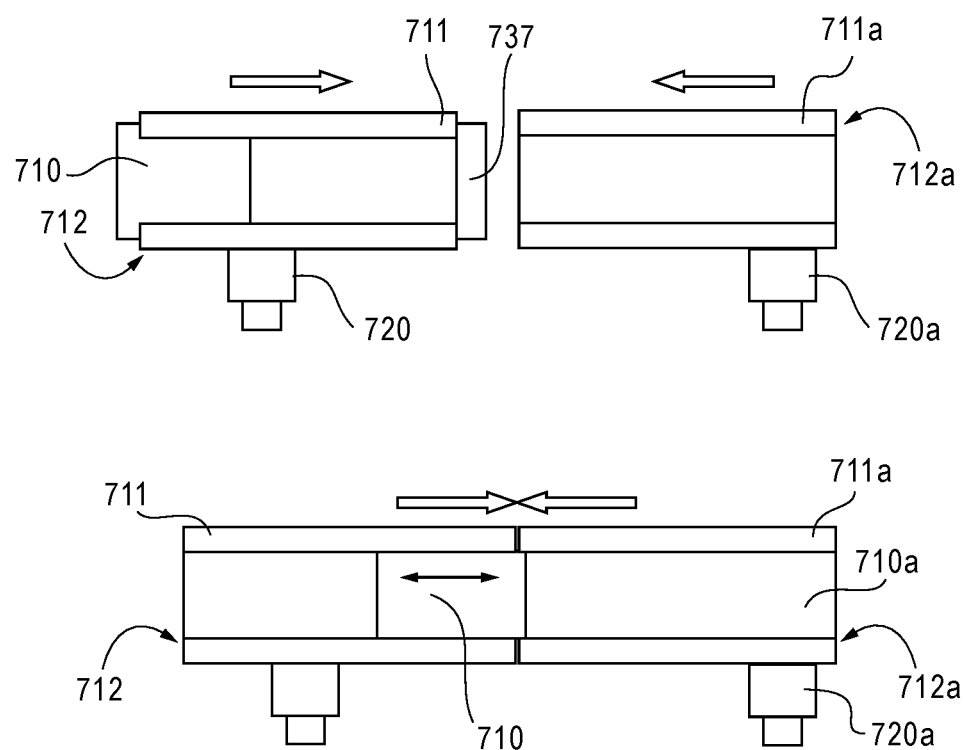
FIG. 13F is a simplified isometric front view showing how two slider assemblies may be connected.

FIG. 13F and FIGS. 43 and 44 illustrates a front view showing two of the aforementioned slider assemblies being connected by the use of connector 737. One skilled in the art will recognize that the components designated with "a" are duplicate components in the connected assembly, such as first slide track 711 in one assembly and 711a in the second assembly. On skilled in the art will also recognize that the assemblies being joined do not need to the same or have one to one correspondence of components. A two slide track assembly may be connected to a single slide track assembly, etc. For purposes of discussing the figures they may be referred to as left and right slider assemblies. For example, the connector 737 may be used with the single slide track embodiment in FIG. 13C, or with the back to back embodiments of FIGS. 13D and 13E. However when used with the single slide track embodiment, or a back to back slide track arrangement, the connector plate 710 will not be able to slide to the adjacent slider assembly, as the connector 737 or slide track connector, will be in the way. Such an embodiment is shown in FIGS. 43 and 44. However such embodiment would allow a second slide track that fits over a first slide track, such as that shown in FIG. 13C to be used, and to transit from one adjacent first slide track to the other. Such is the case in FIGS. 43 and 44, where the second slide tracks 712 and 712a may slide onto adjoined or connected first slide tracks 711 and 711a.

When used with the back to back embodiment, the connector 737 may be placed in one of the slide tracks, such as the second track 712 or the slide track facing away in the FIG. 13F, while the connector plate 710 for the arm assembly may be placed in the other of the back to back slide tracks. In FIG. 13F, the connector plate 710 is placed in the nearer of the back to back tracks. Due to the plurality of slide tracks, the tracks can be interconnected by way of a connection plate such as the one illustrated, connector 737 which is partially slid into slide track 711 (rearward of track 712 shown) of both the right and left assemblies as shown. The interconnected tracks allow plate connector 737 to slide from the left assembly to the right and anywhere in-between. Since the connector 737 may also slide within the slide tracks into which it is inserted, the slide tracks may be spaced apart, as shown in FIGS. 43 and 44, or in contact as shown in FIG. 13F. This type of joined configuration has the advantages of creating both a single, double (as shown in FIGS. 43 and 44), and larger articulating monitor arm assembly, but also allows these assemblies to interconnect and work in unison for easer adjustments and proper ergonomic articulation. Another stated advantage is the ability to offer a hybrid type of monitor arm system which can stand freely and as the user's needs progress, move towards the advantages of a track based multi-monitor support system without having the operator completely change out their existing system giving them an entire range of executable configurations never offered in this type of product line.

Figure 14A:
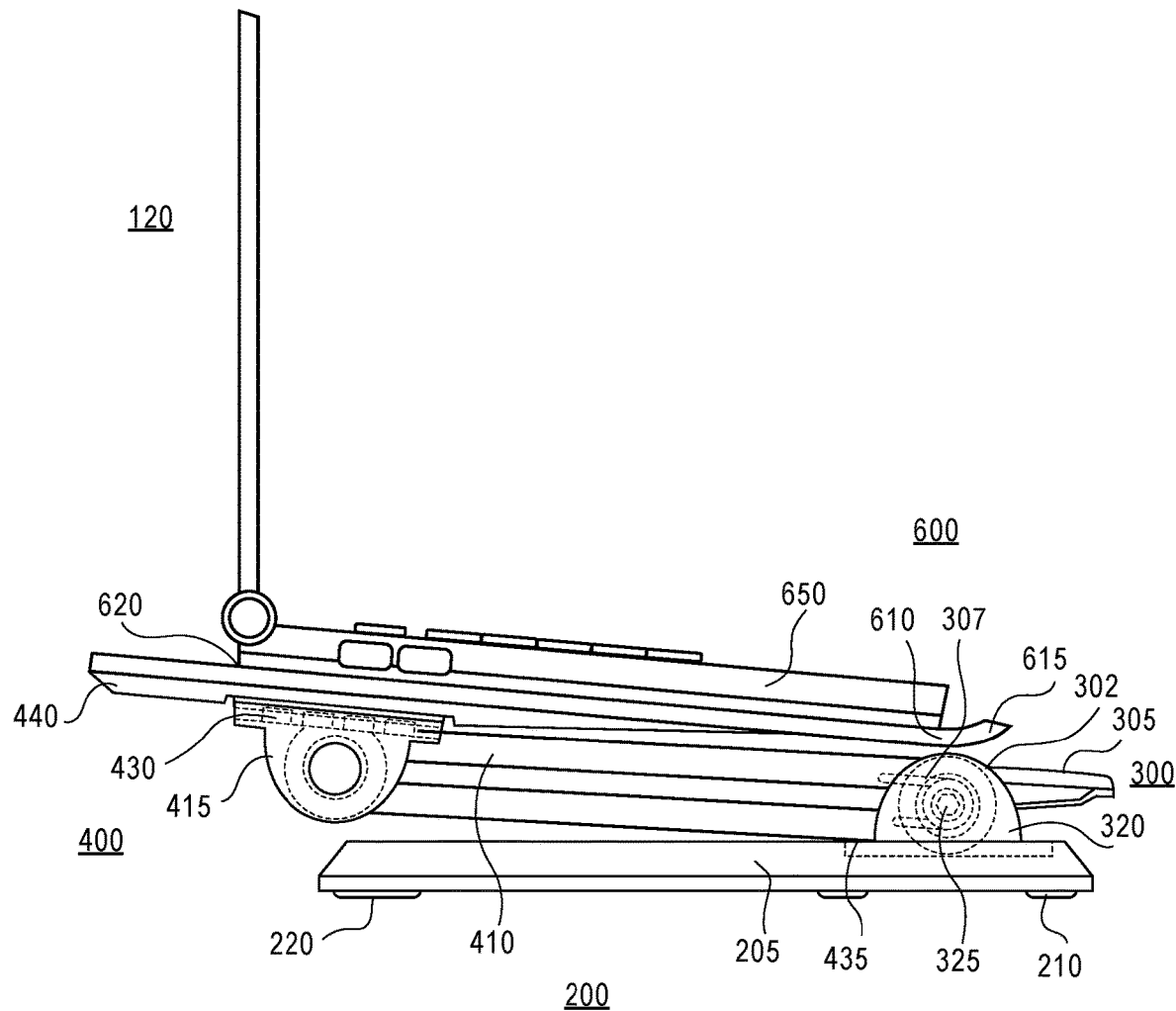
FIG. 14A is a simplified isometric side view showing the invention in the modular laptop riser embodiment in the lowered configuration.
Figure 14B:
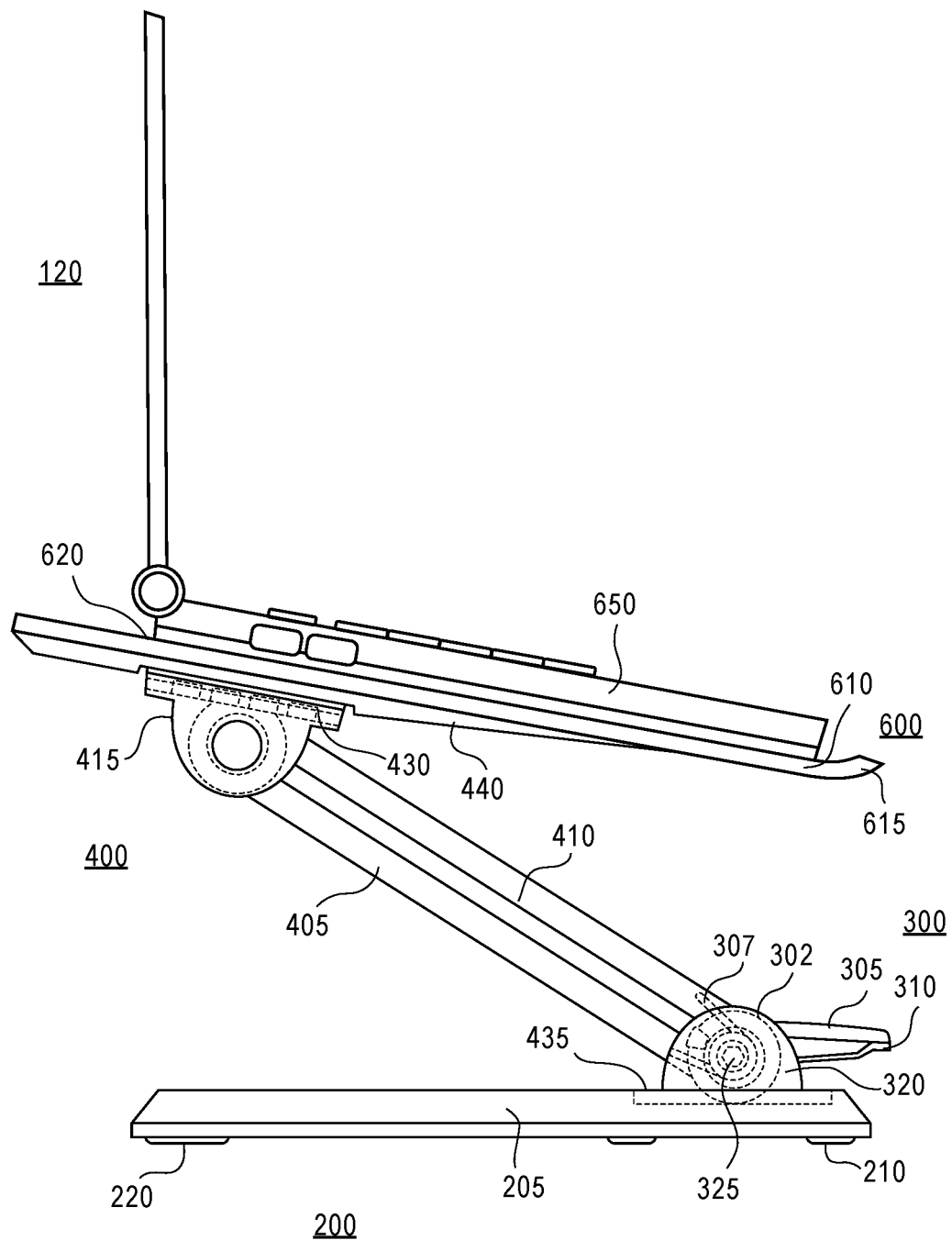
FIG. 14B is a simplified isometric side view showing the invention in the modular laptop riser embodiment in the raised configuration respectively.

FIG. 14A and FIG. 14B illustrate the invention in the modular laptop riser embodiment in the lowered and raised configuration respectively. In some embodiments, the laptop riser platform assembly 600 is attached or coupled by way of connection plate 440 and to the rest of the unit, including the articulating armature assembly 400, actuator assembly 300 and base assembly 200 allowing for laptop riser embodiment to rest upon a surface in this configuration.

In some embodiments the base assembly 200 can be replaced by a desk or table clamp system if desirous. As shown in FIG. 14A laptop 650 rests on riser surface 610 and is retained passively by surface griping elements, such as a textured thermal elastomer or other structures to resist movement of a laptop computer or other device, and upturned retainer 615 which prevents the laptop from sliding off the riser surface. The surface can be designed to allow air to flow from the sides or from under riser surface 610 by way of textured ribs or openings through the riser surface itself. In other embodiments, more active retaining elements may be used such as hook and loop latching strap mechanism or an articulating hinged retaining flap to encase the laptop partially as to secure it even when the raiser surface is at an aggressive position, such as when the riser surface 610 is raised and angled beyond a forty-five-degrees by pivoting upper four-bar connection plate 415. FIG. 14B is a simplified isometric side view of the unit showing the modular laptop riser embodiment in a raised position.

Figure 15:
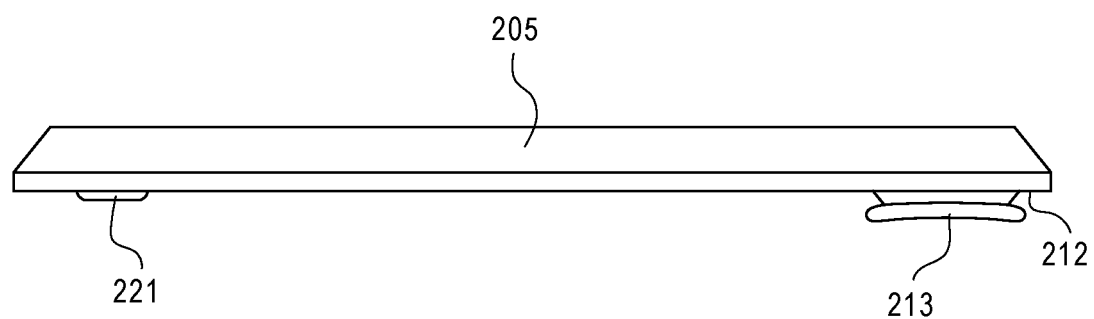
FIG. 15 is a simplified isometric side view of an alternative embodiment of base assembly.

FIG. 15 illustrates an alternate embodiment of base assembly 200 for use with the inventions disclosed herein. Base foot element 213 is constructed with an elastomeric material formed to create a suction cup design as to ensure base foot element's 213 ability to grip to the surface on which it is positioned or pressed to.

In some embodiments, the base foot element 213 is coupled to base 205 by an optionally pivotal assembly 212. With those elements, when weight is lifted off foot 221, base 205 is able to pivot around pivotal assembly 212 allowing any of the modular assemblies attached to the base to pivot as well about the pivotal assembly 212. Alternatively, base foot element 213 could be utilized to replace all of the foot elements, such as 221 to create a base assembly which is very stable and is removably applied by suction and adhesion to the surface in which its attached. This construction adds stability without having to be clamped to the surface of a desk or table.

Figure 16:
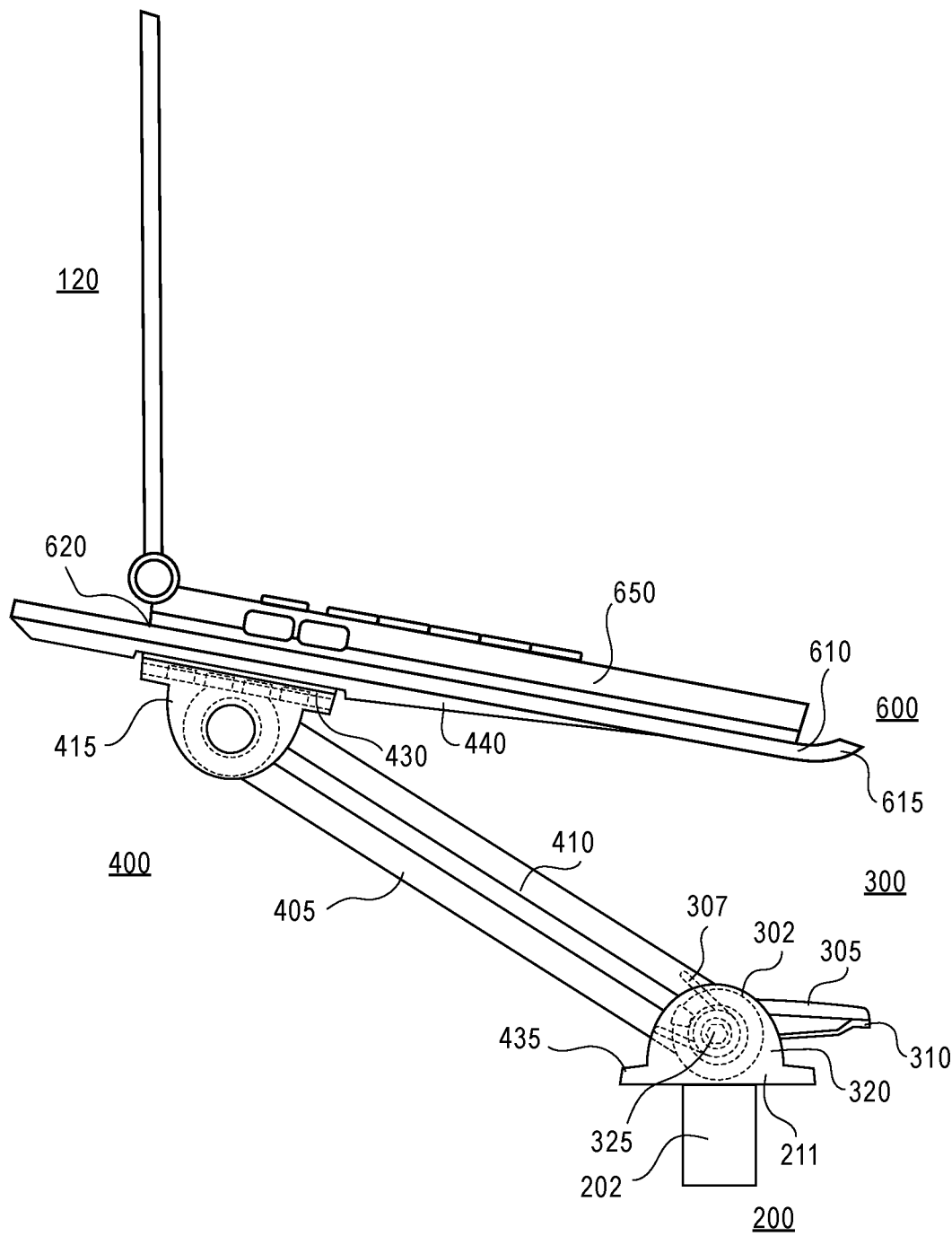
FIG. 16 is a simplified isometric side view, representing the invention in the modular laptop riser embodiment in a construct which allows the articulating armature assembly, to be attached to a monitor arm assembly.

As shown in FIG. 16, the invention in the modular laptop riser embodiment may include an articulating armature assembly 400, to be attached to a monitor arm assembly. Base assembly 200 may be removed and pole mount assembly 202 attached by way of lower four-bar connection plate 417. Using the modular laptop riser embodiment is for illustrative purposes and can be applied to other configurations if it is desirous to utilize any of the optional embodiments in pole mounted configuration.

Figure 17A:
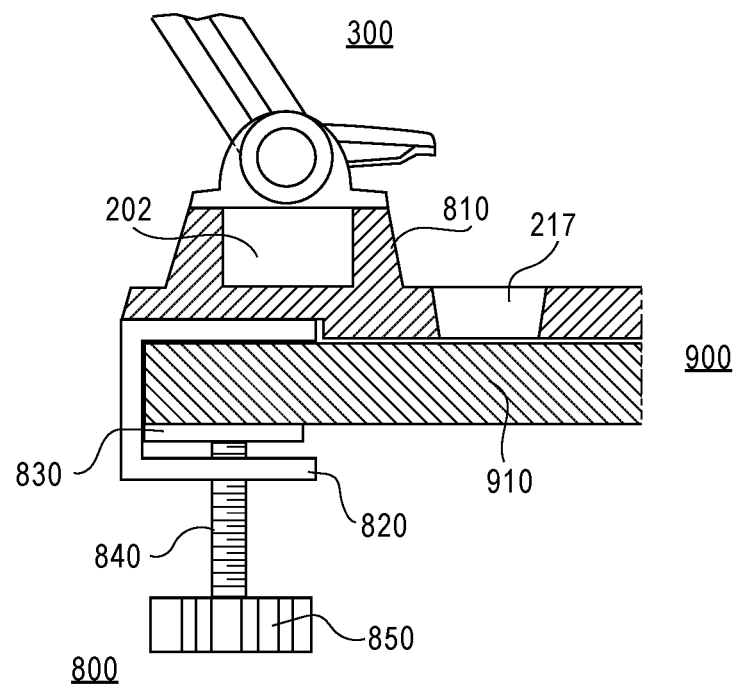
FIG. 17A is a simplified isometric side view showing the inventions alternate embodiment replacing the assembly base with a clamping assembly for clamping on the edge of a support surface.
Figure 17B:
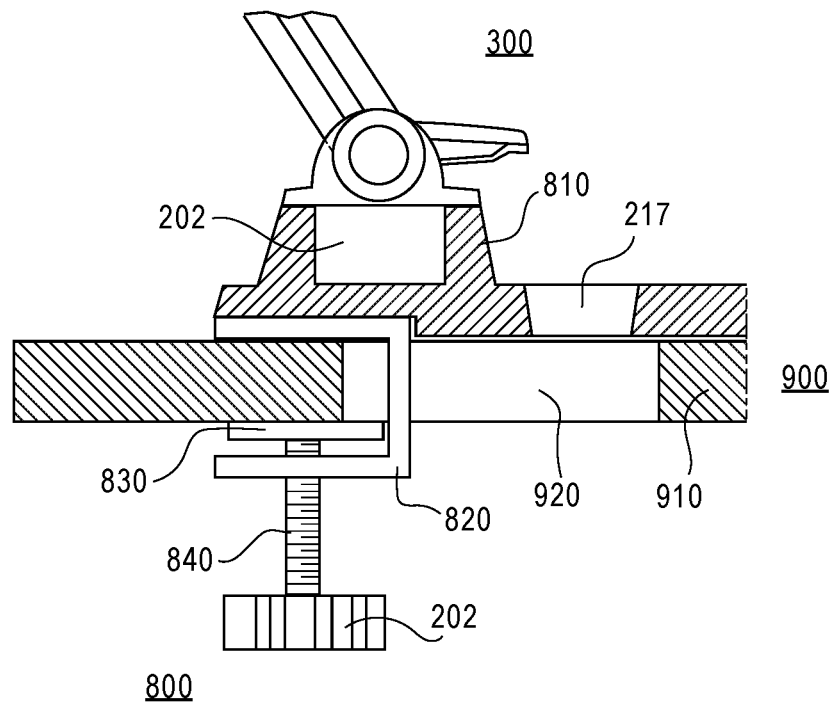
FIG. 17B is a simplified isometric side view showing the inventions alternate embodiment replacing the assembly base with a clamping assembly for clamping on a support surface having a grommet or aperture and including aligned base aperture for cord management.

With reference to FIGS. 17A and 17B, in some embodiments the assembly base of the previous embodiments may be replaced with clamp assembly 800. FIG. 17A illustrates the clamp assembly in edge clamp configuration. Clamp bracket 820 coupled to clamp base 810 as to have the distal ends of clamp bracket 820 facing towards the center of base 810 for edge clamping configuration. In this configuration a table or desktop 910 is clamped within bracket 820 with press foot 830 screwed tightly using knurl knob 850 which is attached to threaded rod element 840. The remaining modular configurations can be added or connected to the clamp assembly 800 by way of pole mount assembly 202.

In some embodiments, exemplified in FIG. 17B the clamp assembly may be in an aperture or grommet mount configuration. Clamp bracket 820 is assembled to clamp base 810 as to have the distal ends of bracket 820 facing towards the outside with vertical element of bracket 820 going through the grommet opening 920 with the table or desk top 910 is clamped within the bracket using the same method as previously described. Clamp base 810 has a cable opening 217 which should align with grommet opening 920 as to allow cabling to travel from under the table or desktop through the grommet opening 920 and cable opening 217 to the top of the table or desktop surface.

Figure 18A:
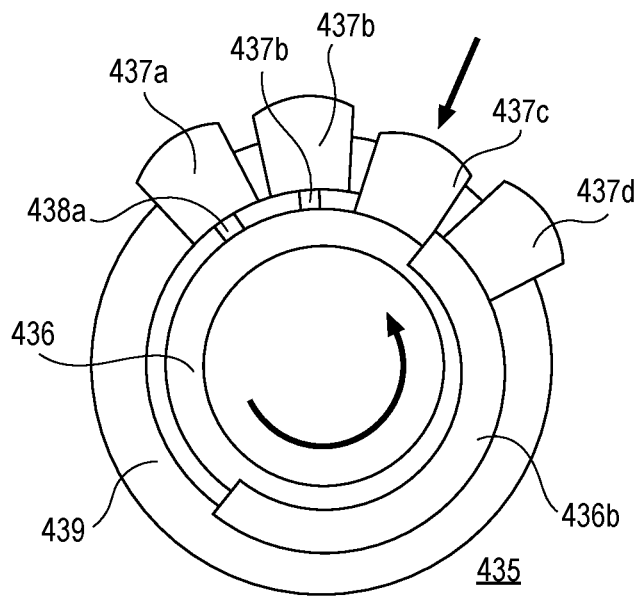
FIG. 18A is a simplified isometric side view of a user adjustable rotation limiter limiting counterclockwise rotation.
Figure 18B:
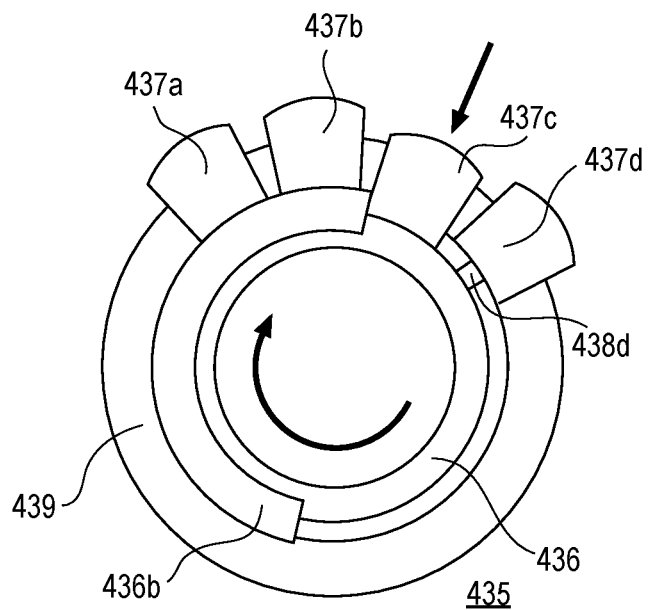
FIG. 18B is a simplified isometric side view of a user adjustable rotation limiter limiting clockwise rotation.
Figure 19:
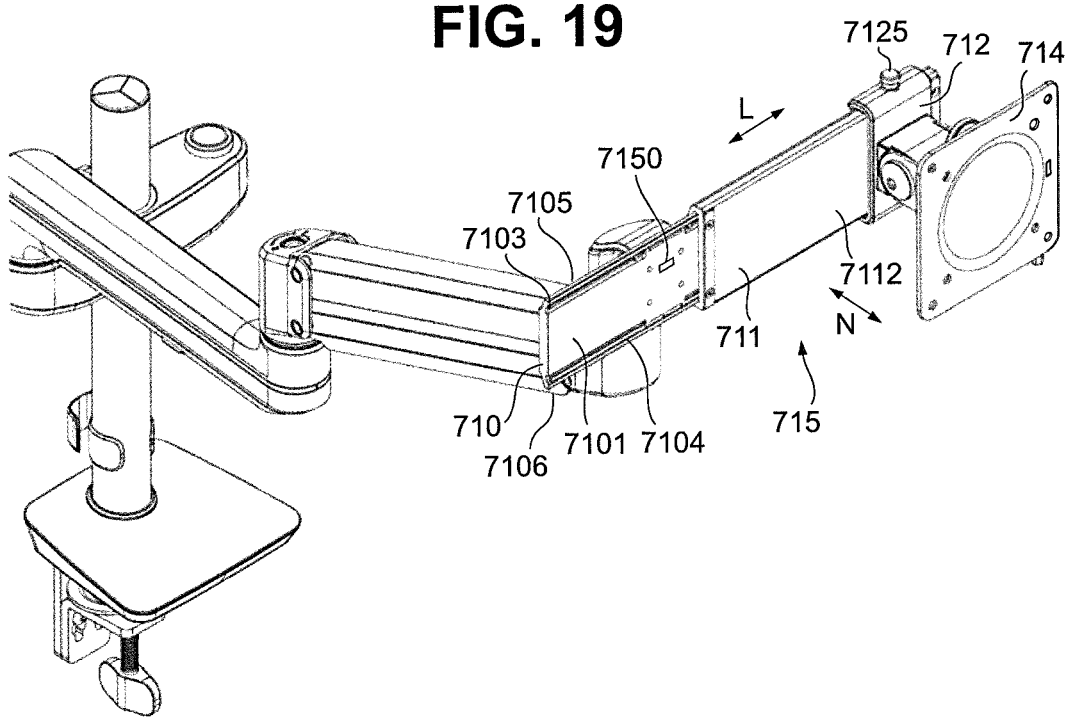
FIG. 19 is a perspective view of a monitor arm assembly including a first slide track and a second slide track engaged over the perimeter channels of the first slide track, the slide tracks in fully extended positions.
Figure 20:
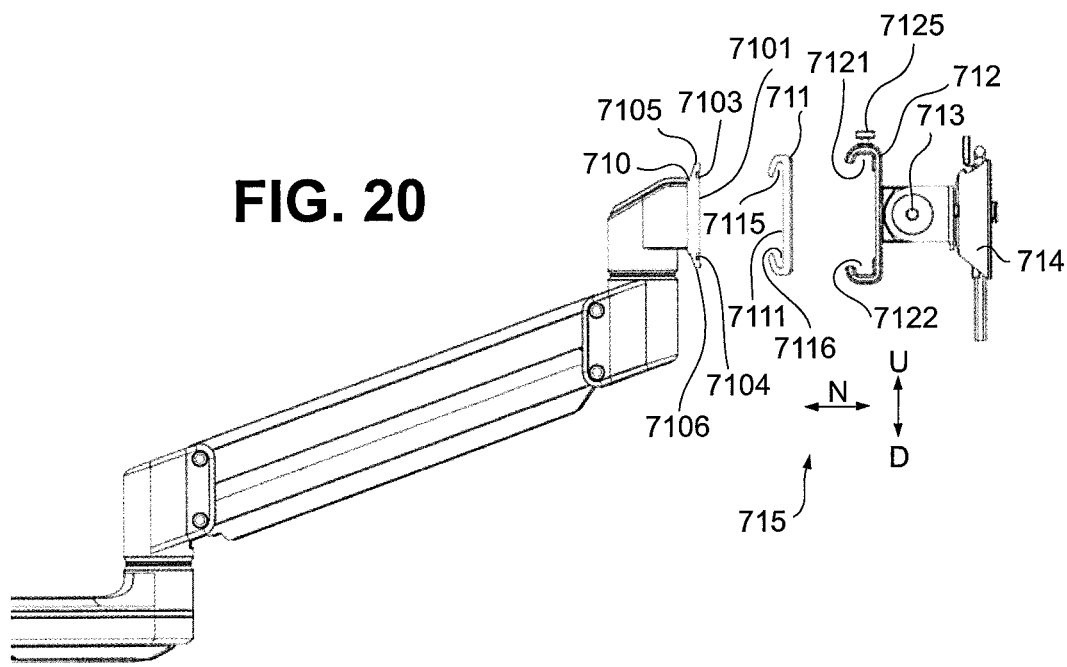
FIG. 20 is a partial side exploded side elevational view a monitor arm assembly including a first slide track and a second slide track engaged over the perimeter channels of the first slide track.
Figure 21:
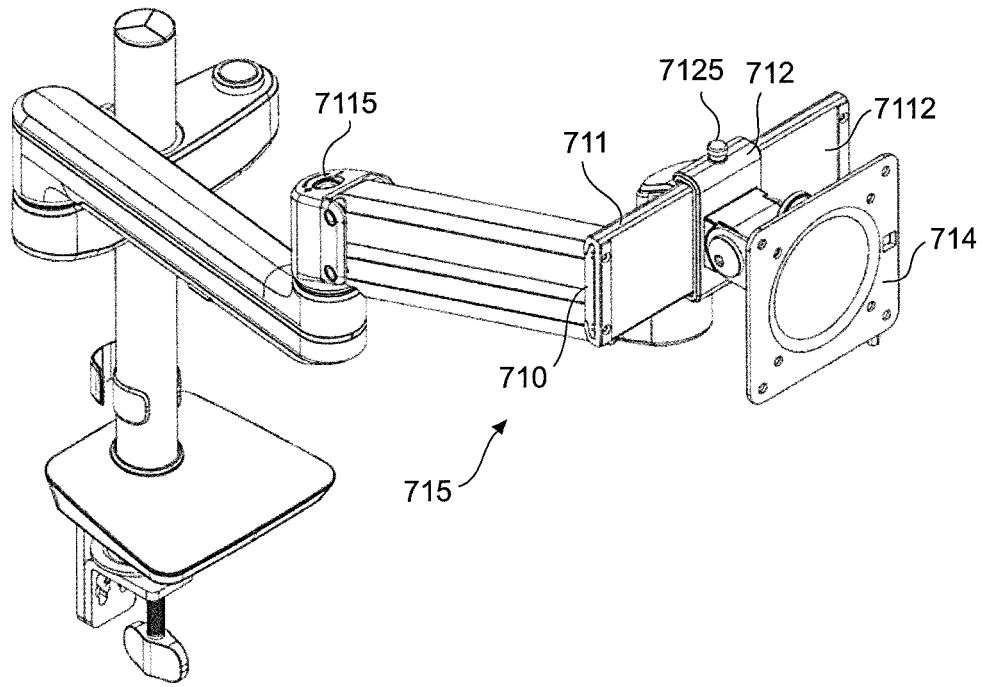
FIG. 21 is a perspective view of a monitor arm assembly including a first slide track and a second slide track engaged over the perimeter channels of the first slide track, the slide tracks in centered positions.
Figure 22:
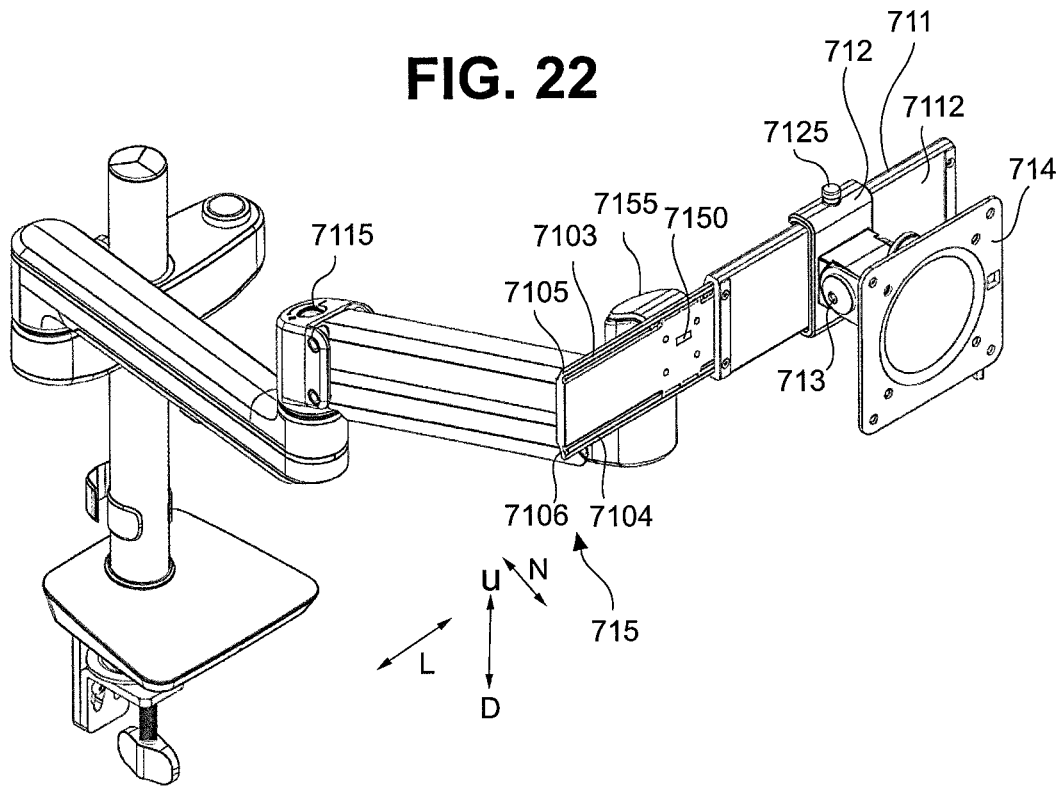
FIG. 22 is a perspective view of a monitor arm assembly including a first slide track and a second slide track engaged over the perimeter channels of the first slide track, the first slide track in a fully extended positions, and the second slide track in a centered position on the first slide track.
Figure 23:
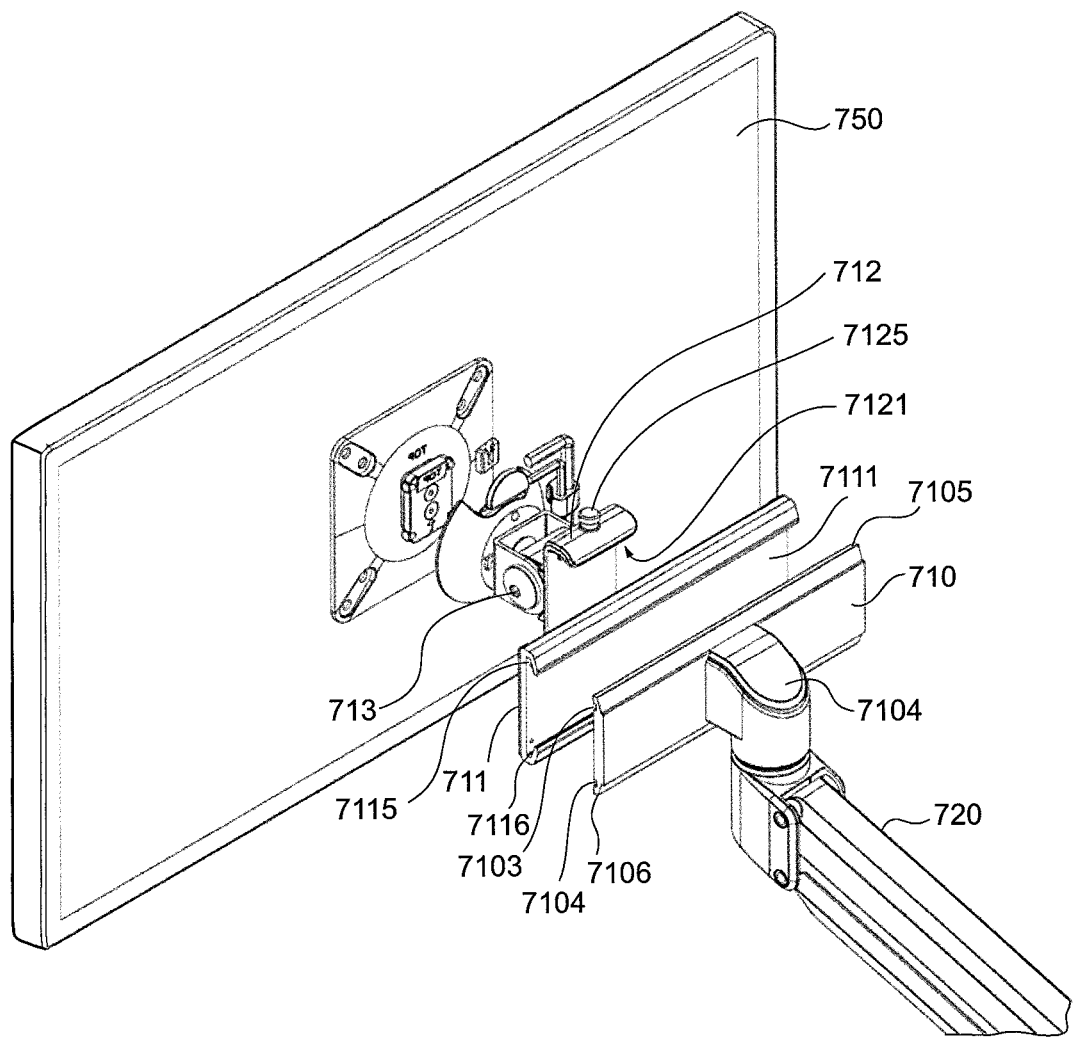
FIG. 23 is a partial perspective exploded view of a monitor arm assembly including a first slide track and a second slide track engaged over the perimeter channels of the first slide track, the slide tracks in centered positions.
Figure 24:
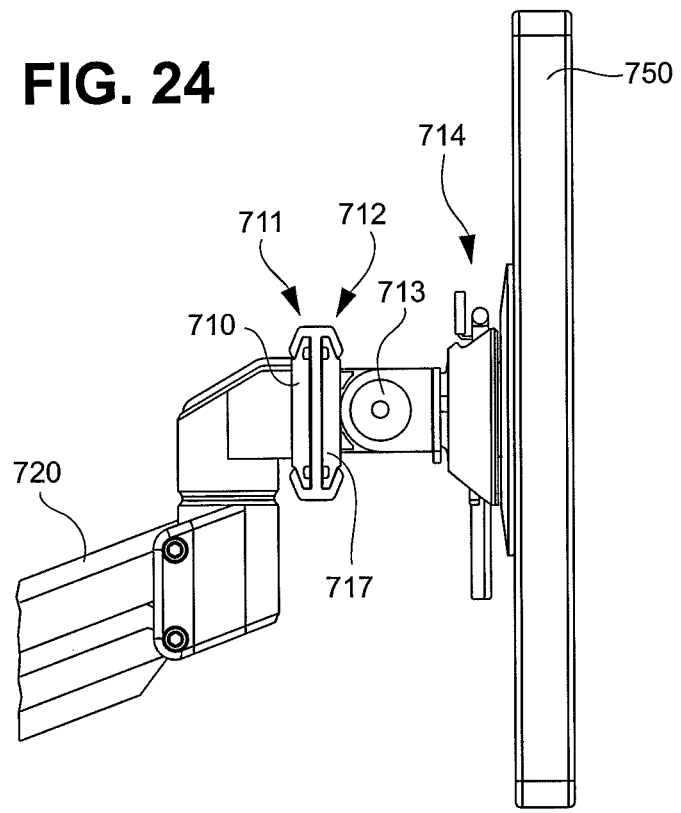
FIG. 24 is a partial side elevational view of a monitor arm assembly with a first slide track and a second slide track in a back to back relationship.
Figure 25:
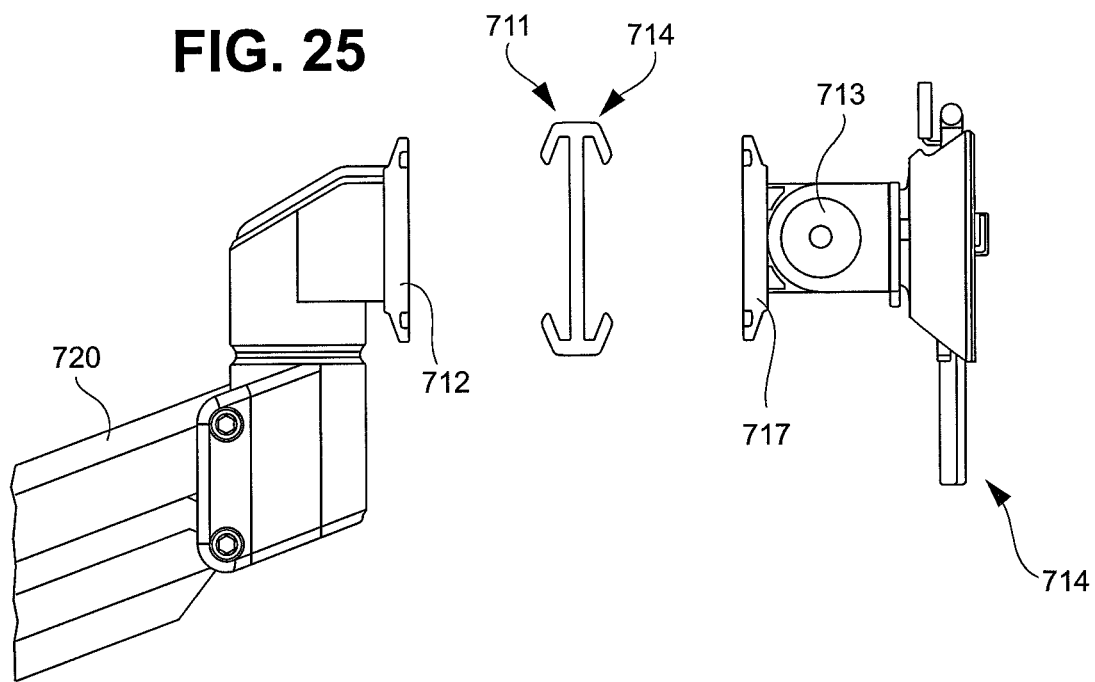
FIG. 25 is a partial exploded view of FIG. 24.
Figure 26:
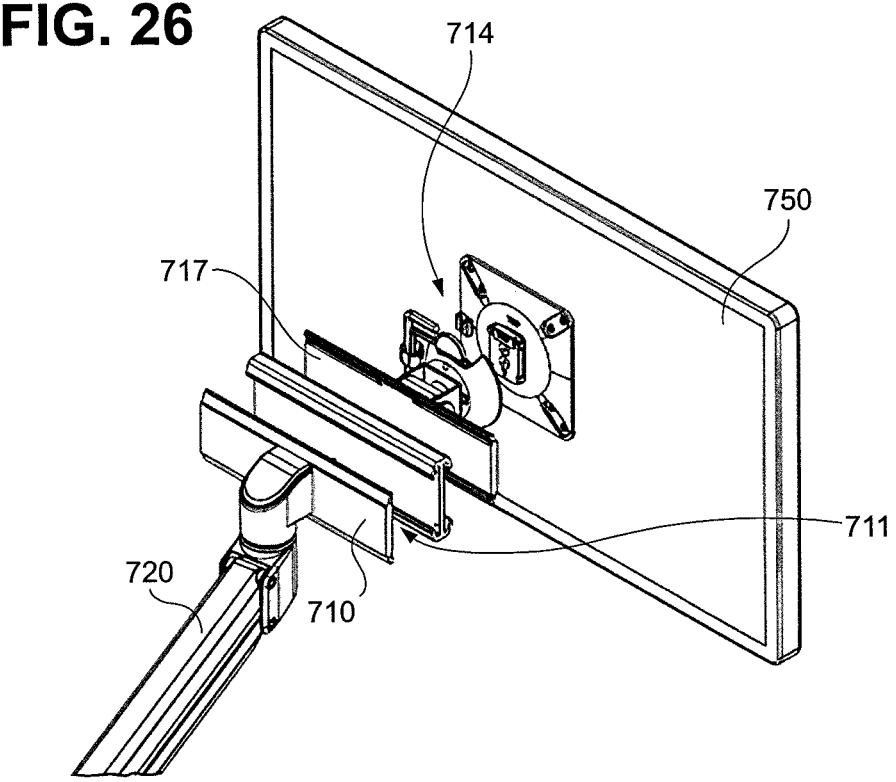
FIG. 26 is a partial perspective exploded view of a monitor arm assembly including a first slide track and a second slide track back to back relationship, the slide tracks in centered positions.
Figure 27:
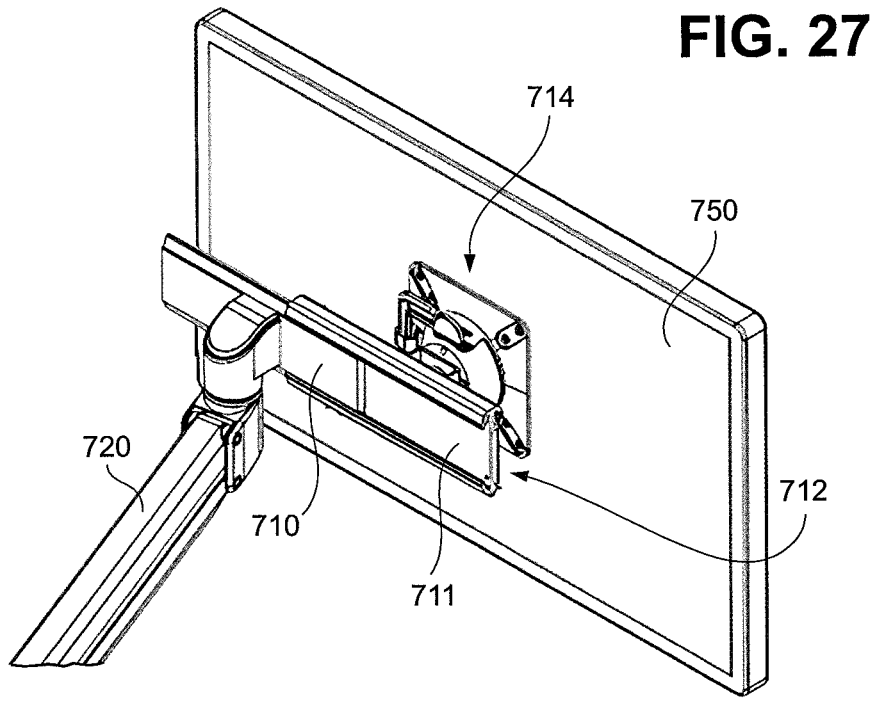
FIG. 27 is a partial perspective view of a monitor arm assembly including a first slide track and a second slide track back to back relationship, the first slide track in an extended position.
Figure 28:
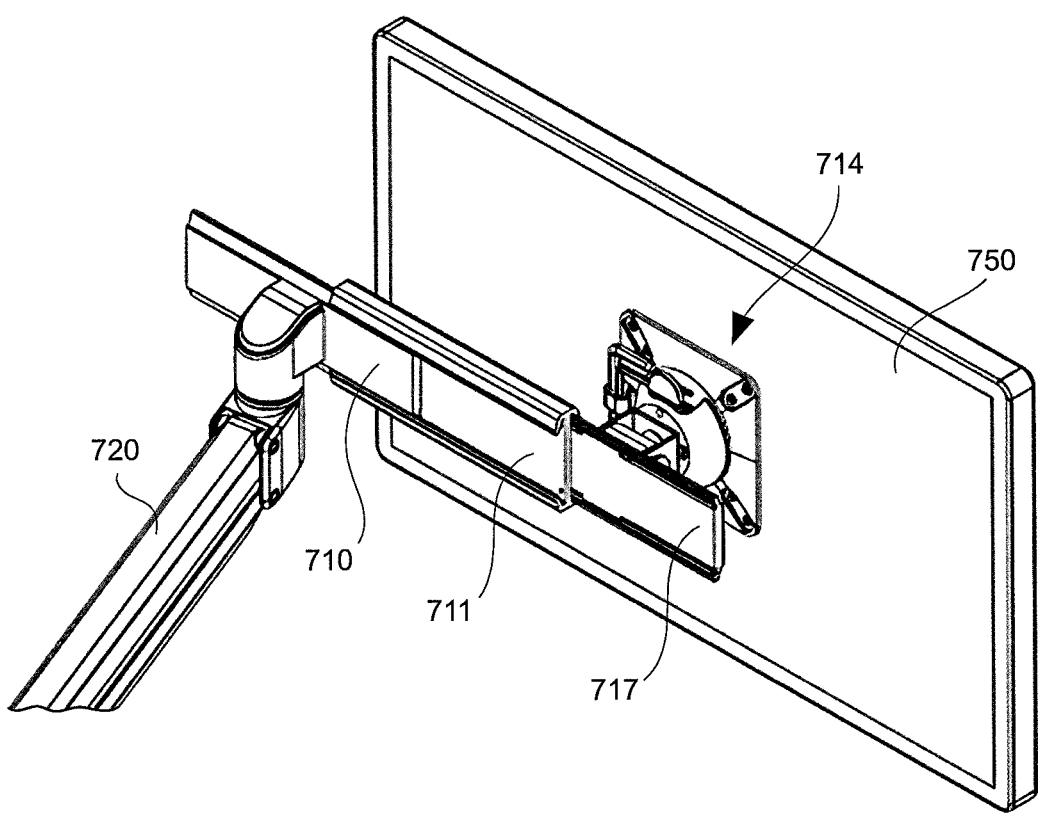
FIG. 28 is a partial perspective view of a monitor arm assembly including a first slide track and a second slide track back to back relationship, the first slide track in an extended position and the monitor bracket in an extended position in the second slide track.
Figure 29:
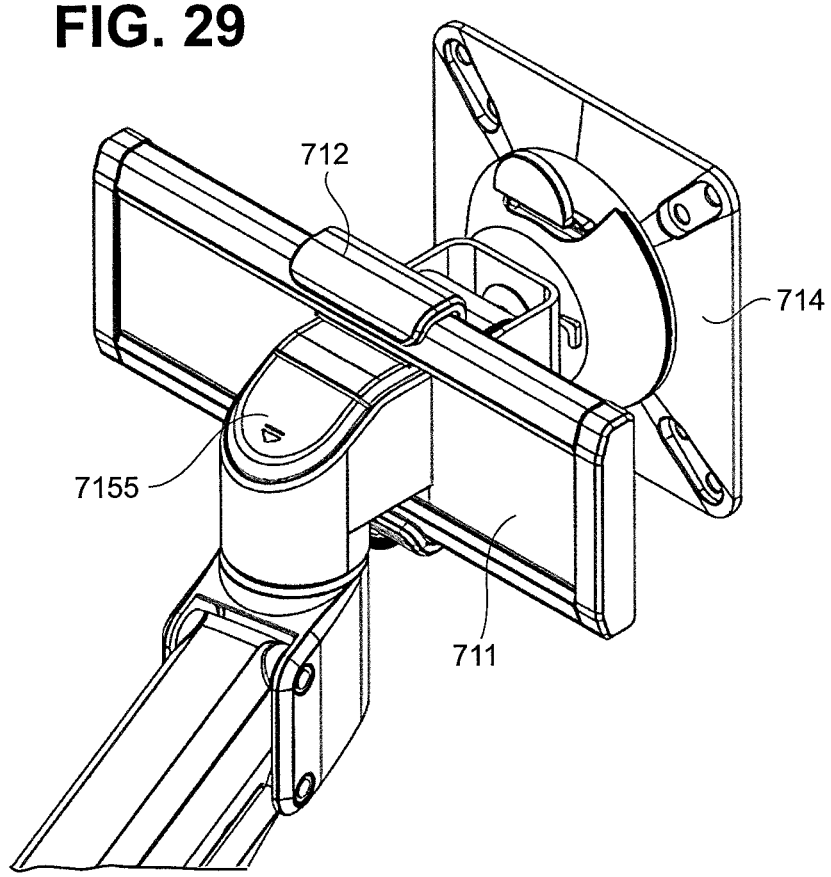
FIG. 29 is a perspective view of a monitor arm assembly including a first slide track and a second slide track engaged over the perimeter channels of the first slide track, the slide tracks in centered positions, including an actuator for a brake.

In some embodiments, a user adjustable rotation limiter may be included, as illustrated in FIGS. 18A and 18B. In such an embodiment, inner rotation element 436 rotates within outer rotational element 439. Limit rib 436*b* is attached to and rotates with inner rotation element 436. Limiter tabs 437*a*, 437*b*, 437*c* and 437*d* can be pushed in towards the center to limit the rotational travel of limit rib 436*b*. Similarly, the limiter tabs can be pulled out to disengage the limiters.

FIG. 18A illustrates how counterclockwise rotation is limited when limiter tab 437 is engaged. FIG. 18B illustrates how the clockwise rotation is limited when limiter tab 437 is engaged. The more limiter tabs are engaged, the more restricted the clockwise and counterclockwise rotation of the inner rotation element 436. The limiter tabs can be pulled out and disengaged as to increase the allowable rotation as well. The limiter tabs move in and out by way of corresponding limit tab guides 438*a*, 438*b*, 438*c* and 438*d*.

One skilled in the art will recognize the inner rotational element 436 and outer rotational element 439 may rotate with respect to each other while one or both of them are fixed or stationary with respect to something else, such as a base, monitor arm, or other structure of an assembly. Further, the use of "inner" and "outer" are terms used with reference to the rotational elements, and not absolute terms. The outer rotational element does not have to be the outermost element of an assembly. For instance, in some embodiments, the outer rotational element 439 is inward of a limiter activator 441.

In some embodiments, the rotation limiter may include activators to activate or engage and disengage the tabs or other structures such as pins. The activators may be a ring or plurality of rings, collars, or other structures placed about the tabs or pins that a user may manipulate to activate or selectively engage the tabs or pins or other structures.

In some embodiments as shown in FIGS. 32-42, the rotation limiter 100 may be constructed utilizing movable pins 437 or rollers. The rotation limiter includes an outer rotational element 439, an inner rotational element 436, a limit rib 436*b* attached to the rotational element, a plurality of pins 437, rollers or limiter tabs, pin guides 438, and a limiter activator 441. Some embodiments may include a plurality of limiter activators such as a second limiter activator 442.

The pins or rollers may be of any convenient construction to allow the mechanisms to rotate and allow the pins to be moved into and out of pin guides. In the most preferred embodiments, the pins 437 are cylindrical with a major axis, with tapered tops and bottoms. The taper may be truncated.

The limiter activator 441 may be a ring structure that is rotatable about the limiter pins and limiter pin guides. The limiter activator may include a protrusion 443 to move, displace, or otherwise interact with the limiter pins 437. The protrusion 443 may be located on the inner facing surface of the limiter activator 441. The limiter activator protrusion 443 may include a ramp or transition area 444 on either side of the protrusion 443 to allow for smoother rotation of the limiter activator 441 and smoother activation or engagement of the pins 437. The second limiter activator 442 may be similarly constructed and have the same features and similar function to the limiter activator 441.

The pin guides 438 may be a cage or plurality of slots or apertures to accept the pins and may be part of the outer rotational element 439. The pin guides 438 are circumferential and define apertures or spaces therebetween to accept the pins 437. The pin guides may have wall that are tapered in a radial direction. Such tapering may be viewed as a truncated wedge shape in cross section. The tapering wall thus define the apertures to have a greater width radially closer to the center of the pin cage, or closer to the axis of rotation. It is preferred that the tapered walls prevent the pins 437 from completely passing through the apertures. Put another way, the minimum spacing between the tapered walls defining an aperture is less than the width of a pin 437.

The outer rotational element 439 may be referred to as a pin cage. The outer rotational element 439 may be attached to or be in a friction engagement with an assembly, base, or other structure that it is desirous to have the structure or device attached to the inner rotational element 436 rotate with respect to.

In some embodiments, the limiter pins 437 may be eliminated and the pin function replaced with the pin cage or outer rotational member 439 having tabs. In such an embodiment, the pin cage tabs are displaceable in part by flexing in an inward direction via interaction with the protrusion 443 on the limiter activator 441. So displaced, the pin cage tabs interfere with the protrusions or limit rib 436b on the inner rotational element 436 to selectively limit rotation.

In some embodiments, the outer rotational element 439, the inner rotational element 436, and a limiter activator 441 and 442 are coaxially aligned. The pins 437 and guides 438 are located between the outside of the inner rotational element 436 and the limiter activators 441 and 442. The inner rotational element 436 may include a top flange 436a or a bottom flange 436c. The top flange 436a or bottom flange 436c may extend over the pins 437, but such extension is not necessary.

In some embodiments, the rotation limiter includes an inner rotational element 436 including a flange with a bottom facing annular channel 471. The annular channel receives a top bushing 450. The top bushing 450 when seated in the annular channel 471 spaces the first limiter activator 441 away from the outer rotational element 439. The top bushing 450 may be an anti-friction bushing to improve rotation.

The first limiter activator 441 and the second limiter activator 442 may include opposing facing annular channels to receive a linking ring 470. In some embodiments, the linking ring 470 may be attached to one or the other of the first limiter activator 441 or the second limiter activator 442. The linking ring 470 may be constructed of a low friction material.

In some embodiments the limiter activators 441 and 442 may be separated by a bushing, washer, or other structure to separate the limiter activators or to prevent them from touching each other. One skilled in the art will recognize that the structure discussed and shown in the drawings as the linking ring 470 may also be considered a washer, bushing, or other structure separating the first and second limiter activators. One skilled in the art will also recognize that the linking ring 470 may be utilized between any number of limiter activators, such as between a second and third limiter activator in embodiments with three limiter activators.

The assembly may include a bottom bushing 473 located below the second limiter activator 442 to space the second limiter activator 442 from the outer rotational element 436 and allow the limiter activators 441 to maintain a uniform distance from the outer rotational element and provide for smooth and concentric rotation of the assembly. The assembly may also include locking ring halves 476a and 476b to retain the outer rotational element between the flanges of the inner rotational element. The top 450 and bottom 473 bushing allow the inner and outer rotational elements to rotate with respect to the limiter activators and in the case of the top bushing 450 to one another and preferably are made of a non-friction material that permits a sliding relationship. The assembly may also include a bushing 474 between the inner rotational element bottom flange 436c and the locking ring 476a and b.

The inner rotational element 436 has a central area, recess, or aperture 488 to accept an assembly, such as a monitor arm or platform linkage, though any assembly that is desired to be rotated and limited in rotation may be attached.

Figure 39:
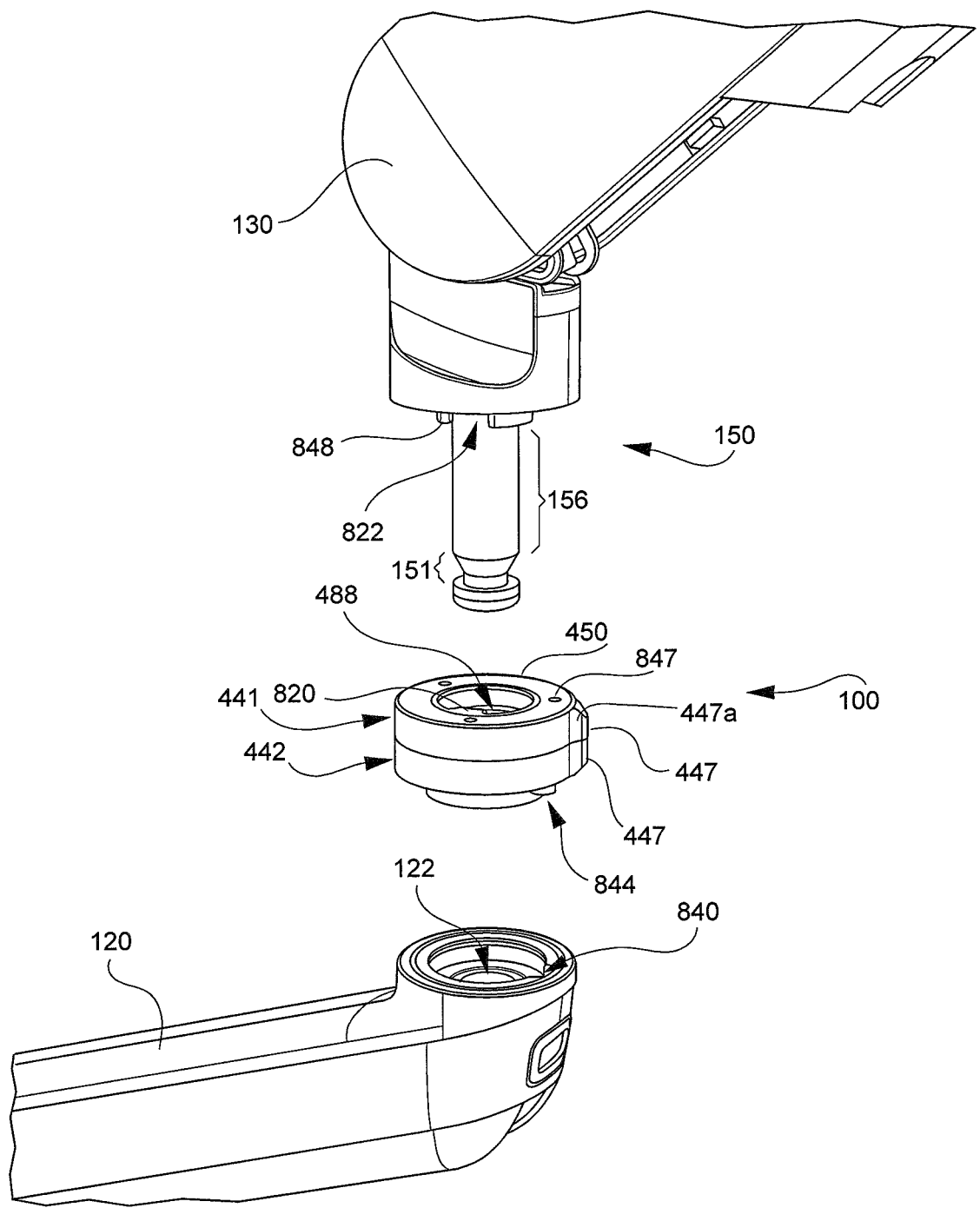
FIG. 39 is a partial side perspective exploded view of a cassette rotation limiter with first and second arms of a monitor arm assembly.

As shown in FIGS. 32-42 the rotation limiter 100 may be constructed as a cartridge assembly that may be placed between two structures, such as between two arms 720 of a monitor arm assembly. One skilled in the art will recognize that the two arms are merely exemplary, and the rotation limiter may be used between other structures, including an arm and a base. As shown in FIG. 39 the lower arm 120 includes an aperture 122 to accept a post 150, lead-in, or other structure to rotatably connect the lower arm 120 with the upper arm 130. The aperture is sized to receive the post 150, but also allow the post to rotate within the lower arm 120. The rotation limiter 100 cartridge may be replaced with by a spacer or simple bearing in assemblies not desiring rotation limitation.

In some embodiments, the post 150 includes an area of reduced diameter 151 or radial thickness. The area of reduced thickness includes a ramp or tapered section 152. The tapered section 152 leads from a constant diameter upper section 156 to a reduced diameter section 151.

In some embodiments, as shown in FIGS. 34-39 the inner rotational element 436 may include a boss 820, tab, or other structure to engage with a post 150, lead-in, or other structure of the monitor arm, platform linkage, or assembly. In such embodiments, the post, lead-in, or other structure of the monitor arm, platform linkage, or assembly may include a receiver 822 or complementary notch to engage, receive, or interact with the tab or boss 820, allowing the post, lead-in, or other structure to cause rotation or rotate with the inner rotational element 436. In the most preferred embodiment, the receiver 822 or notch has vertical walls or walls that are perpendicular to the direction of rotation to prevent any upward forces that may tend to displace the post, lead-in, or assembly from the inner rotational element 436. In other embodiments, the walls may taper upward to provide a guiding or centering force when the post, lead-in, or other assembly is placed into the aperture 488.

Similarly, the rotation limiter outer rotational element 439 may include structure to engage another assembly such as a base or monitor arm to prevent rotation between or rotationally couple the outer rotational element 439 and the structure. In some embodiments, the structure is a linking pin 499 that fits a receiver 498 in the bottom of the outer rotational element 439 and into an aperture or structure in the assembly, such as a monitor arm. In other embodiments, the bottom of the outer rotational element 439 may include a boss 844 or other structure to engage a receiver 840 in the assembly, such as lower monitor arm 120. The top bushing 450 may include a receiver 847 to receive a protrusion 822, boss, or other structure to prevent rotation between or rotationally couple the outer rotational element 439 and the upper arm 130.

In some embodiments, the tab or boss 820 is positioned on the inside, or the side facing the center axis of the inner rotational element 436. In some embodiments the boss 820 is positioned in the lower half of the inner rotational element 436. In some embodiments, the tab or boss 820 is positioned at least partly in the upper half of the inner rotational element 436. The tab or boss 820 may also span from 1 to 35 degrees of the surface of the inner rotational element 436. In some embodiments the tab or boss 820 may be non-continuous, being a series of spaced apart splines. In some embodiments, the splines are present for more than 35 degrees of the surface of the inner rotational element.

In some embodiments, the tab or boss 820 protrudes from the surface of the inner rotational element 436 towards the axis of the inner rotational element. The tab may include side walls that are parallel to the axis 1000 of the inner rotational element 436. The side walls may include an angled or tapered upper portion, the tapering or angled walls being at an angle to the axis 1000. The angled walls may meet at a vertex or may be truncated. The narrowing of the boss 820 created by the angled walls provides a centering guide to help align the tab or boss 820 with the receiver 822 as the post 150 or lead-in is placed into the inner rotational element 436.

As further shown in FIGS. 34-41, the rotation limiter 100 may be in the form of a cassette. The embodiments of the rotation limiter shown in other figures may also be in the form of a cassette. The rotation limiter assembly in some embodiments may include a top bushing 450 press fit onto the top of the outer rotational element 439 or pin cage. Such placement may make the rotation limiter a contained unit. In such embodiments, the top flange of the inner rotational element 436 may be reduced in radial size, displaced from the top rim of the inner rotational element, or eliminated. The top bushing 450 may include a channel 451 to accommodate the tops of the pin guides 438 or pin cage. The top bushing 450 and pin cage 438 are preferably a friction fit to retain the top bushing 450 onto the pin cage 438 or outer rotational element 438. The channel 451 in the top bushing 450 may be continuous or discontinuous.

The top bushing 450 radially overlaps the first limiter activator 441 to retain the limiter activator 441 in the assembly. In some embodiments the overlap is provided by an outer radial flange 450*a* on the outside circumference of the top bushing 450. The top bushing 450 may also include an inner radial flange 450*b* on the inside circumference to retain or capture the inner rotational element 436. It is preferably to have rotational friction between the first limiter activator 441 and the top bushing 450 to provide smooth rotational feel.

In some embodiments the pins 437 are captured or located between the under surface of the top bushing 450 and bottom portion of the outer rotational element 439. The vertical movement of the pins 437 may be minimized. The pins 437 may contact both the under surface of the top bushing 450 and the top surface of the bottom portion of the outer rotational element 439 to minimize or eliminate vertical movement of the pins within the pin cage or apertures.

In some embodiments the inner rotational element 436 includes a flange 436*a* on the outer circumference, the flange displaced from the top edge. The inner rotational element flange 436*a* engages a recess, channel, notch, shelf or other structure present on the top bushing to prevent the upward movement of the inner rotational element, thereby capturing the inner rotational element between the top bushing and the outer rotational element.

In some embodiments, the bottom portion of the outer rotational element 439 includes a flange 439*a* in contact with the bottom of the inner rotational element. The flange 439*a* is in the inward direction. The flange 439*a* of the outer rotational element 439 captures or prevents the downward movement of the inner rotational element 436 when the rotation limiter is assembled.

In some embodiments, the rotation limiter 100 assembly includes an intermediate bushing 455. The intermediate bushing 455 includes a central aperture wide enough to allow the intermediate bushing 455 to fit over the pin cage and be positioned on a bottom outer flange 439*b* of the outer rotational element 439. In such an embodiment, the intermediate bushing 455 is located about the outer circumference of the pin guides 438.

In some embodiments, it is preferable for the intermediate bushing 455 to not rotate with respect to the outer rotational element 439 or with respect to the pin guides 438. This allows the limiter activator 442 to bear against the outer circumference of the intermediate bushing 455 without the intermediate bushing 455*b* rotating, providing a constant amount of resistance and feel to the rotation of the limiter activator 442. The bottom bushing includes a plurality of inwardly facing protrusions or keys 457. The keys 457 are sized to fit into the apertures of the pin cage.

In some embodiments, the apertures of the pin cage that are to accept the keys 457 are sized larger in a vertical direction than the other apertures so as to accommodate the added vertical thickness of the keys 457. Thus the vertical dimension of the apertures with the keys 457 in place is the same as the vertical dimension of the apertures that do not accept the keys 457. This arrangement allows the same sized pins 437 to be used in each aperture. In some embodiments, the apertures may be sized the same, and the apertures that accept the keys 457 use pins 437 with a smaller vertical dimension to accommodate the added thickness of the keys 457.

In some embodiments, the first limiter activator 441 and second limiter activator 442 are positioned about the outer rotational element 439 in a coaxial arrangement. The first limiter activator 441 includes a notch 441*a*, groove, shelf or other structure to engage a flange 450*c* of the top bushing 450, thereby preventing the first limiter activator 441 from passing over the top bushing 450, thereby retaining the first limiter activator 441 about the outer rotational element 439. The first rotation limiter 441 is free to rotate with respect to the flange 450*c* of the top bushing 450.

In some embodiments, the bottom surface 441b of the first limiter activator 441 is in contact with the top surface 442b of the second limiter activator 442. The second limiter activator 442 includes a notch 442a, groove, shelf or other structure to engage the intermediate bushing 555 flange or the outer flange 439b of the outer rotational element 439. So engaged, the second limiter activator 442 will not pass below or off of the outer rotational element 439 in the downward direction. With such a construction, the first limiter activator 441 and the second limiter activator 442 are captured between the top bushing 450 and intermediate bushing 450 or flange 439b of the outer rotational element 439.

In some embodiments, the inner rotational element 436 may include a displaced flange 490. The displaced flange provides a surface or support to retain the inner rotational element in the assembly by interaction with the top bushing 450. The top bushing 450 may include a notch, channel, or other receiving structure to accept and interact with the displaced flange 490. In some embodiments the displaced flange 490 may be a surface or shelf created by a reduction in the wall thickness of the inner rotational element 436. Such an assembly may be used in many embodiments where a plurality of limiter activators are used as the stacked limiter activators may be assembled onto the other components of the rotation limiter as a single unit.

In some embodiments, the top busing 450 incudes a channel 451 to press fit onto the outer rotational element 439. The top bushing includes a notch, channel, shelf, edge, or other structure on a radially outwardly facing surface to interact with and capture a complementary feature on the limiter activator, such as first limiter activator 441. The features working in concert prevent the limiter activators 441 and 442 from being removed past the top bushing 450 and thereby retained on the assembly.

Similarly, in some embodiments, the assembly includes an intermediate bushing 455. The intermediate bushing 455 includes a notch, channel, shelf, edge, or other structure on an outwardly facing surface to interact with and capture a complementary feature, such as an edge or corner on the limiter activator, such as first limiter activator 441 or second limiter activator 442 if two limiter activators are used, or the bottom most limiter activator if more than two are used. The intermediate bushing 455 is preferably made of a material that allows the limiter activator with which it interacts to move freely and smoothly. In some embodiments, the intermediate bushing may be excluded and the bottom most limiter activator may interact with and slide against a surface or surfaces of the outer rotational element 439.

Figure 37:
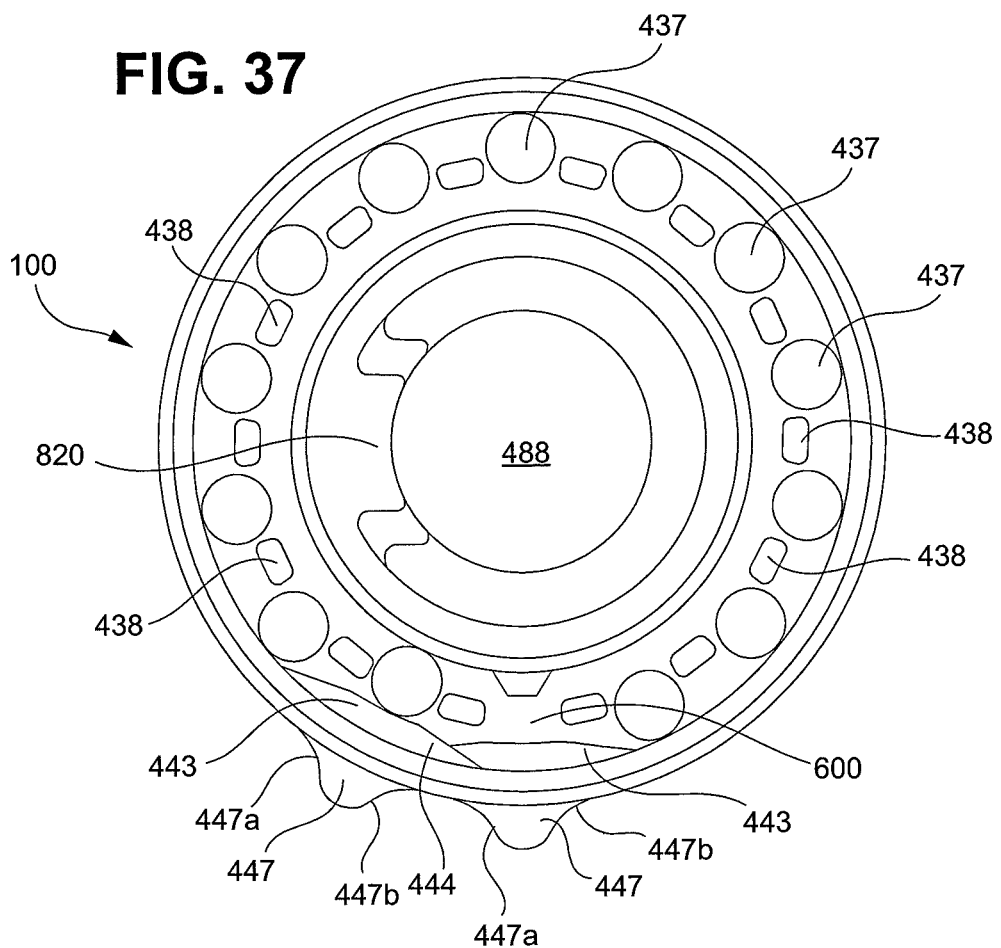
FIG. 37 is a top sectional view of the assembled rotation limiter of FIG. 35.
Figure 38:
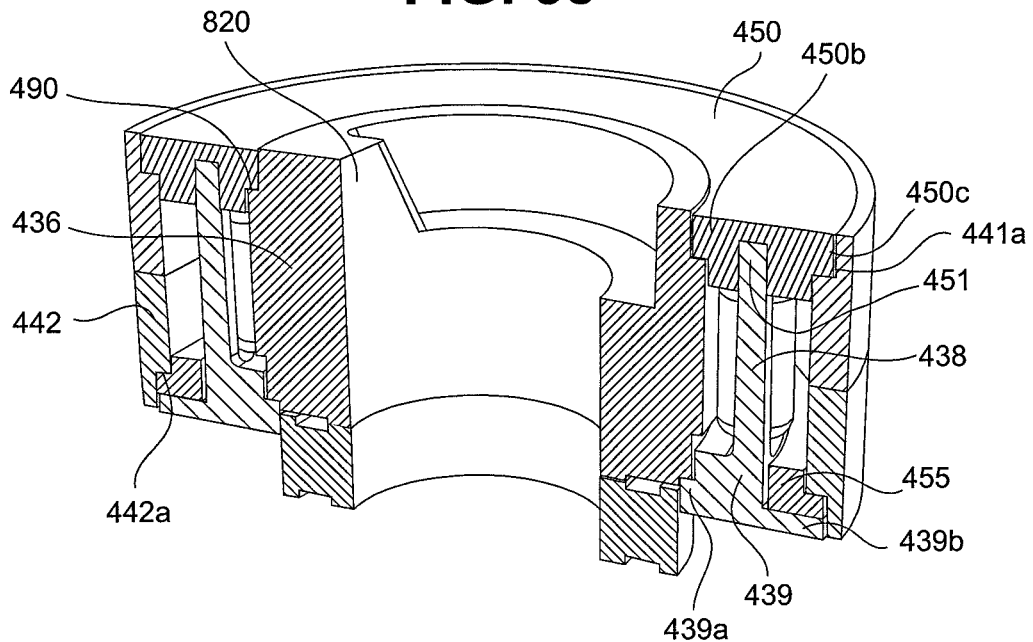
FIG. 38 is a side perspective sectional view of the assembled rotation limiter of FIG. 35.

As shown in FIG. 37, in some embodiments a pin 437 may be omitted so that a location exists where the protrusion 443 on the limiter activator 441 does not engage with a pin 437. Such a location may be considered a free rotation position 600 or accommodation. With such a location available, when the protrusion 443 of a limiter activator is at the free rotation position 600, no pin 437 is pushed in, and no pin 437 interacts with or stops rotational movement of the inner rotational element 436, thus allowing 360 degree rotation of the inner rotational element 436 with respect to the outer rotational element 439.

In some embodiments, the limiter activators 441 and 442 may include protrusions 447 on the outer surface. Such protrusions 447 serve as markers or visual indicators to indicate where the protrusion 443 on the inner surface is present. By giving an outward indication of where the pins are displaced, the protrusions 447 on the outer surface also indicate the range of allowable rotation, or where the rotation will stop. In other embodiments, the outer surface protrusion 447 may act as a grip or area of leverage to allow the user to move or rotate the limiter activator 441 or 442. In other embodiments, the position of the protrusion 443 on the inner surface may be indicated by a mark, symbol, line, or other visual or tactile indicator. The outer surface protrusions 447 may extend radially from the circumference of the limiter activator 441 or 442. The outer surface protrusion 447 may include transitional surfaces 447a and 447b that extend from the nominal outer surface of the limiter activator 441 or 442 to an area of maximum radial distance from the nominal outer surface. The transitional surfaces are preferably concave to provide better surfaces for manipulation by the fingers of a user of the device.

In some embodiments, the top or bottom bushings, or any surface that the limiter activators bear upon, may include indexing marks 866 on the bearing surface. The indexing marks may be bumps, protrusions, or grooves or divots. The corresponding surface of the limiter activator 441 may include a protrusion, bump, groove 867, divot, or other structure to slightly interfere with the indexing mark. The groove 867 may be located radially outward from the protrusion 447. Such indexing arrangement provides a click or other sound or tactile indication as the limiter activator is rotated an indexed amount about the bushing. This provides a user information as to the setting of the rotation limits of the assembly to known angles, such as 45 degrees.

Figure 40:
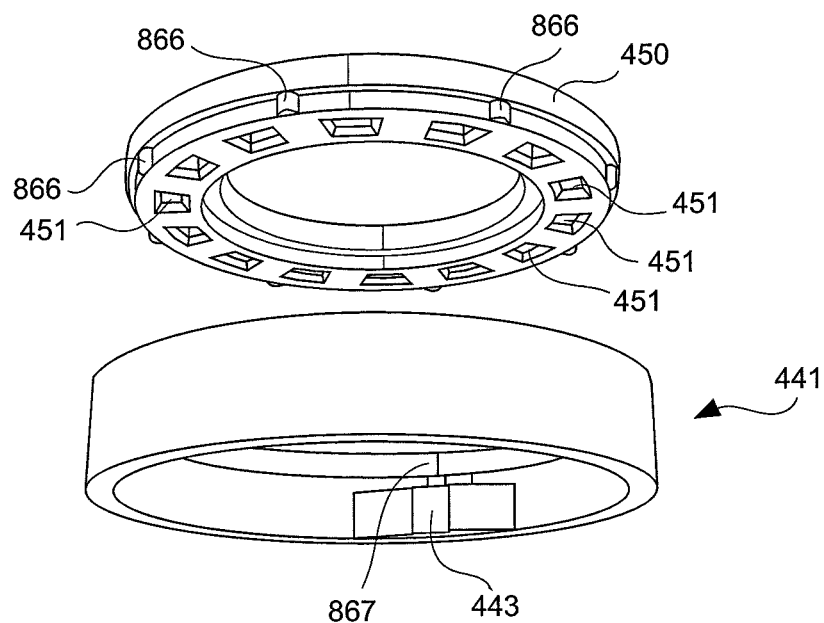
FIG. 40 is a bottom perspective view of a limiter activator and top bushing having discontinuous channels and index protrusions.
Figure 41:
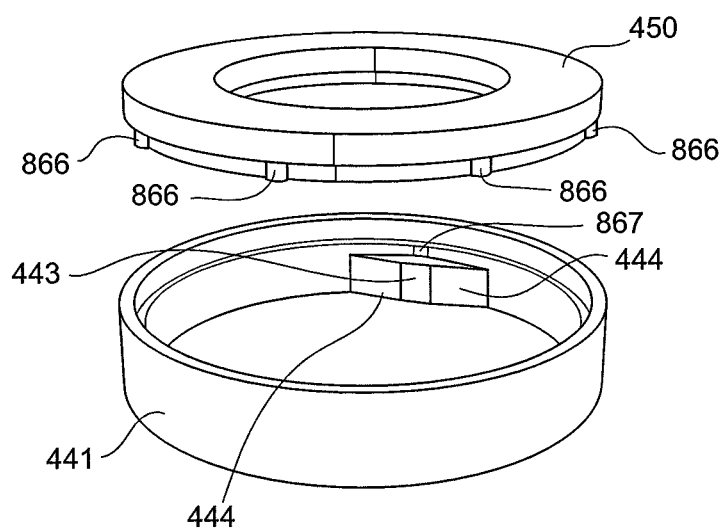
FIG. 41 is a another bottom perspective view of a limiter activator and top bushing having discontinuous channels and index protrusions.

As shown in FIG. 39-41, the bushing includes a plurality of bumps or protrusions about the outer circumference. The outer circumference having the indexing marks 866, bumps or protrusions may be recessed from the most outer circumferential surface. The limiter activator 441 includes at least one groove 867, indent or indexing mark on the inner circumferential surface, such that the indent will interfere with the bumps on the bushing 450 when the limiter activator in assembled relationship with the bushing and rotated a sufficient amount to bring a bump in contact with the indent. One skilled in the art will recognize that the bump and corresponding indexing marks may be present on any opposing surfaces of the bushing and limiter activator that bear against each other.

In some embodiments, the volume between the limiter activators 441 and 442 and the outer rotational element 439 may include lubrication. Such lubrication may include damping grease or other substances to provide damping and provide improved rotational feel.

The illustration of these particular embodiments should not be taken as restrictive in any way since a myriad of configurations and methods using the underlying invention can be realized from what has been disclosed in this application. One skilled in the art will recognize that features of components may be placed on other components without detracting from the invention disclosed. The foregoing disclosure of specific embodiments is intended to be illustrative of the broad concepts comprehended by the invention.

What is claimed is:

1. An assembly to slidably mount a monitor to a monitor arm, the assembly including a first track and a second track, the second track receiving the first track in a sliding relationship, a plate, the plate received in a sliding relationship in the first track, the plate connected to a first component of the monitor arm and the second track connected to a second component of the monitor arm.

2. The assembly of claim 1 wherein the first track includes perimeter channels, the perimeter channels capturing perimeter edges of the plate.

3. The assembly of claim 2, wherein the plate includes at least one guide channel, the at least one guide channel oriented parallel to the perimeter channels.

4. The assembly of claim 3, further including a protrusion extending from the first track, the protrusion engaging the guide channel.

5. The assembly of claim 4, further including a plurality of guide channels and a plurality of protrusions, the protrusions being captured by the guide channels to resist movement in a direction parallel to opposing faces of the first track and the plate.

6. The assembly of claim 2 wherein one of the plate or the first track includes at least one guide channel and the other of the plate or the first track includes a protrusion engaged in the at least one guide channel, the at least one guide channel being parallel to at least one of the perimeter channels.

7. The assembly of claim 1, further including a brake to prevent movement between the plate and first track.

8. The assembly of claim 7, the brake including an actuator biased in an engaged position, the brake released by activating the actuator.

9. The assembly of claim 1 wherein the first component may move in a first direction relative to the first track, and the second component may move in a second direction relative to the first track.

10. The assembly of claim 1 wherein the plate slides in a first direction and a second direction with respect to the first track, and the second track slides in the first direction and the second direction with respect to the first track.

11. An assembly to connect a monitor connector to a monitor arm, the assembly including a first track connected to the monitor connector, a second track receiving the first track, the first track and second track slidable relative to each other, the second track connected to the monitor arm.

12. The assembly of claim 11, wherein the first track is slidably connected to the monitor connector.

13. The assembly of claim 11, wherein the first track is connected to the monitor connector by a plate that is fixed to the the monitor connector and slidable with respect to the first track.

14. The assembly of claim 13 further including perimeter channels in the first track to capture the plate.

15. The assembly of claim 13, wherein one of the plate or first track includes a guide channel, the guide channel being parallel to the perimeter channels.

16. The assembly of claim 15, further including a protrusion extending from the other of the first track or the plate and positioned to ride in the guide channel.

17. The assembly of claim 13 wherein the one of the plate or the first track includes a plurality of guide channels and the first channel includes protrusions received in the guide channels, the protrusions resisting movement in a direction parallel to opposing faces of the first track and the plate.

18. An assembly to slidably mount a monitor to a monitor arm, the assembly including a connection plate having a first face and a second face, the connection plate first face facing a first slide track, the first slide track having perimeter channels to capture the first plate in a slidable relationship, a second slide track having perimeter channels to capture the first slide track in a slidable relationship, the plate connected to a first component of the monitor arm, and the second slide track is connected to a second component of the monitor arm.

19. The assembly of claim 18, wherein the plate is connected to a monitor arm, and the second track is connected to the bracket for a monitor.

20. The assembly of claim 19, further including a guide channel in one of the plate or first slide track, and a protrusion aligned in the guide channel, the protrusion extending from one of the plate, the first slide track, or the second slide track.

21. An assembly to connect a monitor connector to a monitor arm, the assembly including a first track connected to the monitor arm, a second track receiving the first track, the first track and second track slidable relative to each other, the second track connected to the monitor connector.

22. The assembly of claim 21, wherein the first track is slidably connected to the monitor arm.

23. The assembly of claim 22, wherein the first track is connected to the monitor arm by a plate that is fixed to the monitor arm and slidable with respect to the first track.

24. The assembly of claim 23 further including perimeter channels in the first track to capture the plate.

25. The assembly of claim 23, wherein one of the plate or first track includes a guide channel, the guide channel being parallel to the perimeter channels.

26. The assembly of claim 25, further including a protrusion extending from the other of the first track or the plate and positioned to ride in the guide channel.

27. The assembly of claim 23 wherein the one of the plate or the first track includes a plurality of guide channels and the first channel includes protrusions received in the guide channels, the protrusions resisting movement in a direction parallel to opposing faces of the first track and the plate.

28. The assembly of claim 18, wherein the plate is connected to a bracket for a monitor, and the second track is connected to a monitor arm.

29. The assembly of claim 28, further including a guide channel in one of the plate or first slide track, and a protrusion aligned in the guide channel, the protrusion extending from one of the plate, the first slide track, or the second slide track.

* * * * *